(12) United States Patent
Sun

(10) Patent No.: US 10,692,199 B2
(45) Date of Patent: Jun. 23, 2020

(54) IMAGE PROCESSING METHOD AND DEVICE, AND NON-TRANSITORY COMPUTER-READABLE STORAGE MEDIUM

(71) Applicant: GUANGDONG OPPO MOBILE TELECOMMUNICATIONS CORP., LTD., Dongguan, Guangdong (CN)

(72) Inventor: Jianbo Sun, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 209 days.

(21) Appl. No.: 15/814,791

(22) Filed: Nov. 16, 2017

(65) Prior Publication Data

US 2018/0174285 A1 Jun. 21, 2018

(30) Foreign Application Priority Data

Dec. 20, 2016 (WO) ................ PCT/CN2016/111147
Dec. 20, 2016 (WO) ................ PCT/CN2016/111149

(51) Int. Cl.
*G06T 5/50* (2006.01)
*G06T 5/00* (2006.01)
(Continued)

(52) U.S. Cl.
CPC ................ *G06T 5/50* (2013.01); *G06T 5/002* (2013.01); *G06T 5/40* (2013.01); *H04N 5/2355* (2013.01);
(Continued)

(58) Field of Classification Search
None
See application file for complete search history.

(56) References Cited

U.S. PATENT DOCUMENTS 7,859,588 B2 * 12/2010 Parulski ............... H04N 5/2258
348/349
8,229,244 B2 * 7/2012 Agrawal ................. G06T 5/003
348/208.13
(Continued)

FOREIGN PATENT DOCUMENTS

CN 101272458 A 9/2008
CN 101399924 A 4/2009
(Continued)

OTHER PUBLICATIONS

Ito, Atsushi, et al. "Blurburst: Removing blur due to camera shake using multiple images." ACM Trans. Graph., Submitted 3.1 (2014). (Year: 2014).*

(Continued)

*Primary Examiner* — Andrae S Allison
(74) *Attorney, Agent, or Firm* — Hodgson Russ LLP

(57) ABSTRACT

An image processing method includes (a) obtaining a first image corresponding to a first photography parameter; (b) obtaining a second image having a same scene as the first image, the second image corresponding to a second photography parameter; (c) blurring the first image to obtain a blurred first image; (d) defining a to-be-replaced portion of the blurred first image, the to-be-replaced portion corresponding to an overexposed portion of the first image; (e) obtaining a replacing portion of the second image, the replacing portion corresponding to the to-be-replaced portion; and (f) replacing the to-be-replaced portion of the blurred first image with the replacing portion of the second image to obtain a merged image.

22 Claims, 59 Drawing Sheets

(51) Int. Cl.
  *G06T 5/40* (2006.01)
  *H04N 5/232* (2006.01)
  *H04N 5/235* (2006.01)
(52) U.S. Cl.
  CPC ....... *H04N 5/2356* (2013.01); *H04N 5/23232* (2013.01); *G06T 2207/20072* (2013.01); *G06T 2207/20182* (2013.01); *G06T 2207/20221* (2013.01)

(56) References Cited

U.S. PATENT DOCUMENTS

| | | | | |
|---|---|---|---|---|
| 9,538,152 | B2* | 1/2017 | Shabtay | H04N 5/23296 |
| 9,600,741 | B1* | 3/2017 | Su | G06K 9/52 |
| 9,615,012 | B2* | 4/2017 | Geiss | H04N 5/2258 |
| 9,736,391 | B2* | 8/2017 | Du | H04N 5/2258 |
| 9,858,644 | B2 | 1/2018 | Cao et al. | |
| 2007/0189748 | A1 | 8/2007 | Drimbarean et al. | |
| 2008/0111913 | A1* | 5/2008 | Okamoto | H04N 5/2352 348/363 |
| 2008/0218613 | A1* | 9/2008 | Janson | G03B 15/00 348/262 |
| 2008/0231726 | A1* | 9/2008 | John | H04N 5/2258 348/223.1 |
| 2008/0231728 | A1 | 9/2008 | Asoma | |
| 2010/0277619 | A1* | 11/2010 | Scarff | H04N 5/2258 348/240.1 |
| 2013/0016253 | A1 | 1/2013 | Kobayashi | |
| 2013/0314568 | A1* | 11/2013 | Vranceanu | H04N 5/2355 348/239 |
| 2014/0001968 | A1* | 1/2014 | Sun | H05B 33/0845 315/186 |
| 2014/0267990 | A1 | 9/2014 | Moon et al. | |
| 2016/0028949 | A1* | 1/2016 | Lee | H04N 5/06 348/218.1 |

FOREIGN PATENT DOCUMENTS

| | | |
|---|---|---|
| CN | 103020927 A | 4/2013 |
| CN | 203120316 U | 8/2013 |
| CN | 104052838 A | 9/2014 |
| CN | 104125384 A | 10/2014 |
| CN | 104333708 A | 2/2015 |
| CN | 105979165 A | 9/2016 |
| CN | 106210205 A | 12/2016 |
| CN | 206135994 U | 4/2017 |
| JP | 2013172213 | 9/2013 |
| TW | 201320733 A | 5/2013 |
| WO | 2015196456 A1 | 12/2015 |

OTHER PUBLICATIONS

Xiao, Lei, et al. "Defocus deblurring and superresolution for time-of-flight depth cameras." Proceedings of the IEEE Conference on Computer Vision and Pattern Recognition. 2015. (Year: 2015).*

Shabtay, Gal, et al. "High resolution thin multi-aperture imaging systems." U.S. Pat. No. 9,538,152. Jan. 3, 2017. (Year: 2017).*

KIPO, Office Action for KR Application No. 10-2019-7018549, dated May 1, 2020.

* cited by examiner

IMAGE PROCESSING METHOD AND DEVICE, AND NON-TRANSITORY COMPUTER-READABLE STORAGE MEDIUM

CROSS REFERENCE TO RELATED APPLICATION

This application claims priority to PCT Application NO. PCT/CN2016/111147 filed on Dec. 20, 2016 and PCT Application No. PCT/CN2016/111149 filed on the same date, the disclosures of which are incorporated herein by reference in their entirety.

BACKGROUND

1. Field of the Disclosure

The present disclosure relates to image processing technologies, and more particularly, to an image processing method, an image processing device, and a non-transitory computer-readable storage medium.

2. Description of the Related Art

In existing blur algorithms, such as blurring a background of a portrait photograph, a blurring software algorithm usually uses a fuzzy algorithm in blurring a light source on a picture. The fuzzy algorithm is a calculation that averages pixel brightness of the light source. The light source may appear dark on the picture, causing a bad effect.

SUMMARY

The embodiments of the present disclosure seek to solve at least one of the technical problems existing in the related art to at least some extent. Accordingly, the embodiments of the present disclosure are required to provide an image processing method, an image processing device, and a non-transitory computer-readable storage medium.

The present disclosure provides an image processing method, which includes steps of:

(a) obtaining a first image corresponding to a first photography parameter;

(b) obtaining a second image having a same scene as the first image, the second image corresponding to a second photography parameter;

(c) blurring the first image to obtain a blurred first image;

(d) defining a to-be-replaced portion of the blurred first image, the to-be-replaced portion corresponding to an overexposed portion of the first image;

(e) obtaining a replacing portion of the second image, the replacing portion corresponding to the to-be-replaced portion; and (f) replacing the to-be-replaced portion of the blurred first image with the replacing portion of the second image to obtain a merged image.

The present disclosure provides an image processing device, which includes:

a processor; and a memory connected with the processor, the memory including a plurality of program instructions executable by the processor configured to execute a method, the method including:

(a) obtaining a first image corresponding to a first photography parameter;

(b) obtaining a second image having a same scene as the first image, the second image corresponding to a second photography parameter;

(c) blurring the first image to obtain a blurred first image;

(d) defining a to-be-replaced portion of the blurred first image, the to-be-replaced portion corresponding to an overexposed portion of the first image;

(e) obtaining a replacing portion of the second image, the replacing portion corresponding to the to-be-replaced portion; and (f) replacing the to-be-replaced portion of the blurred first image with the replacing portion of the second image to obtain a merged image.

The present disclosure provides a non-transitory computer-readable storage medium, having instructions stored therein, that when an electronic device executes the instructions using a processor, an image processing method according to the afore-described image processing method is performed.

In an aspect of the image processing method and device in accordance with the present disclosure, two images are photographed, one is the focused image, the other one is the out-of-focus image, the material portion of the out-of-focus image corresponding to the overexposed portion of the focused image is extracted and then merged into the blurred focused image to obtain a merged image having a real flare effect. The flare effect is excellent.

In another aspect of the image processing method and device in accordance with the present disclosure, two images are photographed, one is the equally-exposed image, the other one is the underexposed image, both of the two images are blurred, and then the brightness of the blurred overexposed portion is increased, the corresponding fake overexposed portion is extracted, and the blurred overexposed portion of the blurred equally-exposed image is replaced with the fake overexposed portion to merge into a blurred image having a real flare effect. The flare effect is excellent.

The additional aspects and advantages of the present disclosure will be partially described as follows, partially apparent from the following descriptions, or acquired from implementing the present disclosure.

BRIEF DESCRIPTION OF THE DRAWINGS

The above and/or additional aspects and advantages of the present disclosure will be apparent and readily understood in the following descriptions of the embodiments in conjunction with the drawings.

DETAILED DESCRIPTION OF THE PREFERRED EMBODIMENTS

Figure 1:
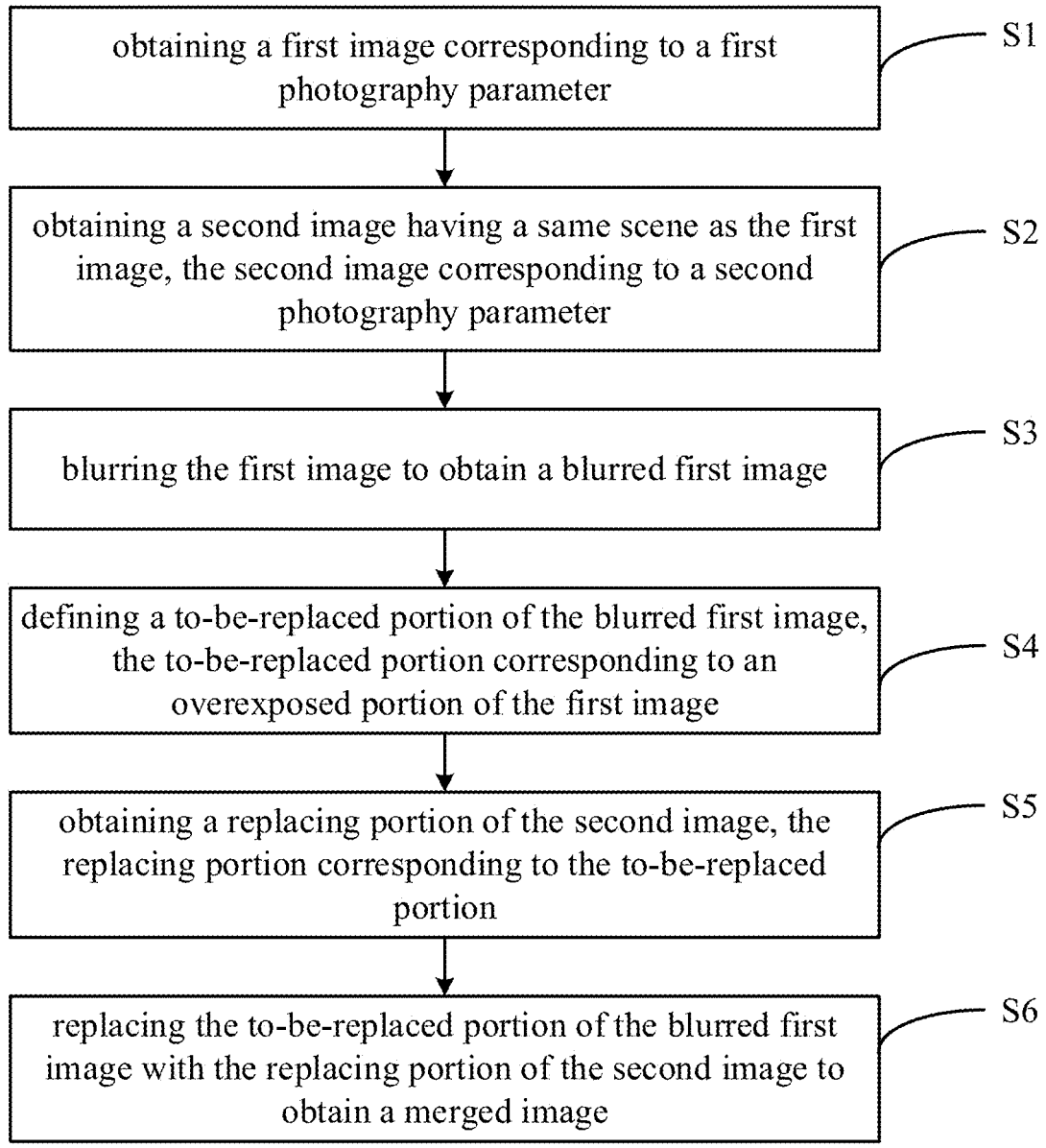
FIG. 1 is a flowchart of an image processing method of the present disclosure.

The embodiments of the present disclosure will be described in detail below. The embodiments are illustrated in the appending drawings, in which the same or similar reference numbers are throughout referred to as the same or similar components or the components having the same or similar functions. The embodiments described below with reference to the appending drawings are exemplary and are merely used to illustrate the present disclosure, and should not be construed as limitations of the present disclosure.

In the description of the present disclosure, it should be understood that terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

In the description of the present disclosure, it is noted that unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

The following disclosure provides many different embodiments or examples to implement different structures of the present disclosure. In order to simplify the present disclosure, the components and arrangements of specific examples are described in the following. Apparently, they are just exemplary, and do not intend to limit the present disclosure. In addition, reference numbers and/or letters can be repeated in different examples of the present disclosure for the purposes of simplification and clearness, without indicating the relationships between the discussed embodiments and/or arrangements. Further, the present disclosure provides examples of various specific processes and materials, but an ordinary person in the art can realize the availability of other processes and/or usage of other materials.

The present disclosure provides a plurality of embodiments of image processing method, a plurality of embodiments of control method, a plurality of embodiments of image processing device, a plurality of embodiments of control device, a plurality of embodiments of imaging device, and a plurality of embodiments of electronic device. The plurality of embodiments of the image processing method are described below with sequencing numbers as well as the plurality of embodiments of the control method, the plurality of embodiments of the image processing device, the plurality of embodiments of the control device, the plurality of embodiments of the imaging device, and the plurality of embodiments of the electronic device. Each embodiment of the image processing method corresponds to an embodiment of the control method, an embodiment of the image processing device, an embodiment of the control device, an embodiment of the imaging device, and an embodiment of the electronic device. For example, a first embodiment of the image processing method corresponds to a first embodiment of the control method, a first embodiment of the image processing device, a first embodiment of the control device, a first embodiment of the imaging device, and a first embodiment of the electronic device; a second embodiment of the image processing method corresponds to a second embodiment of the control method, a second embodiment of the image processing device, a second embodiment of the control device, a second embodiment of the imaging device, and a second embodiment of the electronic device.

The present disclosure is referred to an image processing method. The image processing method includes steps of: (a) obtaining a first image corresponding to a first photography parameter; (b) obtaining a second image having a same scene as the first image, the second image corresponding to a second photography parameter; (c) blurring the first image to obtain a blurred first image; (d) defining a to-be-replaced portion of the blurred first image, the to-be-replaced portion corresponding to an overexposed portion of the first image; (e) obtaining a replacing portion of the second image, the replacing portion corresponding to the to-be-replaced portion; and (f) replacing the to-be-replaced portion of the blurred first image with the replacing portion of the second image to obtain a merged image.

The present disclosure is referred to a control method. The control method is utilized to control an imaging device. The control method includes controlling the imaging device to output a focused image and an out-of-focus image of a same scene; and utilizing the afore-described image processing method to process the focused image and the out-of-focus image.

The present disclosure is referred to an image processing device. The image processing device includes a processor; and a memory connected with the processor, the memory including a plurality of program instructions executable by the processor configured to execute a method. The method includes (a) obtaining a first image corresponding to a first photography parameter; (b) obtaining a second image having a same scene as the first image, the second image corresponding to a second photography parameter; (c) blurring the first image to obtain a blurred first image; (d) defining a to-be-replaced portion of the blurred first image, the to-be-replaced portion corresponding to an overexposed portion of the first image; (e) obtaining a replacing portion of the second image, the replacing portion corresponding to the to-be-replaced portion; and (f) replacing the to-be-replaced portion of the blurred first image with the replacing portion of the second image to obtain a merged image.

The present disclosure is referred to a control device. The control device is utilized to control an imaging device. The control device includes a control module configured to control the imaging device to output a focused image and an out-of-focus image of a same scene; and the afore-described image processing device electrically connecting to the control module.

The present disclosure is referred to an imaging device. The imaging device includes a camera lens; a control module electrically connecting to the camera lens, configured to control the camera lens to output a focused image and an out-of-focus image of a same scene; and the afore-described image processing device electrically connecting to the control module.

The present disclosure is referred to an electronic device. The electronic device includes the afore-described imaging device.

The present disclosure is referred to an electronic device. The electronic device includes a processor and a storage. The storage is configured to store executable program codes. The processor runs a program corresponding to the executable program codes by reading the executable program codes stored in the storage to execute the afore-described image processing method or the afore-described control method.

The present disclosure is referred to a non-transitory computer-readable storage medium having instructions stored therein, that when an electronic device executes the instructions using a processor, the afore-described image processing method or the afore-described control method is performed.

Referring to FIG. 1, an image processing method of the present disclosure includes the following actions at blocks.

At Block S1, a first image corresponding to a first photography parameter is obtained.

At Block S2, a second image having a same scene as the first image is obtained. The second image corresponds to a second photography parameter.

At Block S3, the first image is blurred to obtain a blurred first image.

At Block S4, a to-be-replaced portion is defined in the blurred first image. The to-be-replaced portion corresponds to an overexposed portion of the first image.

At Block S5, a replacing portion of the second image is obtained. The replacing portion corresponds to the to-be-replaced portion.

At Block S6, the to-be-replaced portion of the blurred first image is replaced with the replacing portion of the second image to obtain a merged image.

In the existing arts, a blurring software algorithm is used to blur a background of a picture (for example, a background of a portrait photograph). If a light source exists in the background, the light source on the blurred picture will appear dark. The image processing method of the present disclosure can replace the light source on the blurred picture with a real flare effect. In practical use, the blurred first image can be an image with a blurred background. A light source (corresponding to the overexposed portion) of the blurred first image is replaced with the replacing portion of the second image. The second image is processed to have a better light effect for the light source. Accordingly, the merged image is improved with a real flare effect.

In an aspect of the present disclosure, the first photography parameter and the second photography parameter can be a parameter relating to focus or out of focus. That is, the first image can be a focused image and the second image can be an out-of-focus image. In another aspect of the present disclosure, the first photography parameter and the second photography parameter can be a parameter relating to exposure. That is, the first image can be an equally-exposed image obtained using a first exposure value matching luminous environment, and the second image can be an underexposed image obtained using a second exposure value less than the first exposure value. The two aspects will be described in further detail below. An ordinary person in the art understands that concepts of the present disclosure are not limited to the two aspects.

By the afore-described actions at the blocks, the image processing method of the present disclosure can obtain a merged image having a real flare effect. The flare effect is excellent.

Figure 2:
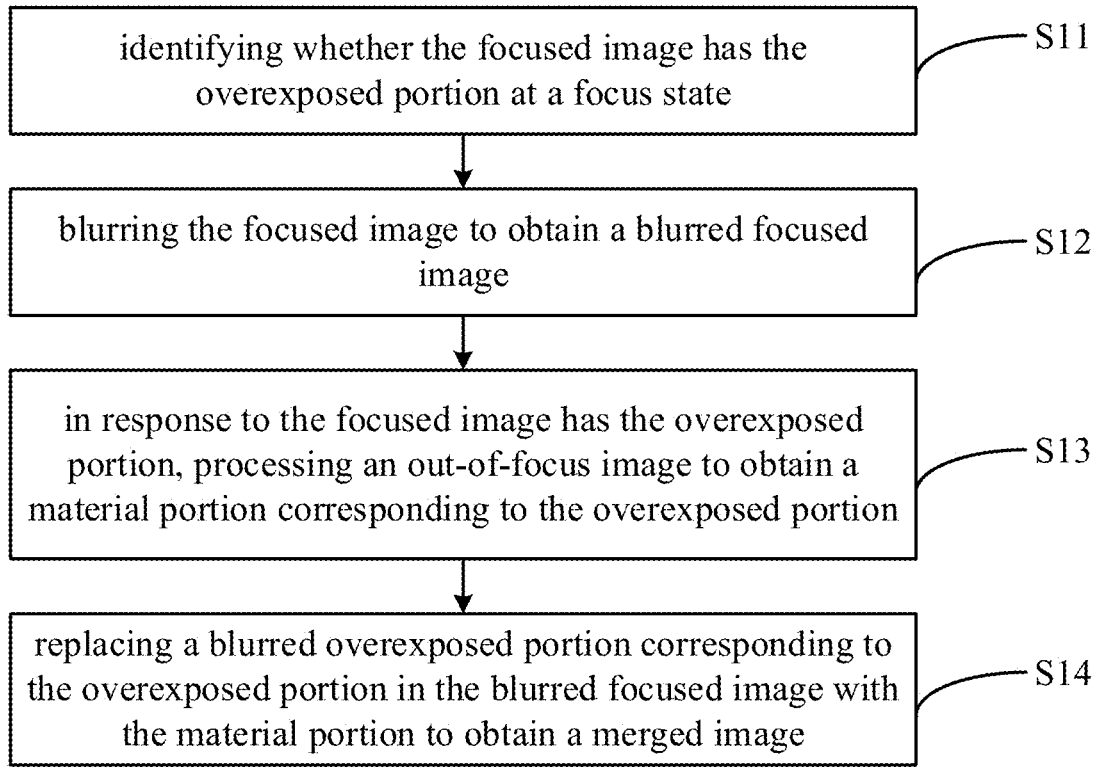
FIG. 2 is a flowchart of an image processing method of a first embodiment of the present disclosure.

In a situation that the first image is the focused image and the second image is the out-of-focus image, referring to FIG. 2, a first embodiment of the image processing method of the present disclosure includes the following actions at blocks.

At Block S11, whether the focused image has the overexposed portion at a focus state is identified.

At Block S12, the focused image is blurred to obtain a blurred focused image. The blurred focused image includes a blurred overexposed portion corresponding to the overexposed portion.

At Block S13, in response to the focused image has the overexposed portion, the out-of-focus image having a same scene as the focused image is obtained, and the out-of-focus image is processed to obtain a material portion corresponding to the overexposed portion of the focused image.

At Block S14, the blurred overexposed portion corresponding to the overexposed portion in the blurred focused image is replaced with the material portion to obtain a merged image.

Blurring the focused image to obtain the blurred focused image can be carried out by a Gaussian blur algorithm. The focused image is photographed at the focus state using full depth of field. A degree of blurring the material portion is substantially the same as a degree of blurring the overexposed portion.

Figure 3:
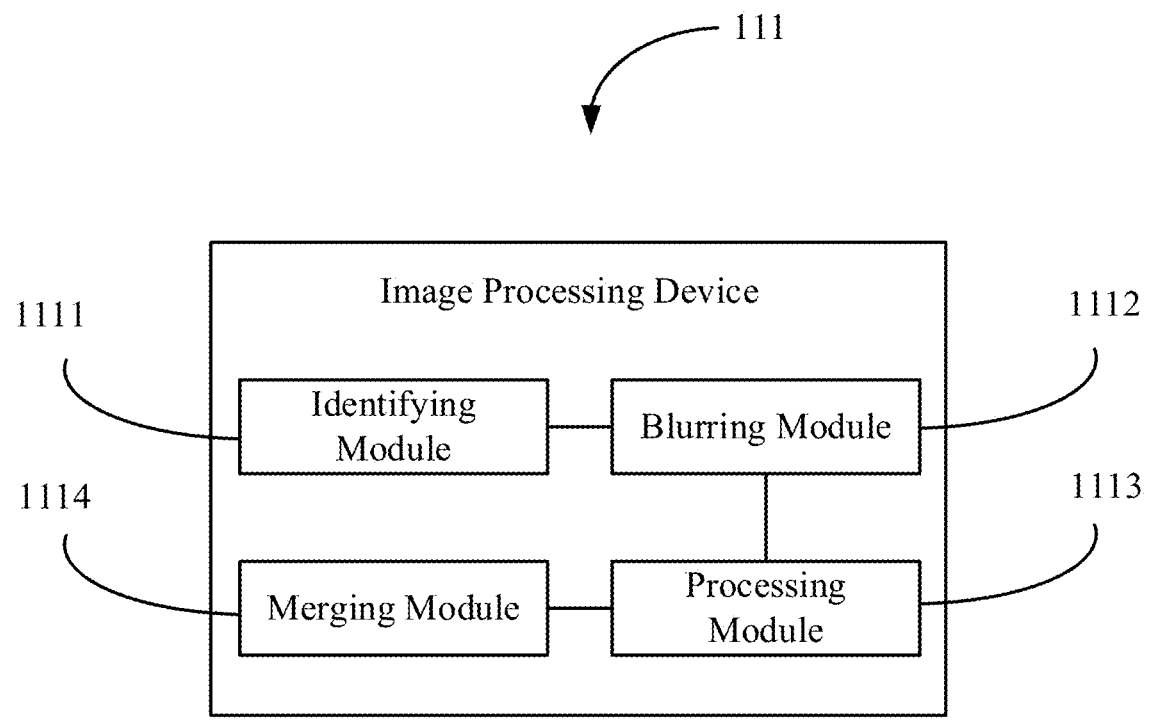
FIG. 3 is a block diagram illustrating an image processing device of a first embodiment of the present disclosure.
Figure 4:
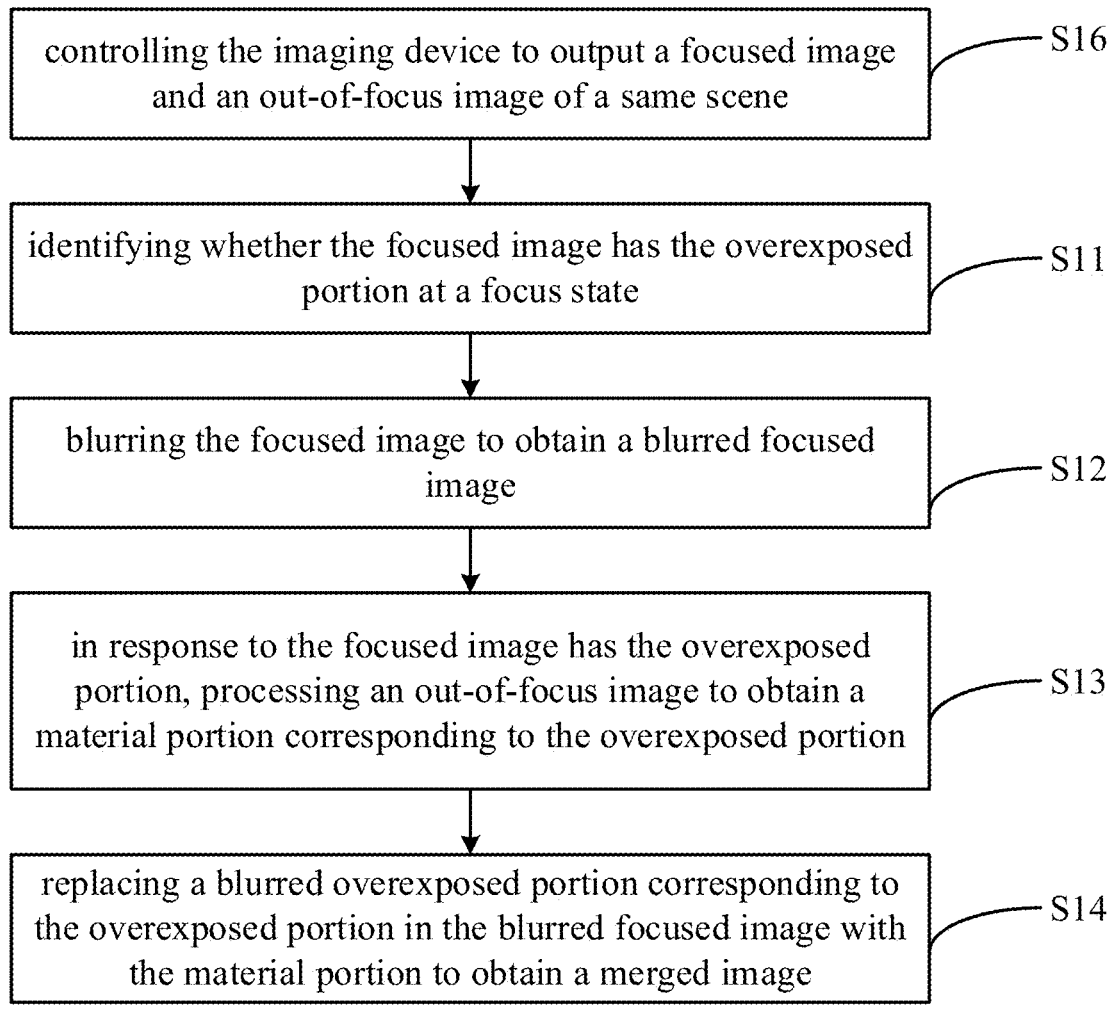
FIG. 4 is a flowchart of a control method of a first embodiment of the present disclosure.

Referring to FIG. 3, the first embodiment of the image processing method can be implemented by a first embodiment of an image processing device 111 of the present disclosure. The first embodiment of the image processing device 111 of the present disclosure includes an identifying module 1111, a blurring module 1112, a processing module 1113, and a merging module 1114, configured to execute actions at Blocks S11 to S14, respectively. That is, the identifying module 1111 is configured to identify whether the focused image has the overexposed portion at a focus state. The blurring module 1112 is configured to blur the focused image to obtain a blurred focused image including a blurred overexposed portion corresponding to the overexposed portion. The processing module 1113 is configured to obtain an out-of-focus image having a same scene as the focused image and process the out-of-focus image to obtain a material portion corresponding to the overexposed portion of the focused image, in response to the focused image has the overexposed portion. The merging module 1114 is configured to replace the blurred overexposed portion corresponding to the overexposed portion in the blurred focused image with the material portion to obtain a merged image.

The blurring module 1112 utilizes a Gaussian blur algorithm to blur the focused image to obtain the blurred focused image. The focused image is photographed at the focus state using full depth of field. A degree of blurring the material portion is substantially the same as a degree of blurring the overexposed portion.

Referring to FIGS. 4 and 6-8, a first embodiment of the control method of the present disclosure is utilized to control an imaging device 10. The control method includes the following actions at blocks.

At Block S16, the imaging device 10 is controlled to output a focused image and an out-of-focus image of a same scene.

At Block S11, whether the focused image has the overexposed portion at a focus state is identified.

At Block S12, the focused image is blurred to obtain a blurred focused image. The blurred focused image includes a blurred overexposed portion corresponding to the overexposed portion.

At Block S13, in response to the focused image has the overexposed portion, the out-of-focus image having a same scene as the focused image is obtained, and the out-of-focus image is processed to obtain a material portion corresponding to the overexposed portion of the focused image.

At Block S14, the blurred overexposed portion corresponding to the overexposed portion in the blurred focused image is replaced with the material portion to obtain a merged image.

Blurring the focused image to obtain the blurred focused image can be carried out by a Gaussian blur algorithm. The focused image is photographed at the focus state using full depth of field. A degree of blurring the material portion is substantially the same as a degree of blurring the overexposed portion.

Figure 5:
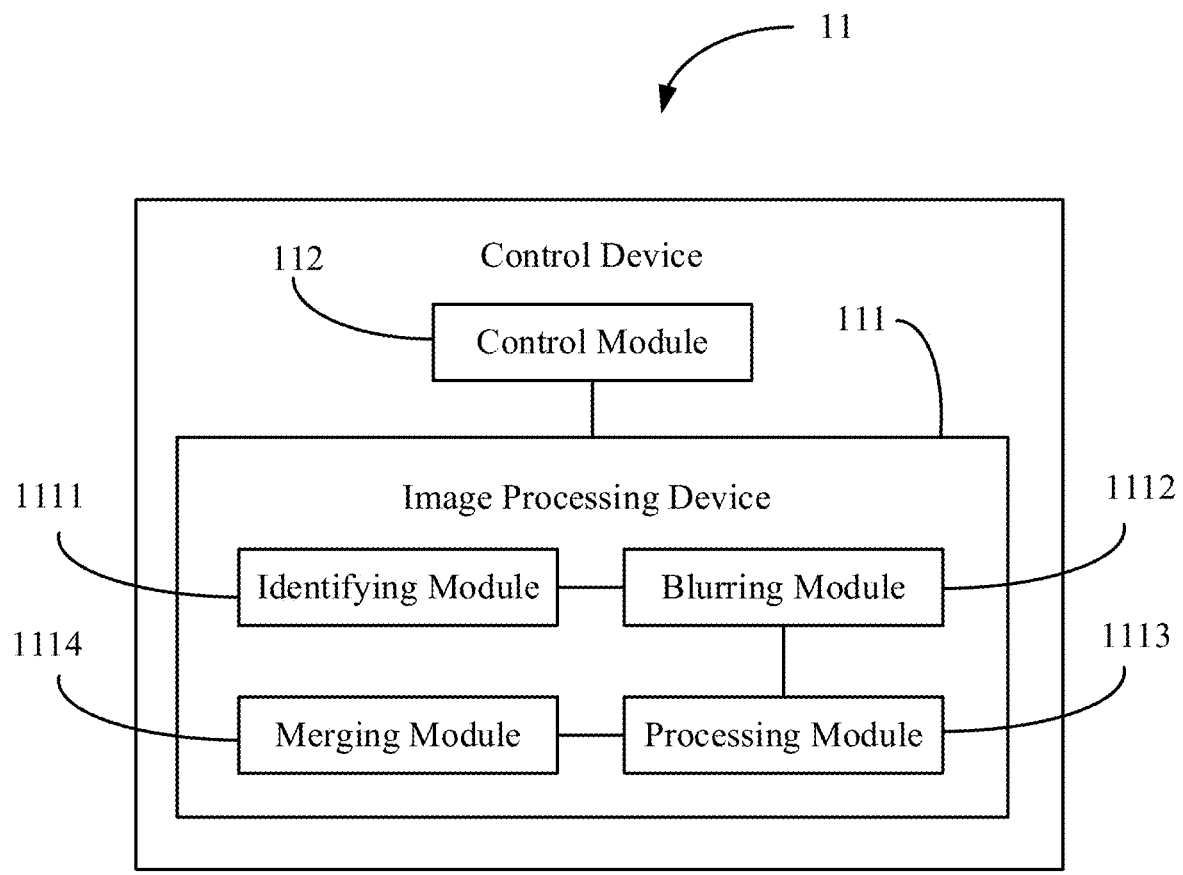
FIG. 5 is a block diagram illustrating a control device of a first embodiment of the present disclosure.

Referring to FIG. 5, the first embodiment of the control method can be implemented by a first embodiment of a control device 11 of the present disclosure. In the first embodiment of the control device 11 of the present disclosure, the control device 11 includes the image processing device 111 in accordance with the first embodiment of the image processing device 111; and a control module 112 electrically connecting to the image processing device 111. The image processing device 111 is configured to execute actions at Blocks S11 to S14. The control module 112 is configured to execute Block S16. The structure of the image processing device 111 is described with the aforesaid first embodiment, and is not detailed herein. The control module 112 is configured to control the imaging device 10 (shown in FIGS. 6 to 8) to output the focused image and the out-of-focus image of a same scene.

Figure 6:
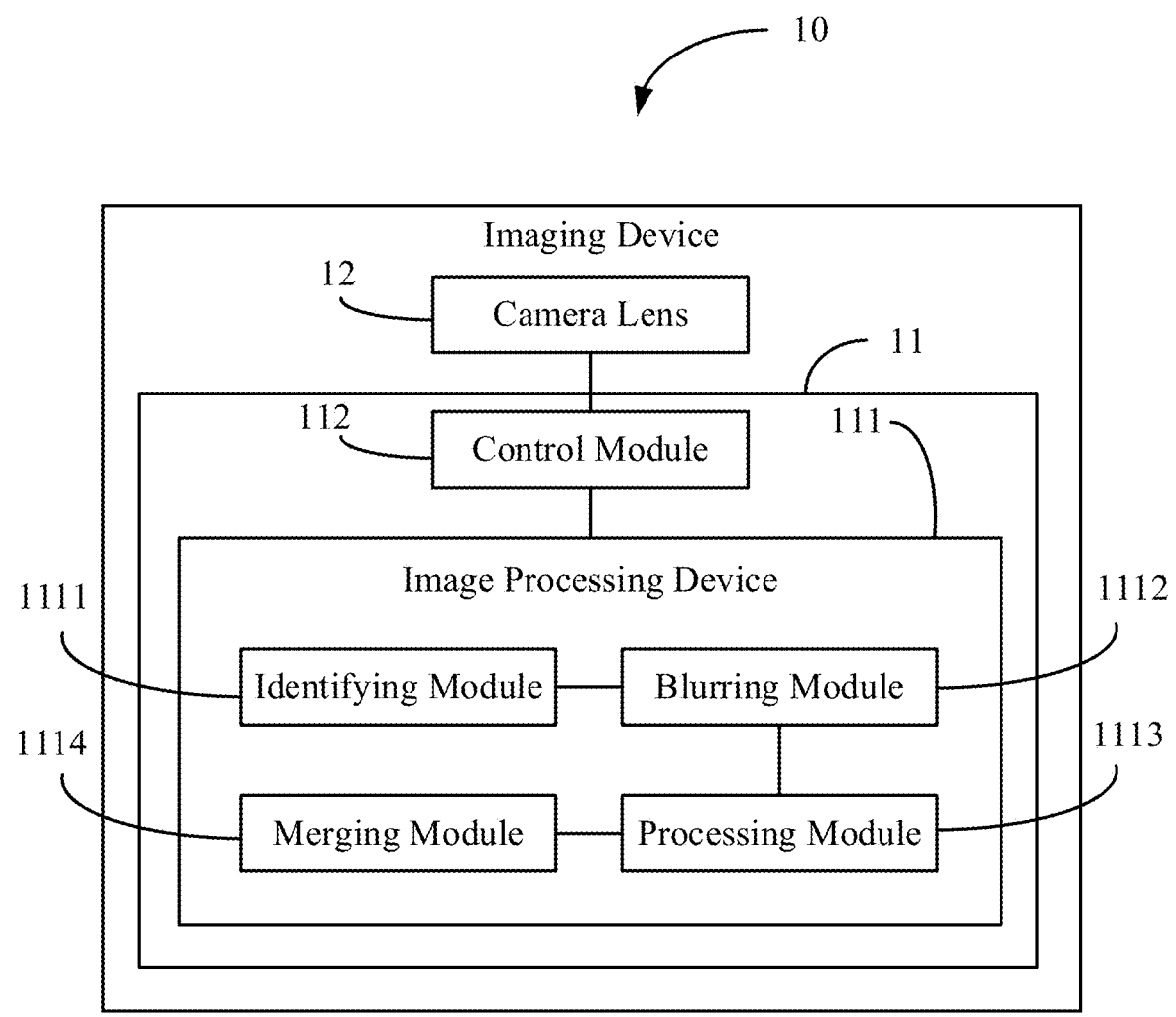
FIG. 6 is a block diagram illustrating an imaging device of a first embodiment of the present disclosure.

Referring to FIG. 6, the first embodiment of the imaging device 10 of the present disclosure includes the control device 11 in accordance with the first embodiment of the control device 11; and a camera lens 12 electrically connected to the control device 11. In other words, the imaging device 10 of the present embodiment includes the image processing device 111 in accordance with the first embodiment of the image processing device 111; the control module 112; and the camera lens 12. The control module 112, the camera lens 12, and the image processing device 111 are all electrically connected to one another.

Figure 7:
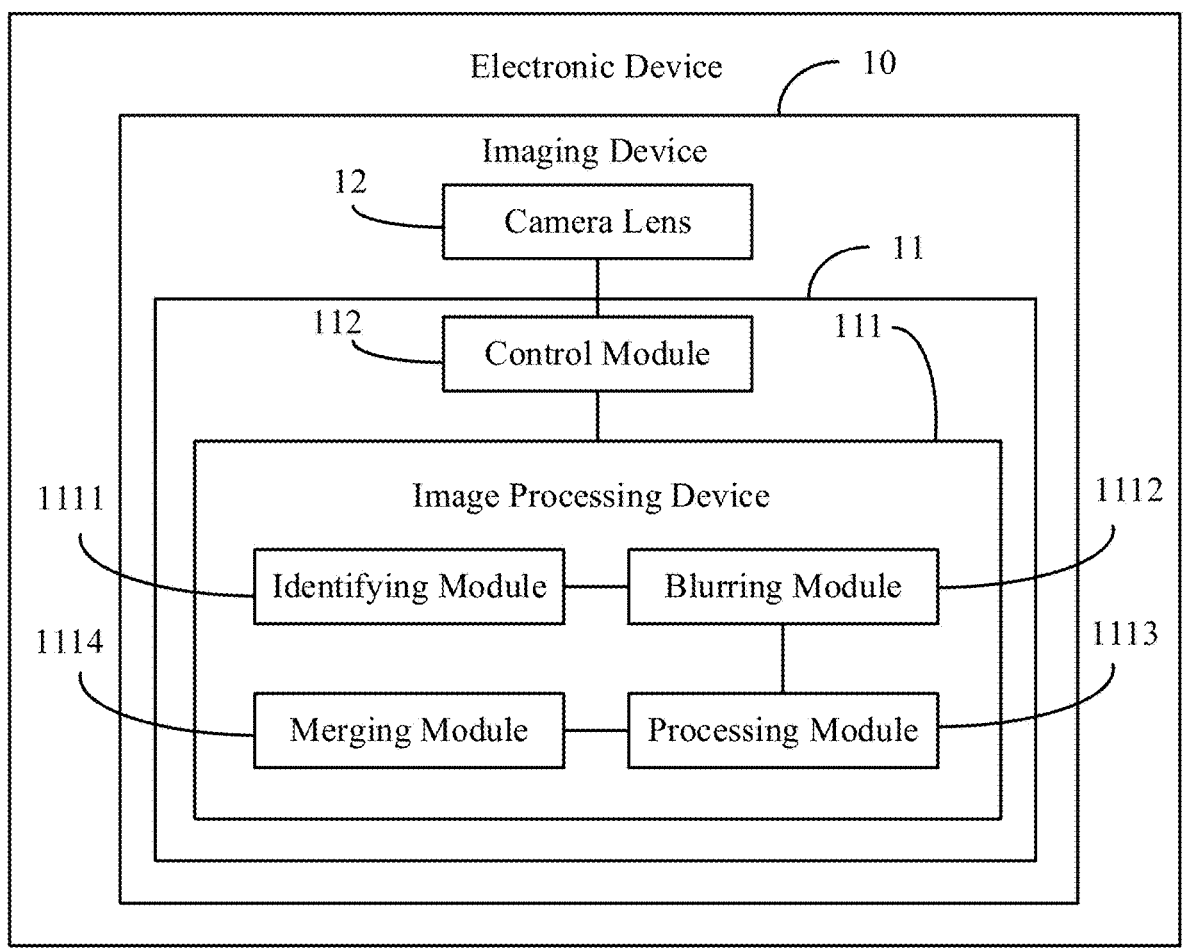
FIG. 7 is a block diagram illustrating an electronic device of a first embodiment of the present disclosure.
Figure 8:
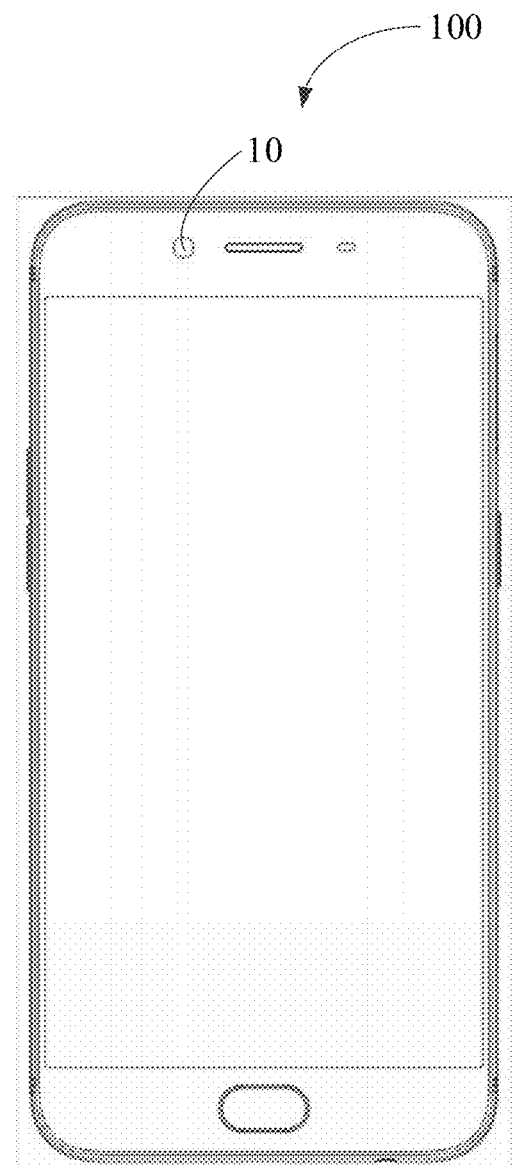
FIG. 8 is a schematic diagram illustrating a physical article of the electronic device shown in FIG. 7.

Referring to FIGS. 7 and 8, a first embodiment of the electronic device 100 of the present disclosure includes the imaging device 10 in accordance with the first embodiment of the imaging device 10. The electronic device 100 can be carried out by any type of terminals having a photographing function, such as cell phones, tablets, notebook computers, smartwatches, smart rings, smart helmets, smart glasses, other VR (virtual reality) wearable devices, other AR (augmented reality) wearable devices, and etc. When the number of the imaging device 10 is one, the imaging device 10 can be a front-facing camera or a rear camera. When the number of the imaging device 10 is two, the two imaging devices 10 can be the front-facing camera and the rear camera, respectively; or both of the two imaging devices 10 are front-facing cameras; or both of the two imaging devices 10 are rear cameras. When the number of the imaging device 10 is greater than two, the imaging device 10 can be a camera deployed at any position, such as a top camera, a bottom camera, and a lateral camera except the front-facing camera and the rear camera.

Figure 9:
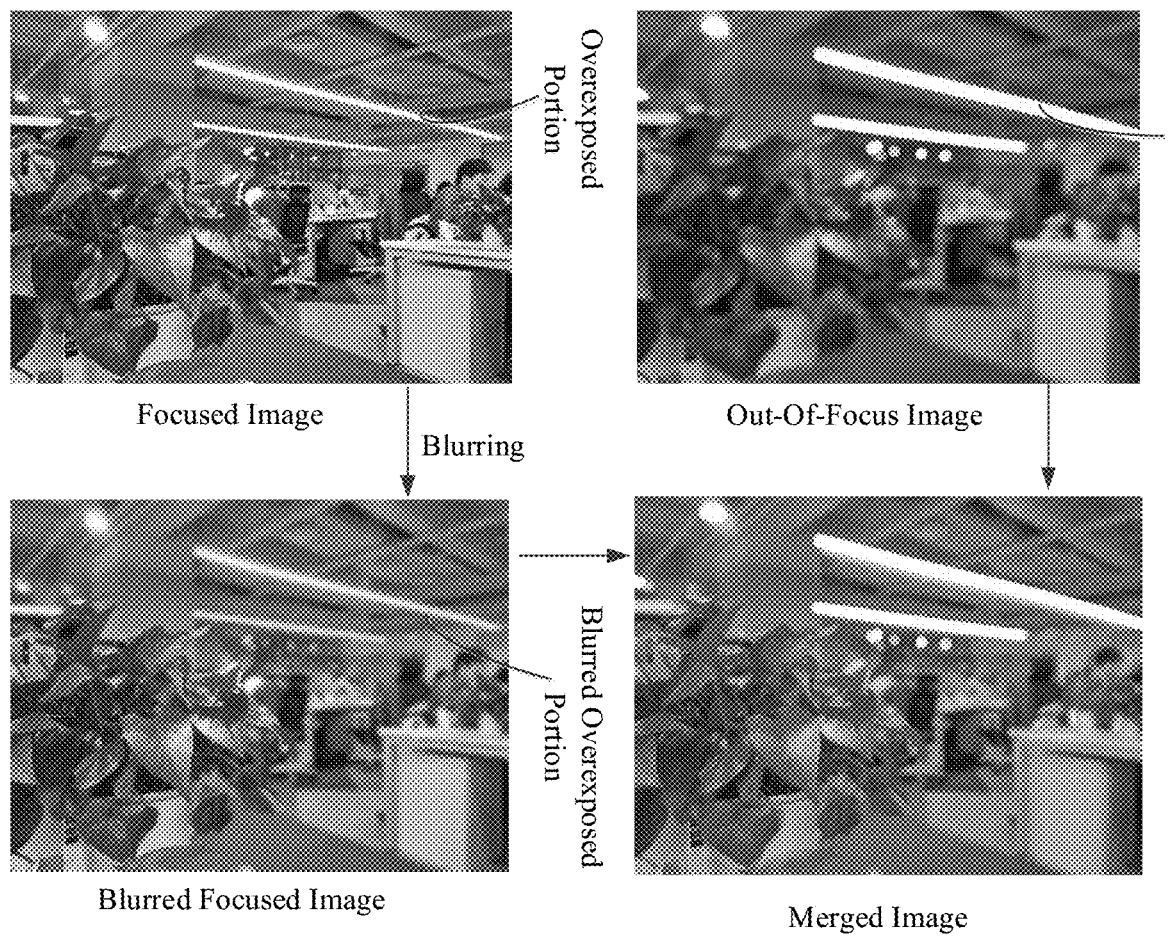
FIG. 9 is a schematic diagram illustrating a workflow of an electronic device of the present disclosure.

In accompanying with FIG. 9, for example, the camera lens 12 photographs a focused image (shown in upper left portion of FIG. 9) and an out-of-focus image (shown in upper right portion of FIG. 9) of a same scene. The focused image is photographed at the focus state using full depth of field. After identification, it can be determined that the focused image has an overexposed portion, that is, an elongated tube on the upper corner. The focused image is blurred to obtain a blurred focused image (shown in lower left portion of FIG. 9). In this example, the background of the focused image is blurred. The overexposed portion (elongated tube) of the focused image is blurred to obtain a blurred overexposed portion (elongated tube). When the focused image has the overexposed portion, an out-of-focus image is processed to obtain a material portion (elongated tube) corresponding to the overexposed portion. In this example, the out-of-focus image is obtained by photographing the scene out of focus. The blurred overexposed portion corresponding to the overexposed portion in the blurred focused image is replaced with the material portion to obtain a merged image (shown in lower right portion of FIG. 9).

In the image processing method, the image processing device 111, the control method, the control device 11, the imaging device 10, and the electronic device 100 in accordance with the first embodiment of the present disclosure, two images are photographed, one is the focused image, the other one is the out-of-focus image, the material portion of the out-of-focus image corresponding to the overexposed portion of the focused image is extracted and then merged into the blurred focused image to obtain a merged image having a real flare effect. The flare effect is excellent.

Figure 10:
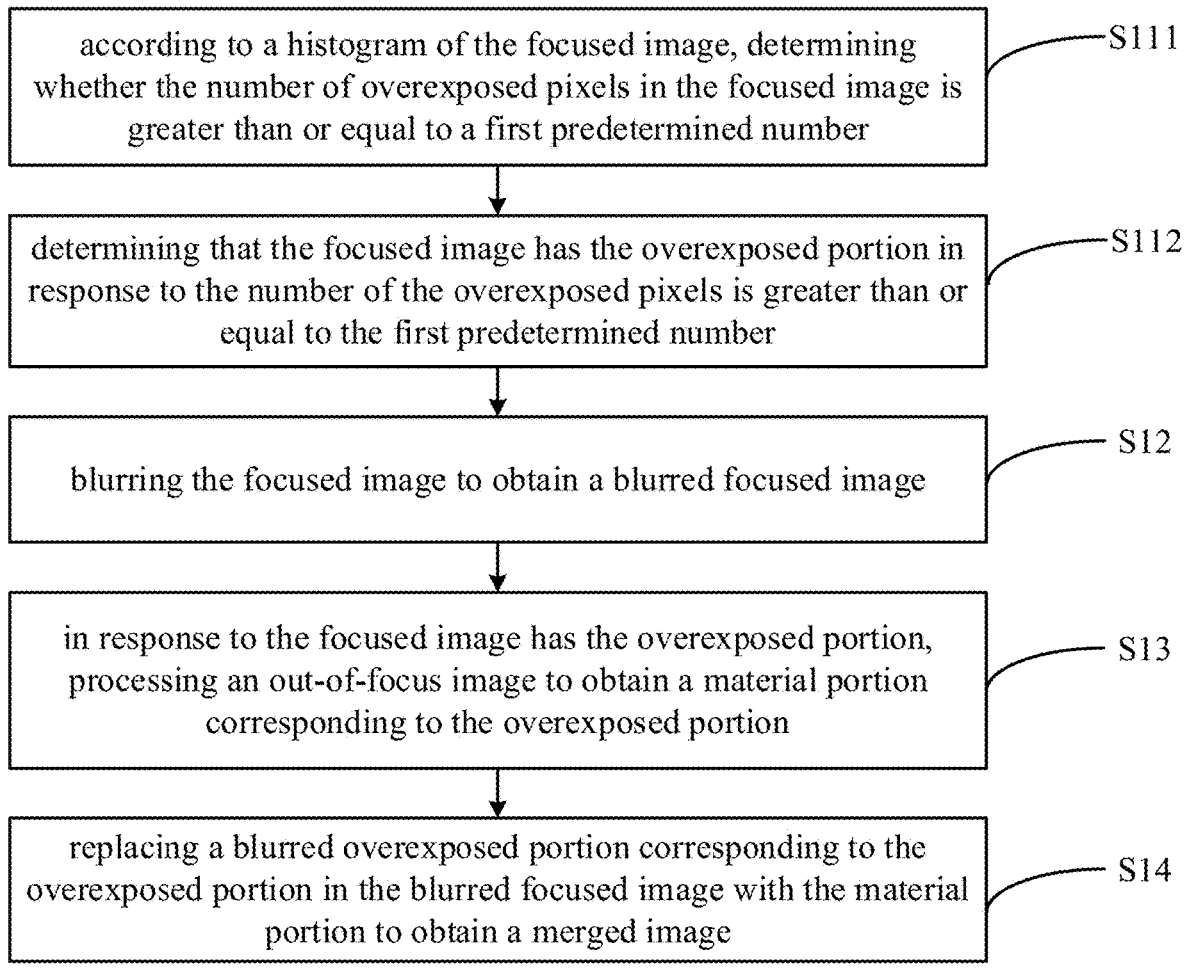
FIG. 10 is a flowchart of an image processing method of a second embodiment of the present disclosure.

Referring to FIG. 10, a second embodiment of the image processing method of the present disclosure is substantially the same as the first embodiment of the image processing method, but identifying whether the focused image has the overexposed portion at the focus state further includes the following actions at blocks.

At Block S111, whether the number of overexposed pixels in the focused image is greater than or equal to a first predetermined number is determined according to a histogram of the focused image. The pixel values of the overexposed pixels are greater than or equal to a predetermined pixel value.

At Block S112, in response to the number of the overexposed pixels is greater than or equal to the first predetermined number, it is determined that the focused image has the overexposed portion.

Figure 11:
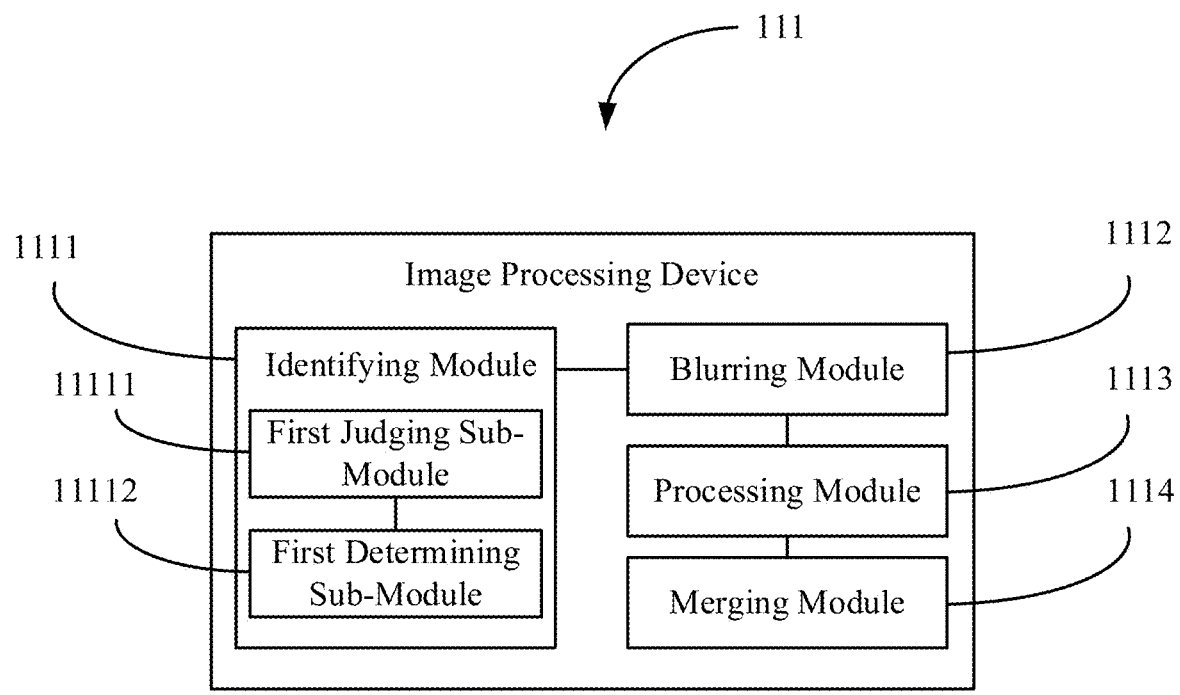
FIG. 11 is a block diagram illustrating an image processing device of a second embodiment of the present disclosure.

Referring to FIG. 11, the second embodiment of the image processing method can be implemented by a second embodiment of the image processing device 111 of the present disclosure. The image processing device 111 in accordance with the second embodiment of the image processing device 111 of the present disclosure has a structure substantially the same as the first embodiment of the image processing device 111, and their difference is that the identifying module 1111 of the image processing device 111 of the second embodiment includes a first determining sub-module 11111 and a second determining sub-module 11112, which are configured to execute actions at Blocks S111 and S112. That is, the first judging sub-module 1111 is configured to determine whether the number of overexposed pixels in the focused image is greater than or equal to a first predetermined number according to a histogram of the focused image. The pixel values of the overexposed pixels are greater than or equal to a predetermined pixel value. The first determining sub-module 11112 is configured to determine that the focused image has the overexposed portion in response to the number of the overexposed pixels is greater than or equal to the first predetermined number.

Figure 12:
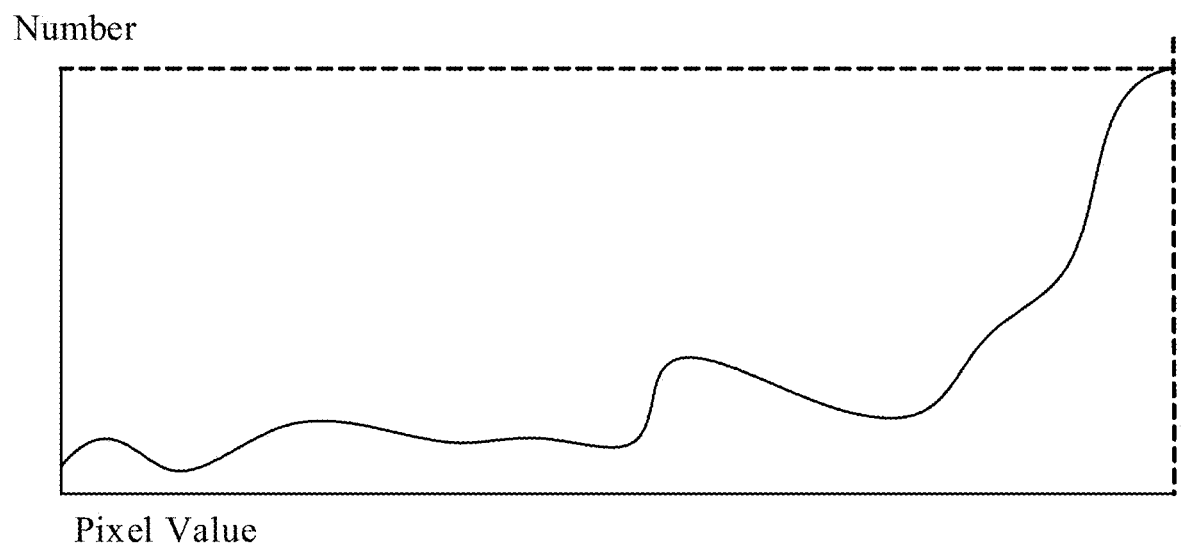
FIG. 12 is a histogram of a focused image in accordance with the present disclosure.

Referring to FIG. 12, generally speaking, a pixel value (gray value) is increased from left to right along a horizontal axis of the histogram of the focused image, and the number of pixels of a certain pixel value (gray value) is increased from bottom to top along a vertical axis of the histogram of the focused image. A range of the pixel value (gray value) is between 0 to 255, that is, from black to white. The higher a peak, the larger the number of pixels of a given pixel value (gray value).

The first predetermined number should be the number of pixels close to the right boundary of the histogram, that is, the overexposed pixels. The first predetermined number can be set as one-third of the total pixels, which are only for illustration and the present disclosure is not limited thereto.

Figure 13:
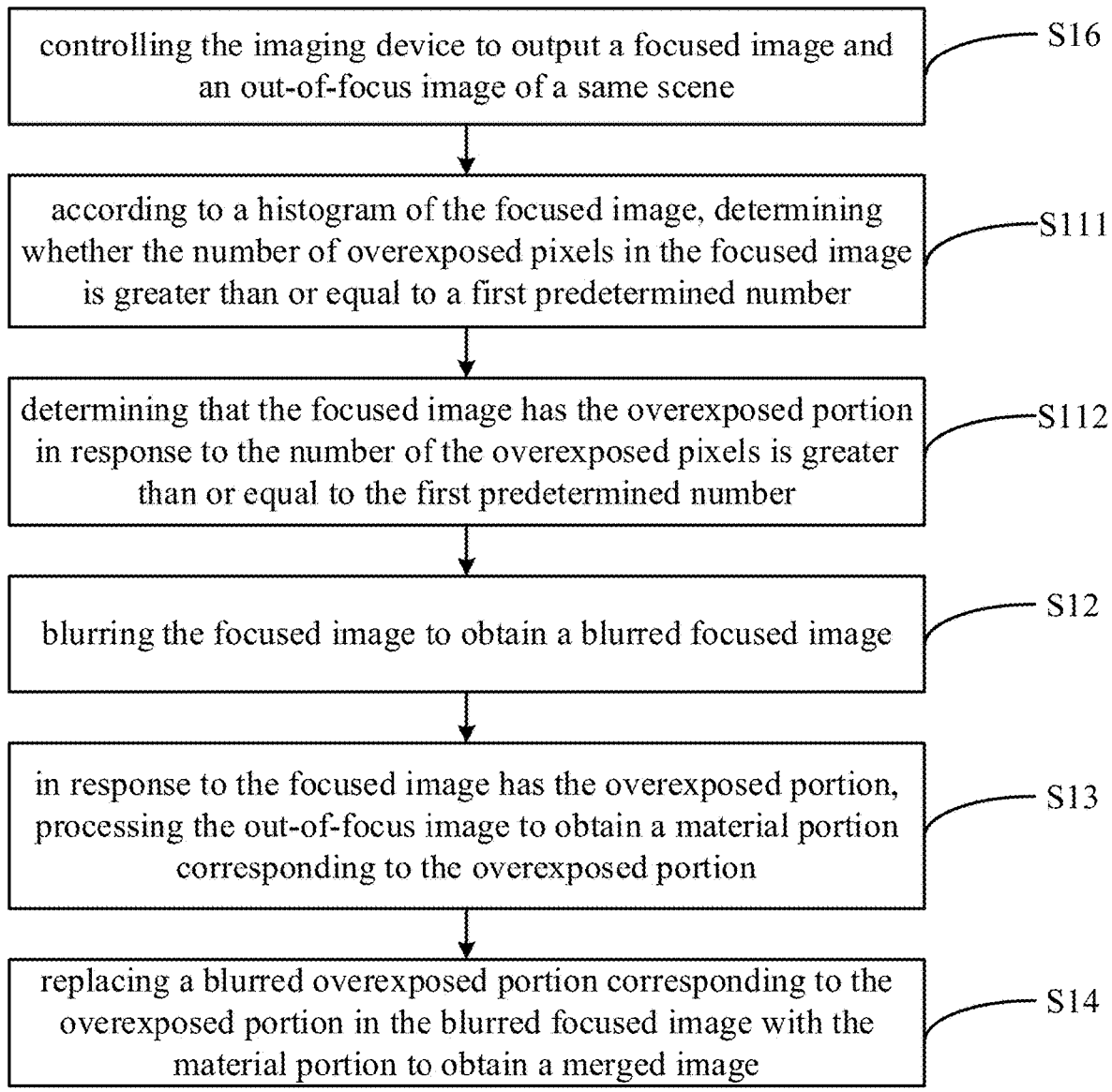
FIG. 13 is a flowchart of a control method of a second embodiment of the present disclosure.

Referring to FIG. 13, a second embodiment of the control method of the present disclosure is substantially the same as the first embodiment of the control method, but identifying whether the focused image has the overexposed portion at the focused state further includes the following actions at blocks.

At Block S111, whether the number of overexposed pixels in the focused image is greater than or equal to a first predetermined number is determined according to a histogram of the focused image. The pixel values of the overexposed pixels are greater than or equal to a predetermined pixel value.

At Block S112, in response to the number of the overexposed pixels is greater than or equal to the first predetermined number, it is determined that the focused image has the overexposed portion.

Figure 14:
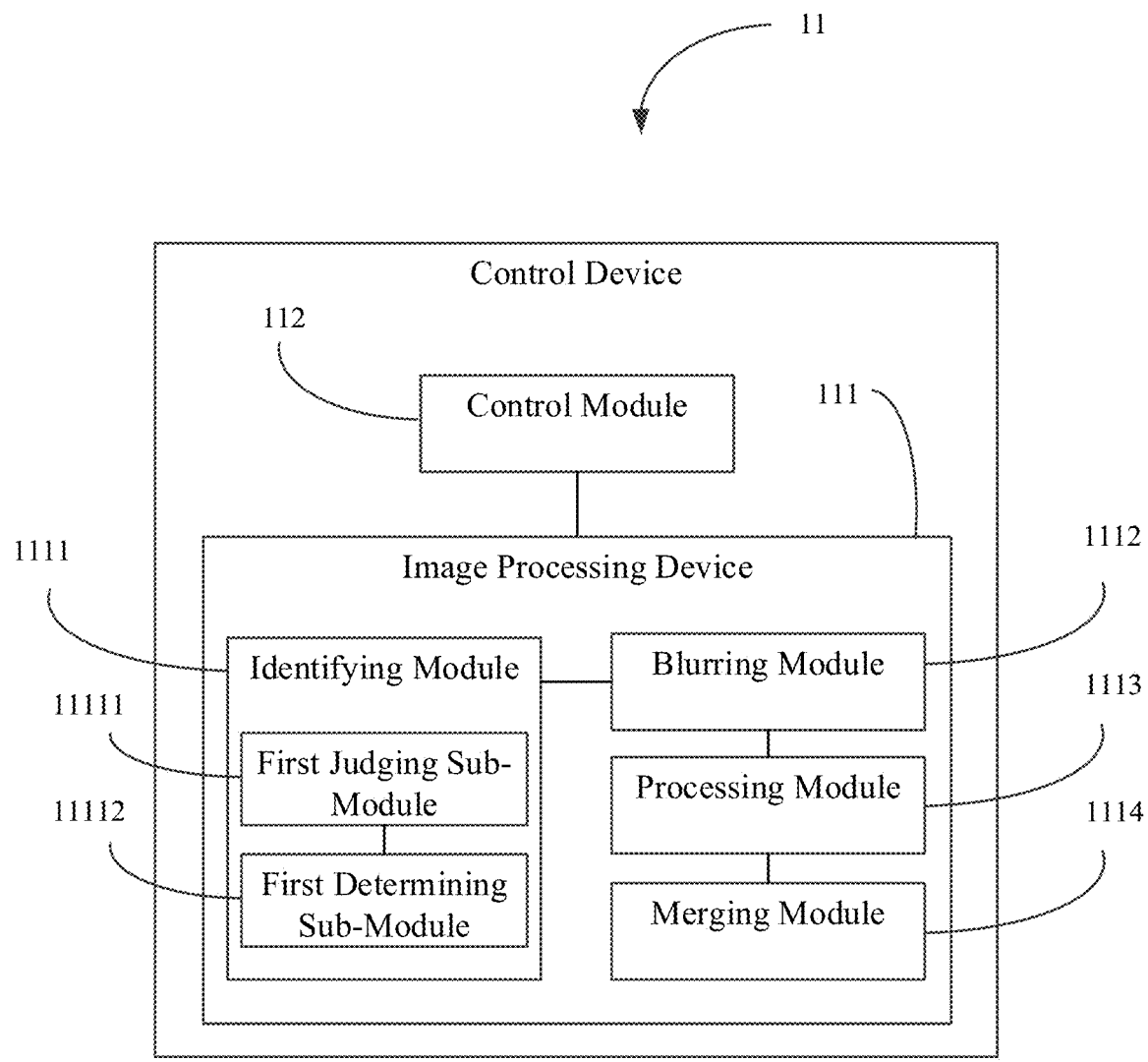
FIG. 14 is a block diagram illustrating a control device of a second embodiment of the present disclosure.

Referring to FIG. 14, the second embodiment of the control method can be implemented by a second embodiment of the control device 11 of the present disclosure. The control device 11 in accordance with the second embodiment of the control device 11 of the present disclosure has a structure substantially the same as the first embodiment of the control device 11, and their difference is that the identifying module 1111 of the control device 11 of the second embodiment includes a first determining sub-module 11111 and a second determining sub-module 11112, which are configured to execute actions at Blocks S111 and S112. That is, the first judging sub-module 1111 is configured to determine whether the number of overexposed pixels in the focused image is greater than or equal to a first predetermined number according to a histogram of the focused image. The pixel values of the overexposed pixels are greater than or equal to a predetermined pixel value. The first determining sub-module 11112 is configured to determine that the focused image has the overexposed portion in response to the number of the overexposed pixels is greater than or equal to the first predetermined number.

Referring to FIG. 12, generally speaking, a pixel value (gray value) is increased from left to right along a horizontal axis of the histogram of the focused image, and the number of pixels of a certain pixel value (gray value) is increased from bottom to top along a vertical axis of the histogram of the focused image. A range of the pixel value (gray value) is between 0 to 255, that is, from black to white. The higher a peak, the larger the number of pixels of a given pixel value (gray value).

The first predetermined number should be the number of pixels close to the right boundary of the histogram, that is, the overexposed pixels. The first predetermined number can be set as one-third of the total pixels, which are only for illustration and the present disclosure is not limited thereto.

Figure 15:
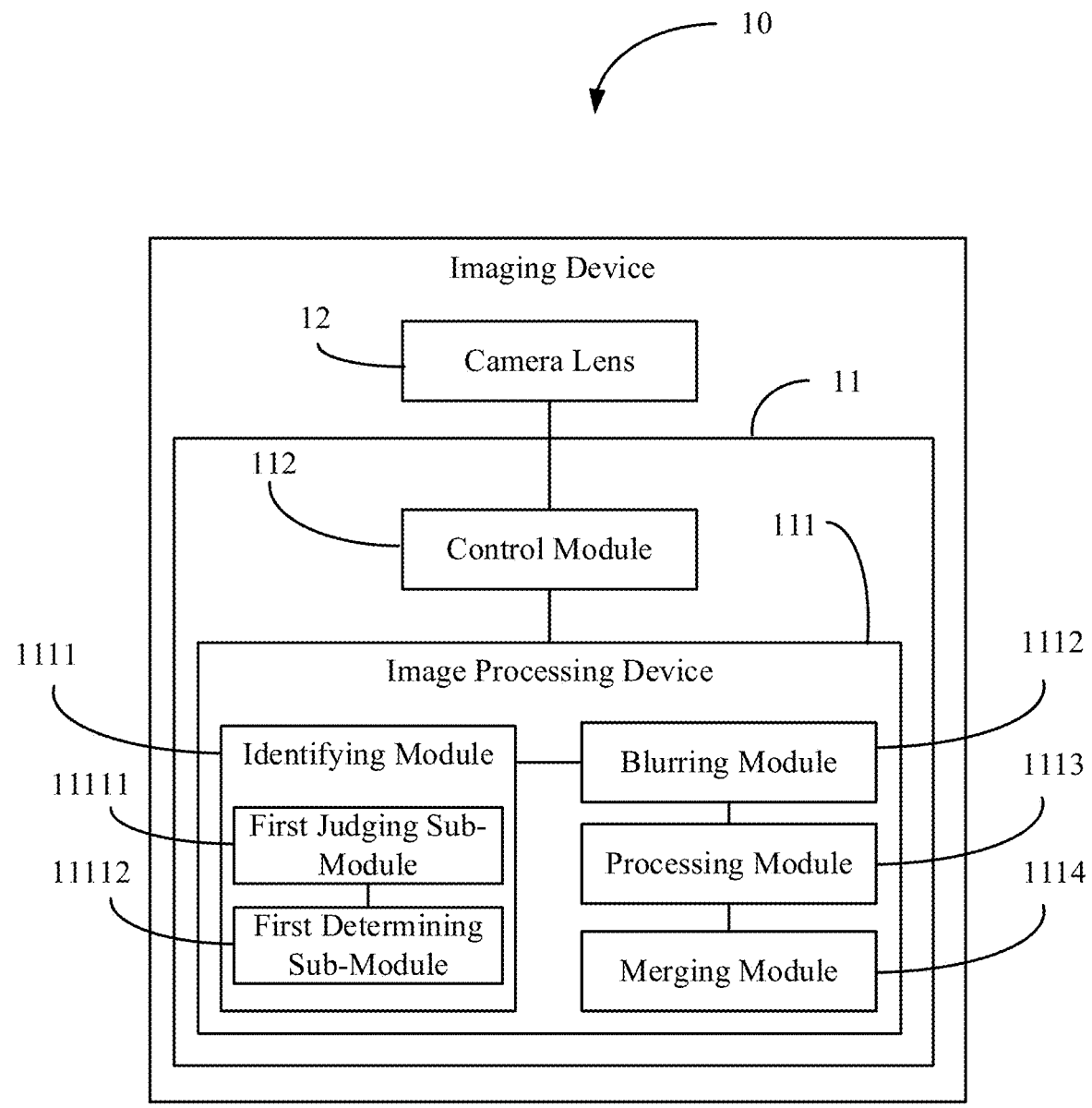
FIG. 15 is a block diagram illustrating an imaging device of a second embodiment of the present disclosure.

Referring to FIG. 15, a second embodiment of the imaging device 10 of the present disclosure includes the control device 11 in accordance with the second embodiment of the control device 11; and the camera lens 12 electrically connected to the control device 11. In other words, the imaging device 10 of the present embodiment includes the image processing device 111 in accordance with the first embodiment of the image processing device 111; the control module 112; and the camera lens 12. The control module 112, the camera lens 12, and the image processing device 111 are all electrically connected to one another.

Figure 16:
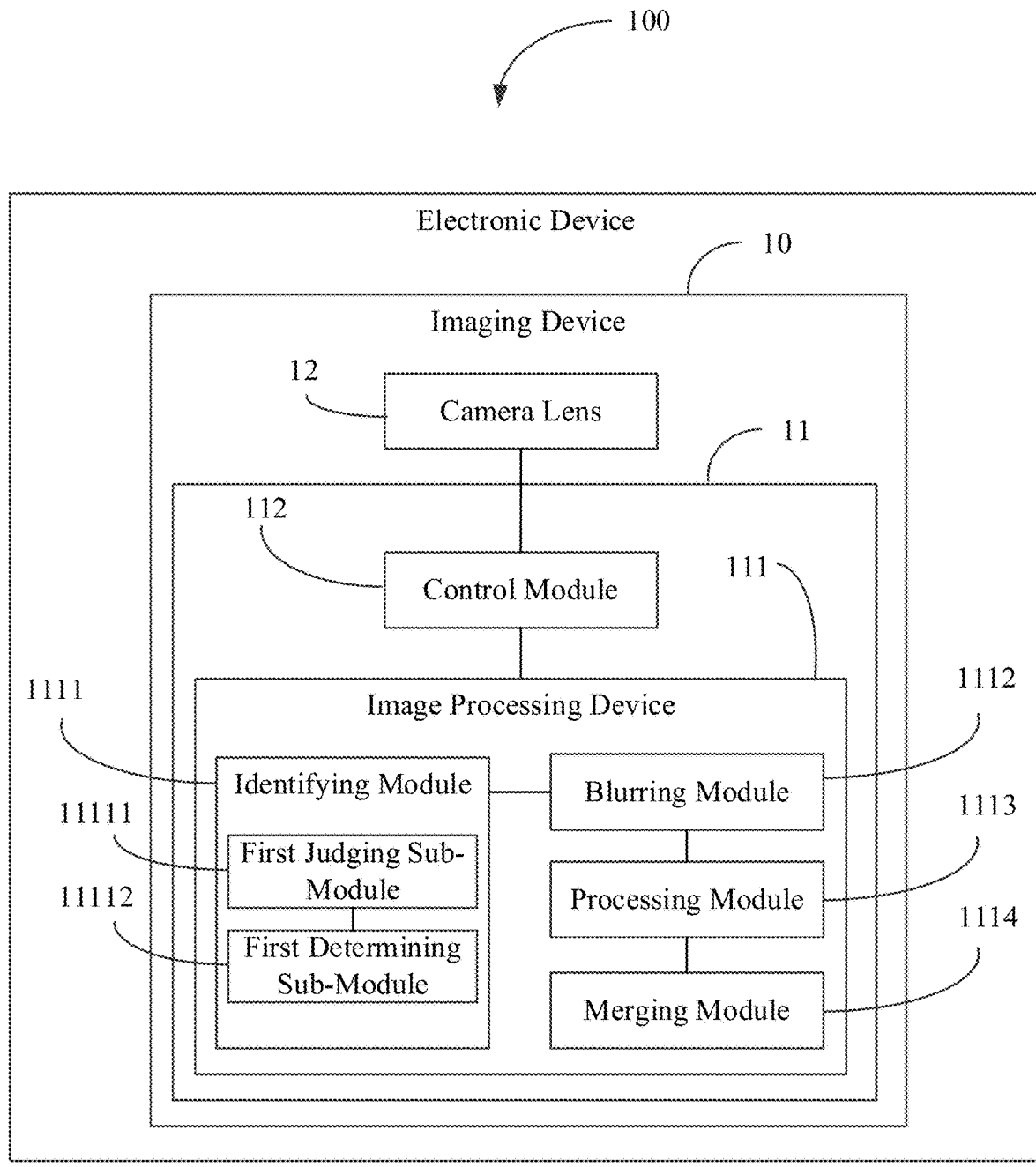
FIG. 16 is a block diagram illustrating an electronic device of a second embodiment of the present disclosure.

Referring to FIG. 16, a second embodiment of the electronic device 100 of the present disclosure includes the imaging device 10 in accordance with the second embodiment of the imaging device 10. The electronic device 100 can be carried out by any type of terminals having a photographing function, such as cell phones, tablets, notebook computers, smartwatches, smart rings, smart helmets, smart glasses, other VR (virtual reality) wearable devices, other AR (augmented reality) wearable devices, and etc. When the number of the imaging device 10 is one, the imaging device 10 can be a front-facing camera or a rear camera. When the number of the imaging device 10 is two, the two imaging devices 10 can be the front-facing camera and the rear camera, respectively; or both of the two imaging devices 10 are front-facing cameras; or both of the two imaging devices 10 are rear cameras. When the number of the imaging device 10 is greater than two, the imaging device 10 can be a camera deployed at any position, such as a top camera, a bottom camera, and a lateral camera except the front-facing camera and the rear camera.

In the image processing method, the image processing device 111, the control method, the control device 11, the imaging device 10, and the electronic device 100 in accordance with the second embodiment of the present disclosure, two images are photographed, one is the focused image, the other one is the out-of-focus image, the material portion of the out-of-focus image corresponding to the overexposed portion of the focused image is extracted and then merged into the blurred focused image to obtain a merged image having a real flare effect. The flare effect is excellent.

Figure 17:
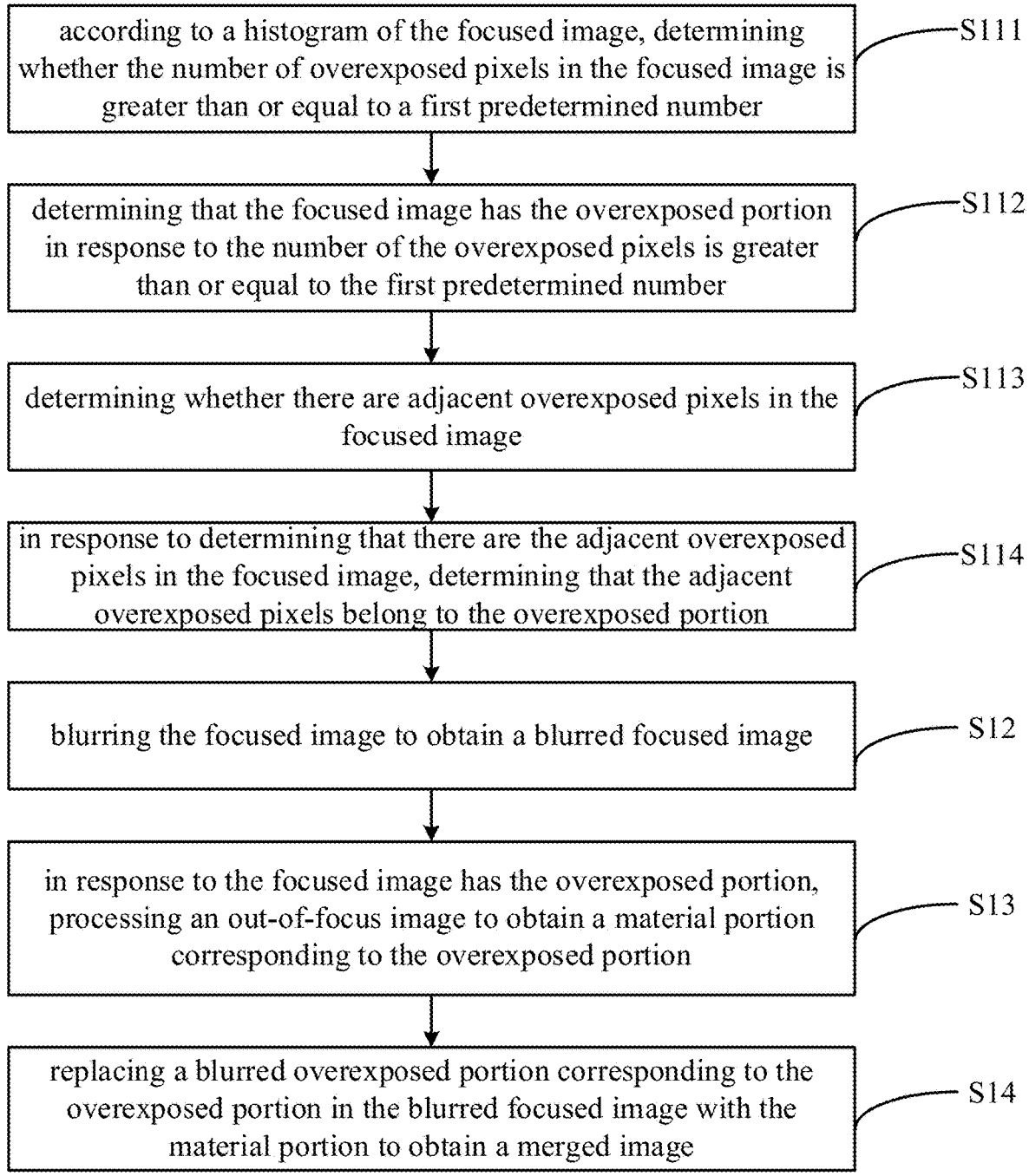
FIG. 17 is a flowchart of an image processing method of a third embodiment of the present disclosure.

Referring to FIG. 17, a third embodiment of the image processing method of the present disclosure is substantially the same as the first embodiment of the image processing method, but identifying whether the focused image has the overexposed portion at the focus state further includes the following actions at blocks.

At Block S111, whether the number of overexposed pixels in the focused image is greater than or equal to a first predetermined number is determined according to a histogram of the focused image. The pixel values of the overexposed pixels are greater than or equal to a predetermined pixel value.

At Block S112, in response to the number of the overexposed pixels is greater than or equal to the first predetermined number, it is determined that the focused image has the overexposed portion.

At Block S113, whether there are adjacent overexposed pixels in the focused image is determined by determining whether a number of the adjacent overexposed pixels is greater than or equal to a second predetermined number.

At Block S114, in response to determining that there are the adjacent overexposed pixels in the focused image, it is determined that the adjacent overexposed pixels belong to the overexposed portion.

Figure 18:
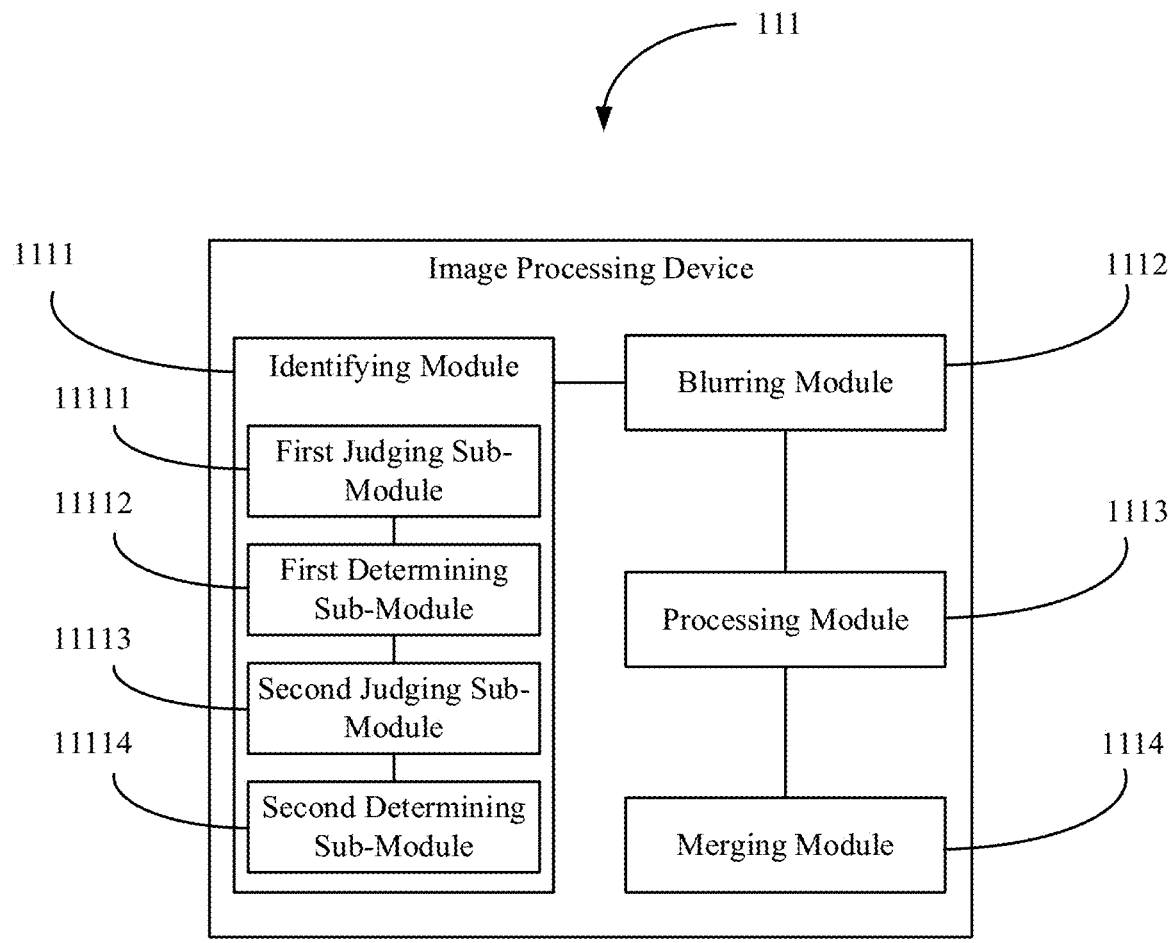
FIG. 18 is a block diagram illustrating an image processing device of a third embodiment of the present disclosure.

Referring to FIG. 18, the third embodiment of the image processing method can be implemented by a third embodiment of the image processing device 111 of the present disclosure. The image processing device 111 in accordance with the third embodiment of the image processing device 111 of the present disclosure has a structure substantially the same as the first embodiment of the image processing device 111, and their difference is that the identifying module 1111 of the image processing device 111 of the third embodiment includes a first judging sub-module 11111, a first determining sub-module 11112, a second judging sub-module 11113, and a second determining sub-module 11114, which are configured to execute actions at Blocks S111, S112, S113, and S114. That is, the first judging sub-module 1111 is configured to determine whether the number of overexposed pixels in the focused image is greater than or equal to a first predetermined number according to a histogram of the focused image. The pixel values of the overexposed pixels are greater than or equal to a predetermined pixel value. The first determining sub-module 11112 is configured to determine that the focused image has the overexposed portion in response to the number of the overexposed pixels is greater than or equal to the first predetermined number. The second judging sub-module 11113 is configured to determine whether there are adjacent overexposed pixels in the focused image by determining whether a number of the adjacent overexposed pixels is greater than or equal to a second predetermined number. The second determining sub-module 11114 is configured to determine that the adjacent overexposed pixels belong to the overexposed portion in response to determining that there are the adjacent overexposed pixels in the focused image.

The second predetermined number should be smaller than the first predetermined number since the first predetermined number may include noise points, or even the focused image may include a plurality of adjacent overexposed pixels, for example, there are a plurality of light sources with divergent light rays, which together contributes to the overexposed portion.

Referring to FIG. 12, generally speaking, a pixel value (gray value) is increased from left to right along a horizontal axis of the histogram of the focused image, and the number of pixels of a certain pixel value (gray value) is increased from bottom to top along a vertical axis of the histogram of the focused image. A range of the pixel value (gray value) is between 0 to 255, that is, from black to white. The higher a peak, the larger the number of pixels of a given pixel value (gray value).

The first predetermined number and the second predetermined number should be the number of pixels close to the right boundary of the histogram, that is, the overexposed pixels. The first predetermined number can be set as one-third of the total pixels and the second predetermined number can be set as one-fourth of the total pixels, which are only for illustration and the present disclosure is not limited thereto.

Figure 19:
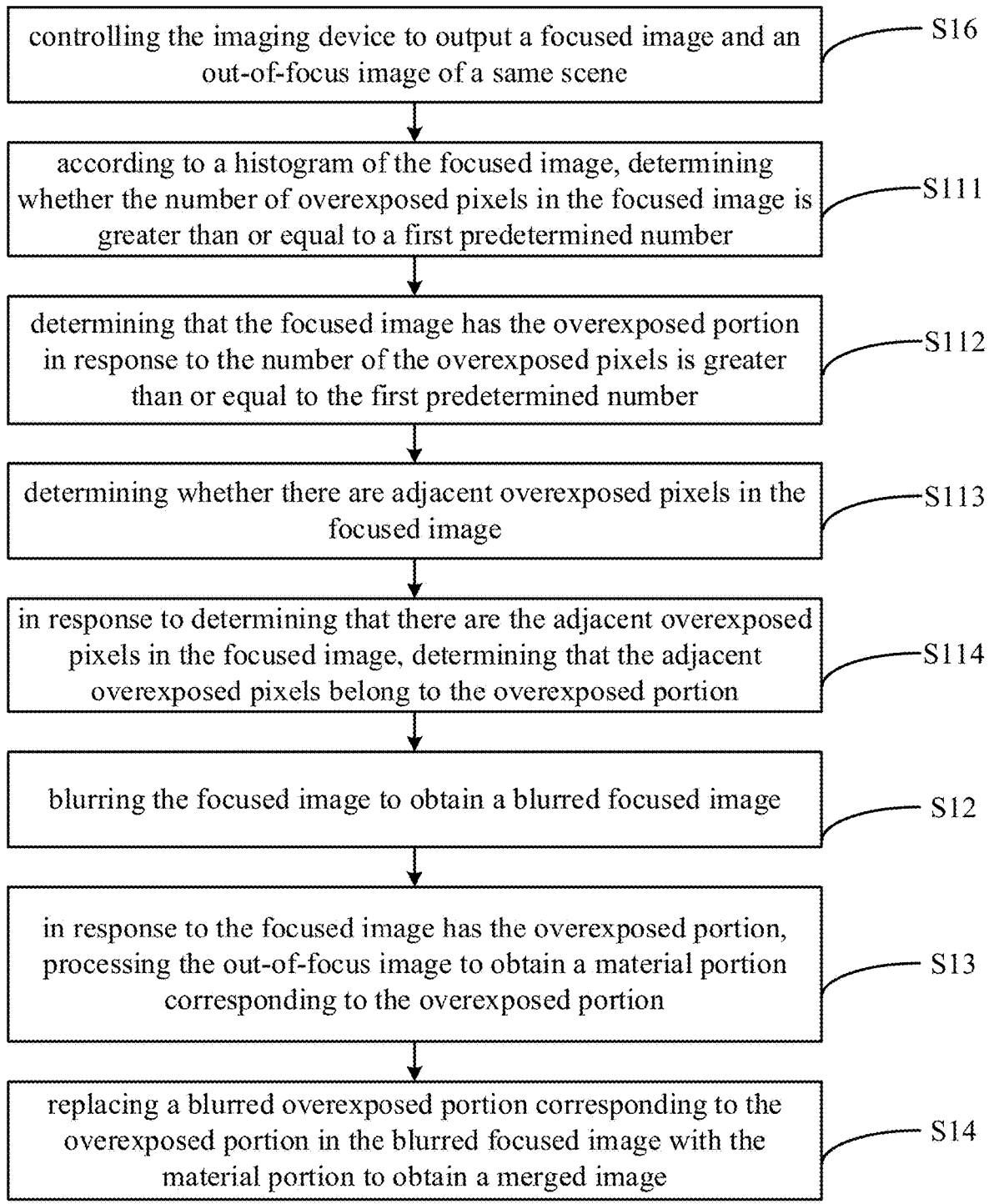
FIG. 19 is a flowchart of a control method of a third embodiment of the present disclosure.

Referring to FIG. 19, a third embodiment of the control method of the present disclosure is substantially the same as the first embodiment of the control method, but identifying whether the focused image has the overexposed portion at the focus state further includes the following actions at blocks.

At Block S111, whether the number of overexposed pixels in the focused image is greater than or equal to a first predetermined number is determined according to a histogram of the focused image. The pixel values of the overexposed pixels are greater than or equal to a predetermined pixel value.

At Block S112, in response to the number of the overexposed pixels is greater than or equal to the first predetermined number, it is determined that the focused image has the overexposed portion.

At Block S113, whether there are adjacent overexposed pixels in the focused image is determined by determining whether a number of the adjacent overexposed pixels is greater than or equal to a second predetermined number.

At Block S114, in response to determining that there are the adjacent overexposed pixels in the focused image, it is determined that the adjacent overexposed pixels belong to the overexposed portion.

Figure 20:
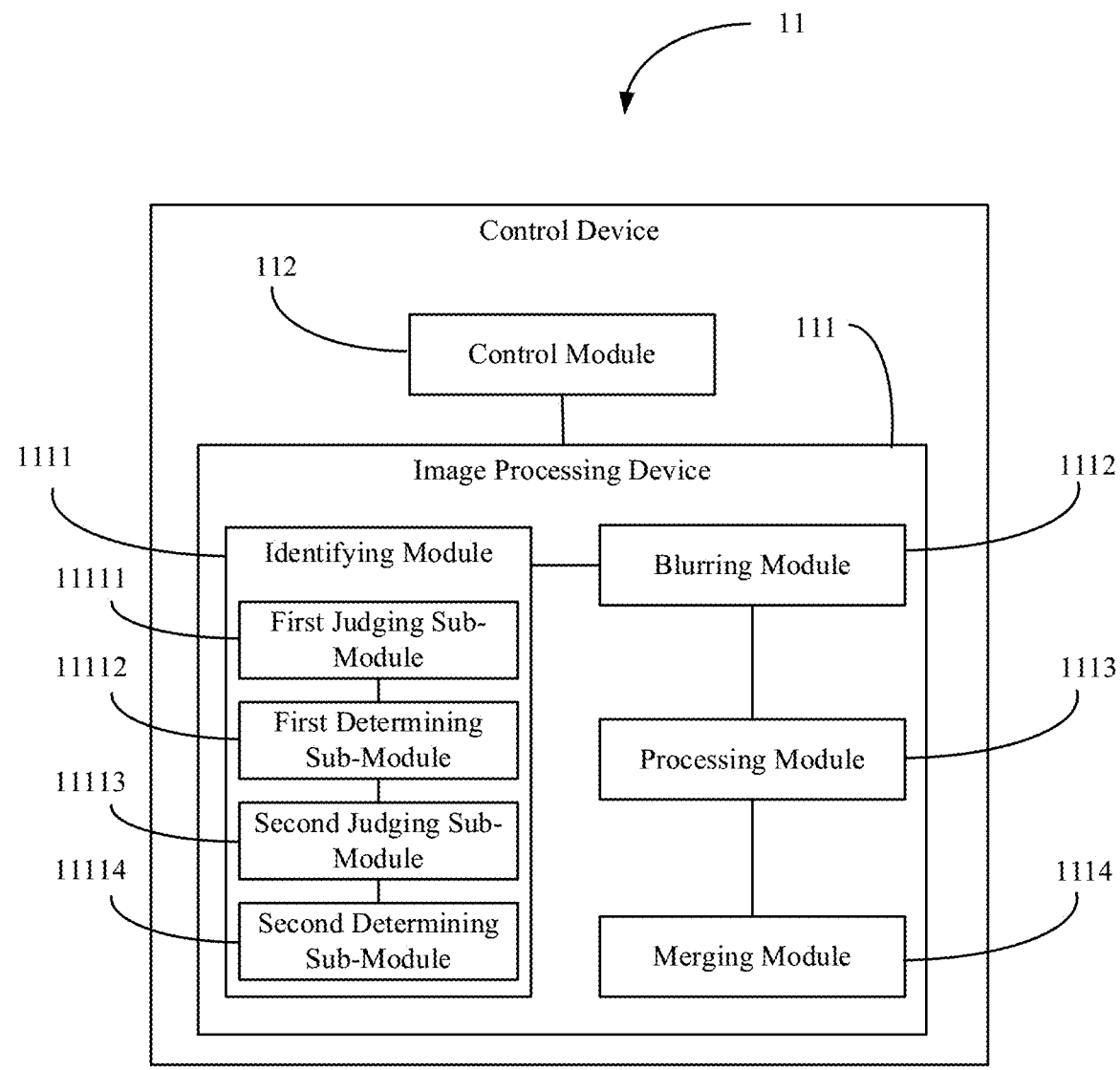
FIG. 20 is a block diagram illustrating a control device of a third embodiment of the present disclosure.

Referring to FIG. 20, the third embodiment of the control method can be implemented by a third embodiment of the control device 11 of the present disclosure. The control device 11 in accordance with the third embodiment of the control device 11 of the present disclosure has a structure substantially the same as the first embodiment of the control device 11, and their difference is that the identifying module 1111 of the control device 11 of the third embodiment includes a first judging sub-module 11111, a first determining sub-module 11112, a second judging sub-module 11113, and a second determining sub-module 11114, which are configured to execute actions at Blocks S111, S112, S113, and S114. That is, the first judging sub-module 1111 is configured to determine whether the number of overexposed pixels in the focused image is greater than or equal to a first predetermined number according to a histogram of the focused image. The pixel values of the overexposed pixels are greater than or equal to a predetermined pixel value. The first determining sub-module 11112 is configured to determine that the focused image has the overexposed portion in response to the number of the overexposed pixels is greater than or equal to the first predetermined number. The second judging sub-module 11113 is configured to determine whether there are adjacent overexposed pixels in the focused image by determining whether a number of the adjacent overexposed pixels is greater than or equal to a second predetermined number. The second determining sub-module 11114 is configured to determine that the adjacent overexposed pixels belong to the overexposed portion in response to determining that there are the adjacent overexposed pixels in the focused image.

The second predetermined number should be smaller than the first predetermined number since the first predetermined number may include noise points, or even the focused image may include a plurality of adjacent overexposed pixels, for example, there are a plurality of light sources with divergent light rays, which together contributes to the overexposed portion.

Referring to FIG. 12, generally speaking, a pixel value (gray value) is increased from left to right along a horizontal axis of the histogram of the focused image, and the number of pixels of a certain pixel value (gray value) is increased from bottom to top along a vertical axis of the histogram of the focused image. A range of the pixel value (gray value) is between 0 to 255, that is, from black to white. The higher a peak, the larger the number of pixels of a given pixel value (gray value).

The first predetermined number and the second predetermined number should be the number of pixels close to the right boundary of the histogram, that is, the overexposed pixels. The first predetermined number can be set as one-third of the total pixels and the second predetermined number can be set as one-fourth of the total pixels, which are only for illustration and the present disclosure is not limited thereto.

Figure 21:
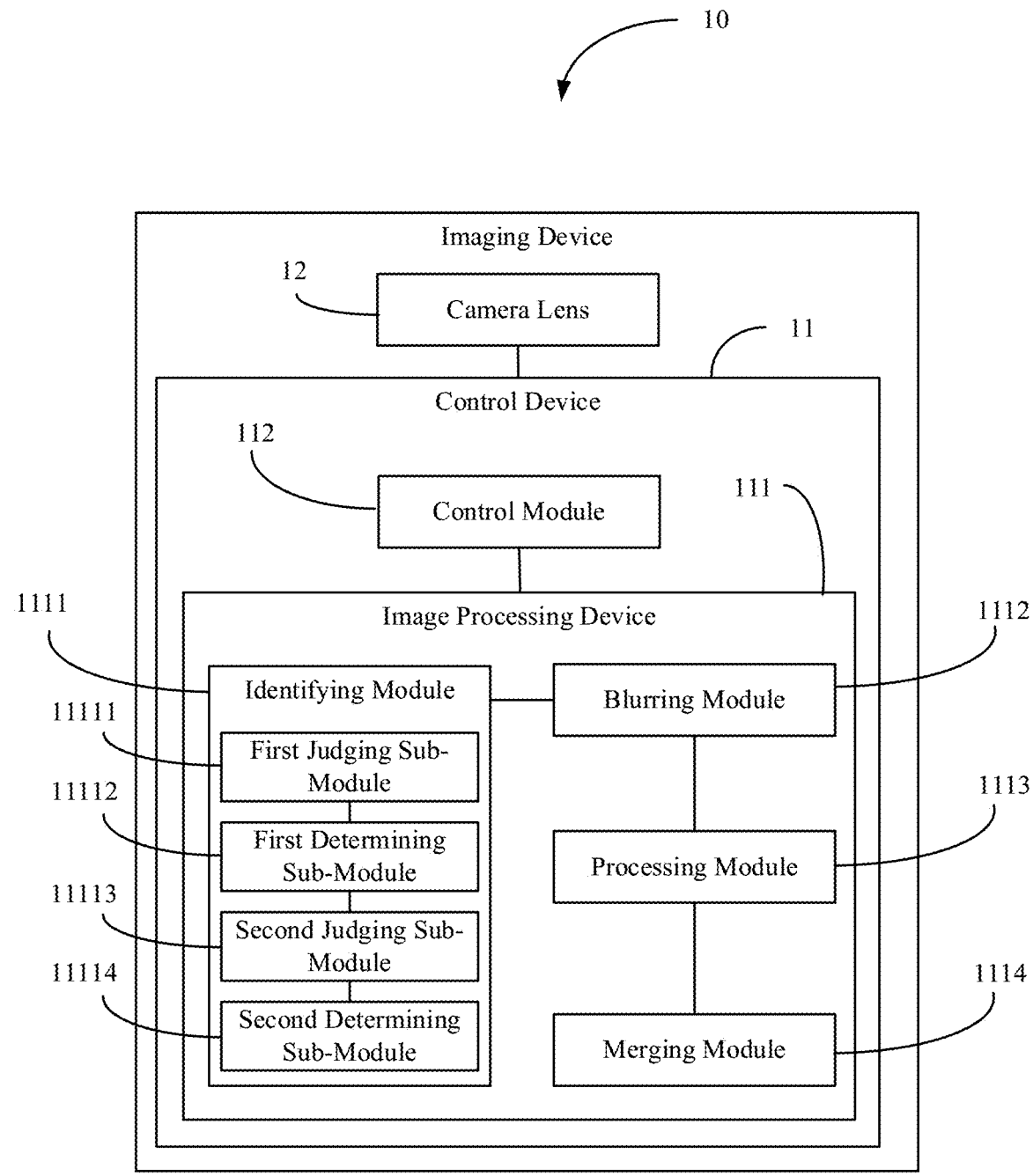
FIG. 21 is a block diagram illustrating an imaging device of a third embodiment of the present disclosure.

Referring to FIG. 21, a third embodiment of the imaging device 10 of the present disclosure includes the control device 11 in accordance with the third embodiment of the control device 11; and the camera lens 12 electrically connected to the control device 11. In other words, the imaging device 10 of the present embodiment includes the image processing device 111 in accordance with the third embodiment of the image processing device 111; the control module 112; and the camera lens 12. The control module 112, the camera lens 12, and the image processing device 111 are all electrically connected to one another.

Figure 22:
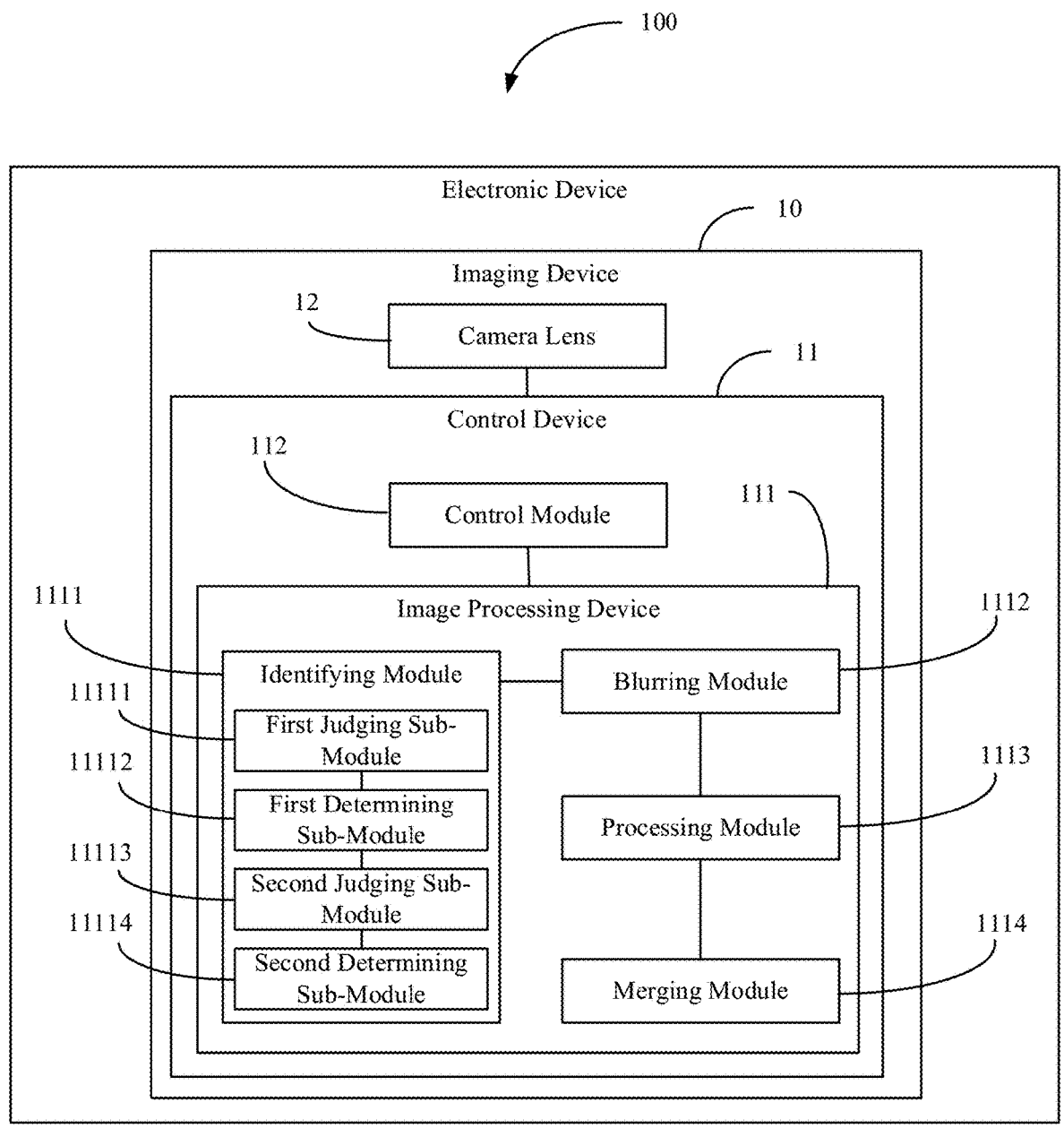
FIG. 22 is a block diagram illustrating an electronic device of a third embodiment of the present disclosure.

Referring to FIG. 22, a third embodiment of the electronic device 100 of the present disclosure includes the imaging device 10 in accordance with the third embodiment of the imaging device 10. The electronic device 100 can be carried out by any type of terminals having a photographing function, such as cell phones, tablets, notebook computers, smartwatches, smart rings, smart helmets, smart glasses, other VR (virtual reality) wearable devices, other AR (augmented reality) wearable devices, and etc. When the number of the imaging device 10 is one, the imaging device 10 can be a front-facing camera or a rear camera. When the number of the imaging device 10 is two, the two imaging devices 10 can be the front-facing camera and the rear camera, respectively; or both of the two imaging devices 10 are front-facing cameras; or both of the two imaging devices 10 are rear cameras. When the number of the imaging device 10 is greater than two, the imaging device 10 can be a camera deployed at any position, such as a top camera, a bottom camera, and a lateral camera except the front-facing camera and the rear camera.

In the image processing method, the image processing device 111, the control method, the control device 11, the imaging device 10, and the electronic device 100 in accordance with the third embodiment of the present disclosure, two images are photographed, one is the focused image, the other one is the out-of-focus image, the material portion of the out-of-focus image corresponding to the overexposed portion of the focused image is extracted and then merged into the blurred focused image to obtain a merged image having a real flare effect. The flare effect is excellent.

Figure 23:
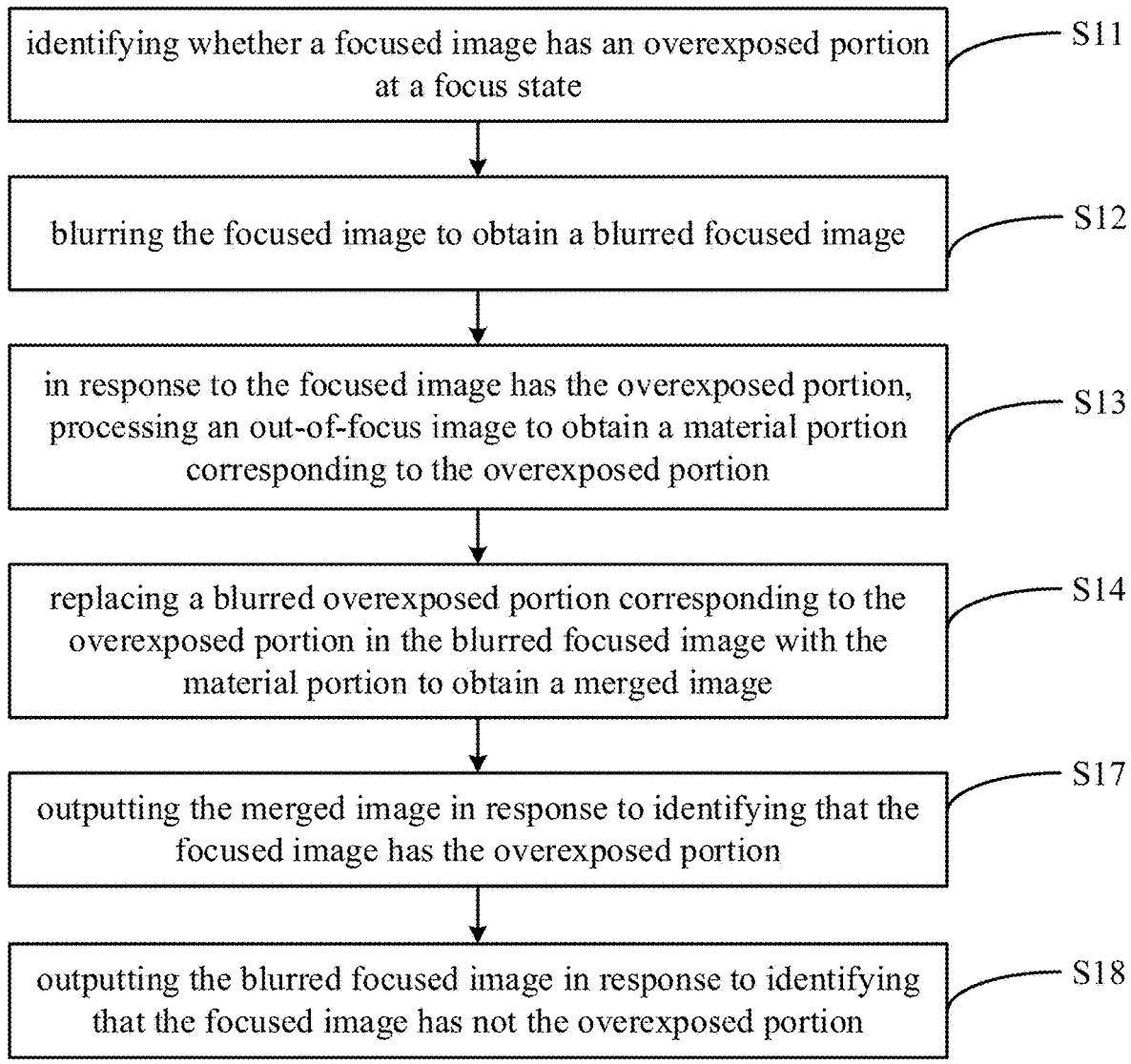
FIG. 23 is a flowchart of an image processing method of a fourth embodiment of the present disclosure.

Referring to FIG. 23, a fourth embodiment of the image processing method of the present disclosure is substantially the same as the first embodiment of the image processing method, but the fourth embodiment of the image processing method further includes the following actions at blocks.

At Block S17, the merged image is outputted in response to identifying that the focused image has the overexposed portion.

At Block S18, the blurred focused image is outputted in response to identifying that the focused image has not the overexposed portion.

Figure 24:
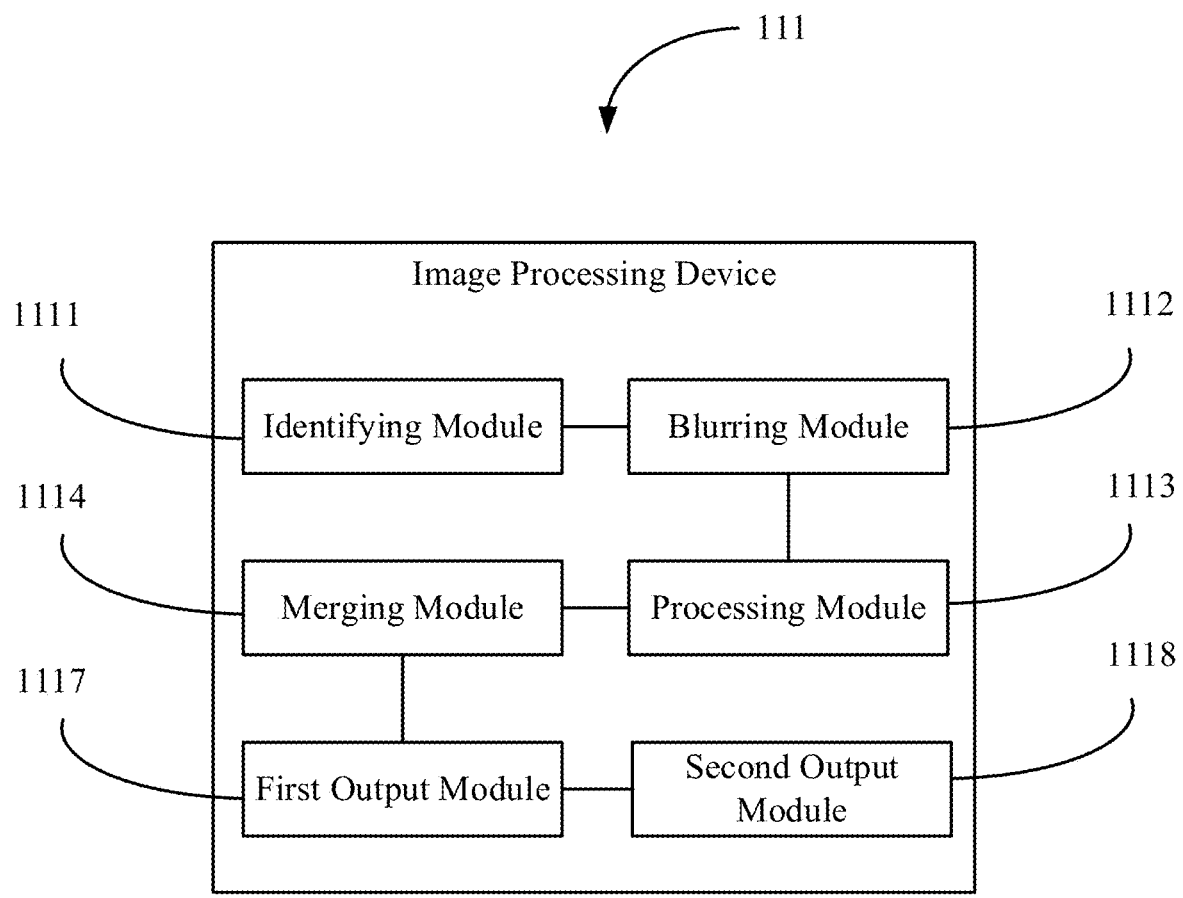
FIG. 24 is a block diagram illustrating an image processing device of a fourth embodiment of the present disclosure.

Referring to FIG. 24, the fourth embodiment of the image processing method can be implemented by a fourth embodiment of the image processing device 111 of the present disclosure. The image processing device 111 in accordance with the fourth embodiment of the image processing device 111 of the present disclosure has a structure substantially the same as the first embodiment of the image processing device 111, and their difference is that the image processing device 111 of the fourth embodiment further includes a first output module 1117 and a second output module 1118, which are configured to execute actions at Blocks S17 and S18. That is, the first output module 1117 is configured to output the merged image in response to identifying that the focused image has the overexposed portion. The second output module 1118 is configured to output the blurred focused image in response to identifying that the focused image has not the overexposed portion.

Figure 25:
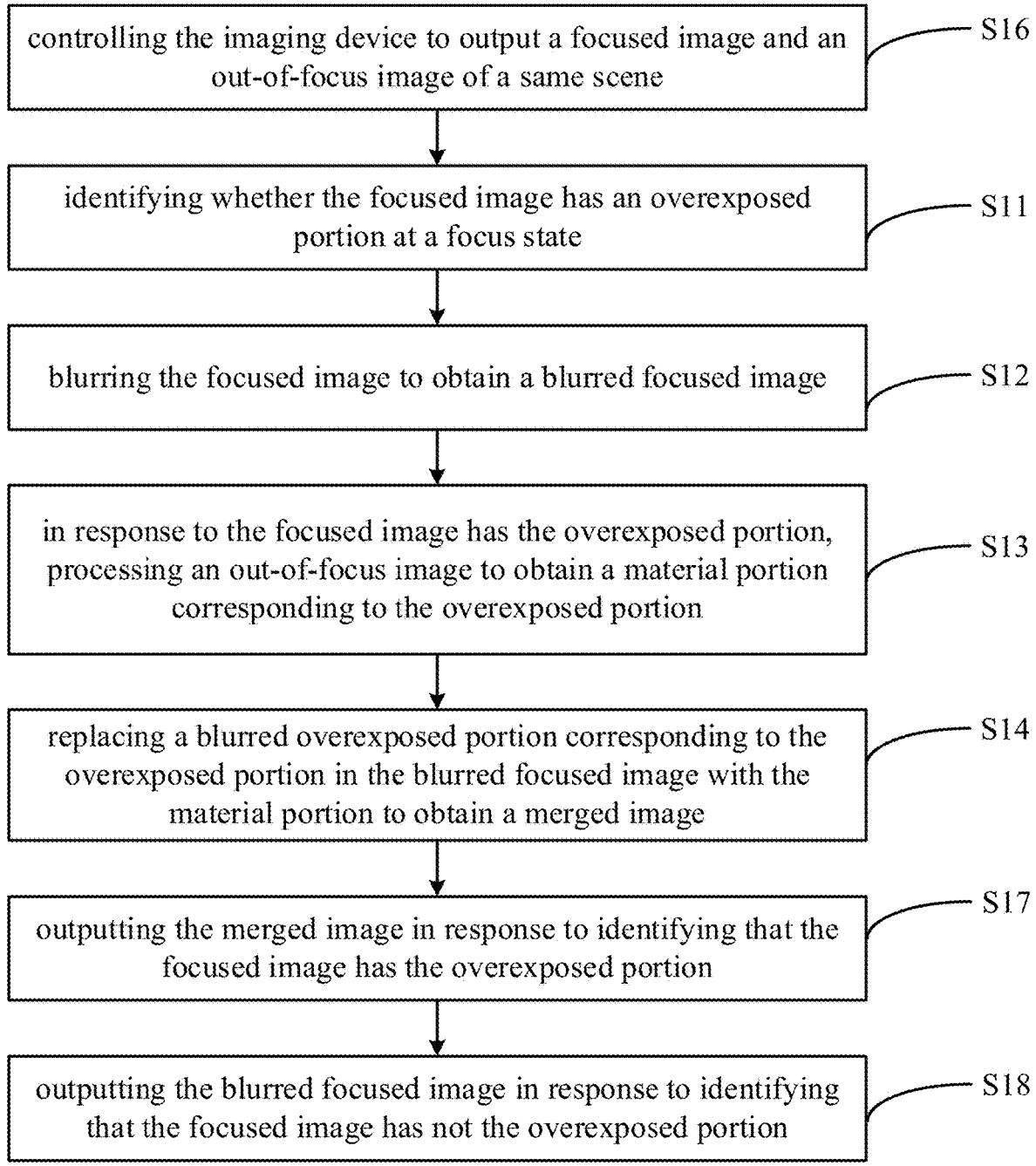
FIG. 25 is a flowchart of a control method of a fourth embodiment of the present disclosure.

Referring to FIG. 25, a fourth embodiment of the control method of the present disclosure is substantially the same as the first embodiment of the control method, but the fourth embodiment of the control method further includes the following actions at blocks.

At Block S17, the merged image is outputted in response to identifying that the focused image has the overexposed portion.

At Block S18, the blurred focused image is outputted in response to identifying that the focused image has not the overexposed portion.

Figure 26:
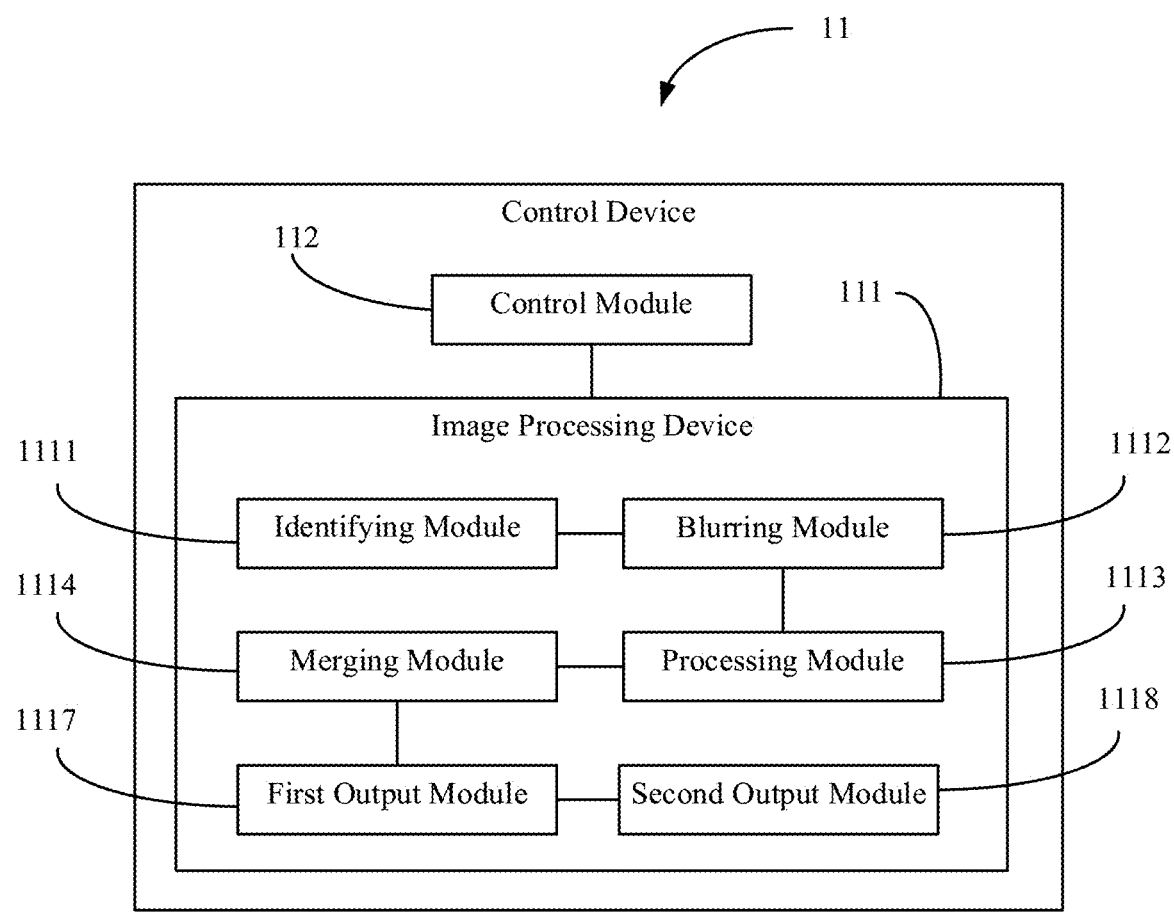
FIG. 26 is a block diagram illustrating a control device of a fourth embodiment of the present disclosure.

Referring to FIG. 26, the fourth embodiment of the control method can be implemented by a fourth embodiment of the control device 11 of the present disclosure. The control device 11 in accordance with the fourth embodiment of the control device 11 of the present disclosure has a structure substantially the same as the first embodiment of the control device 11, and their difference is that the control device 11 of the fourth embodiment further includes a first output module 1117 and a second output module 1118, which are configured to execute actions at Blocks S17 and S18. That is, the first output module 1117 is configured to output the merged image in response to identifying that the focused image has the overexposed portion. The second output module 1118 is configured to output the blurred focused image in response to identifying that the focused image has not the overexposed portion.

Figure 27:
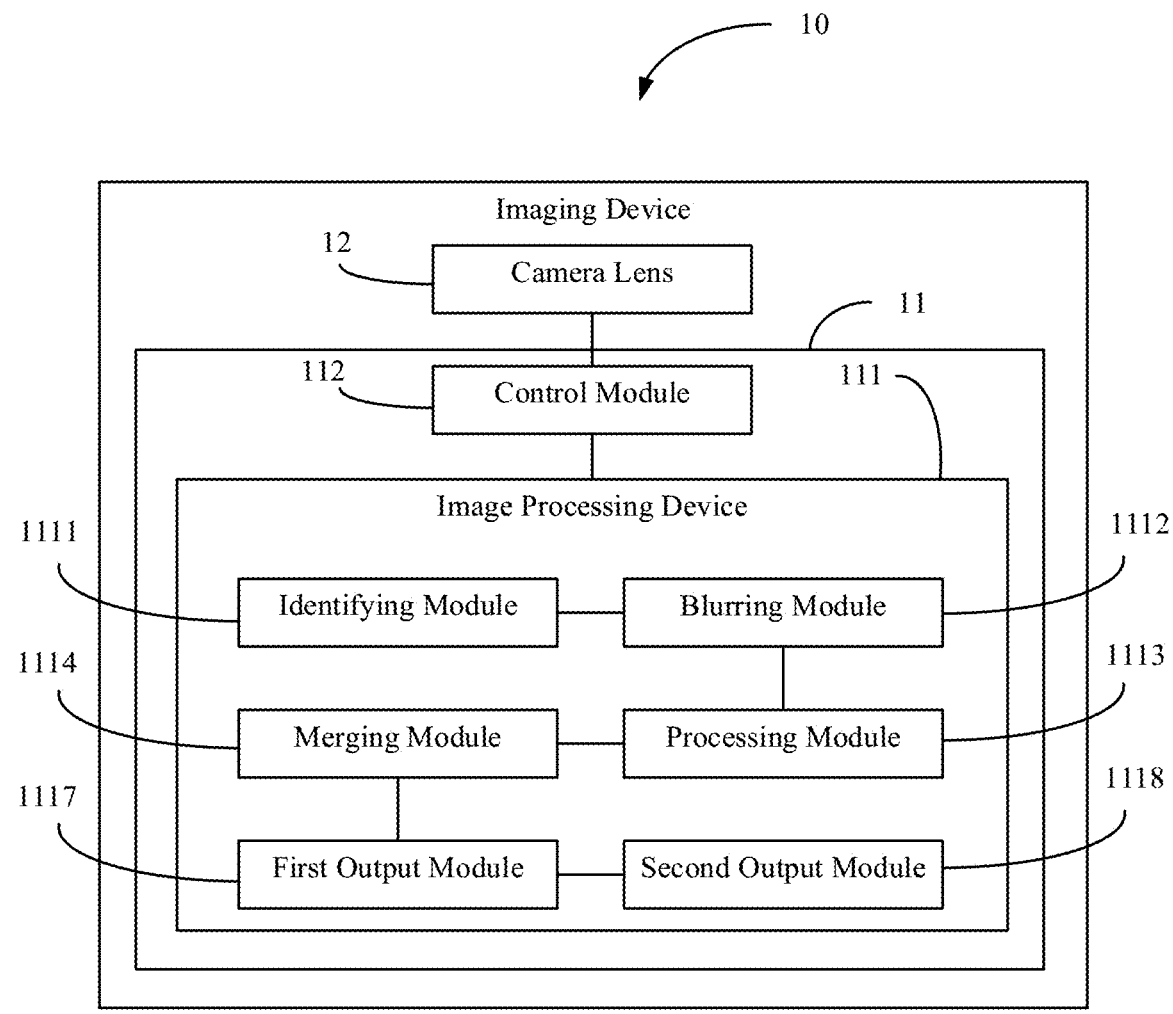
FIG. 27 is a block diagram illustrating an imaging device of a fourth embodiment of the present disclosure.

Referring to FIG. 27, a fourth embodiment of the imaging device 10 of the present disclosure includes the control device 11 in accordance with the fourth embodiment of the control device 11; and the camera lens 12 electrically connected to the control device 11. In other words, the imaging device 10 of the present embodiment includes the image processing device 111 in accordance with the fourth embodiment of the image processing device 111; the control module 112; and the camera lens 12. The control module 112, the camera lens 12, and the image processing device 111 are all electrically connected to one another.

Figure 28:
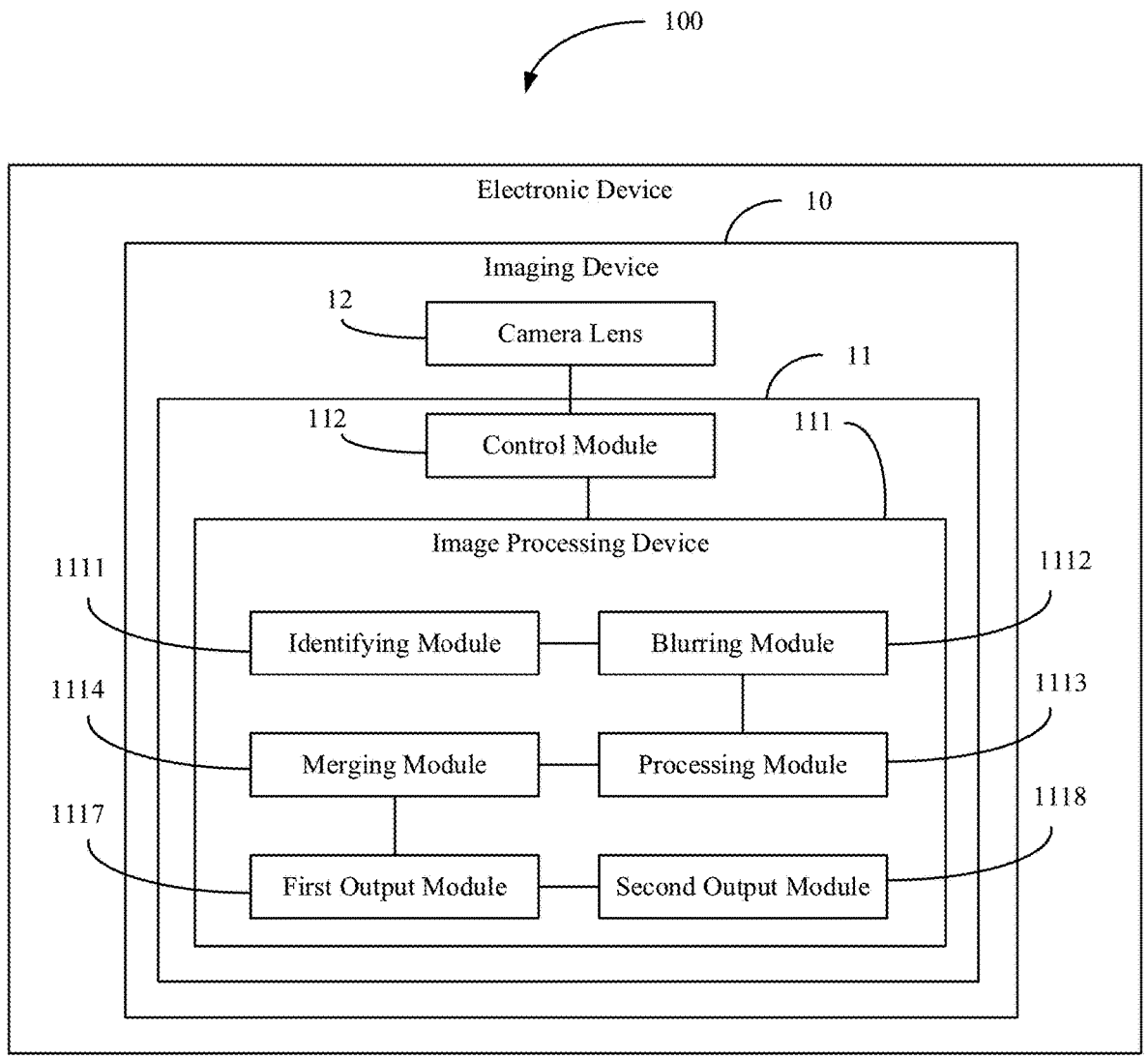
FIG. 28 is a block diagram illustrating an electronic device of a fourth embodiment of the present disclosure.

Referring to FIG. 28, a fourth embodiment of the electronic device 100 of the present disclosure includes the imaging device 10 in accordance with the fourth embodiment of the imaging device 10. The electronic device 100 can be carried out by any type of terminals having a photographing function, such as cell phones, tablets, notebook computers, smartwatches, smart rings, smart helmets, smart glasses, other VR (virtual reality) wearable devices, other AR (augmented reality) wearable devices, and etc. When the number of the imaging device 10 is one, the imaging device 10 can be a front-facing camera or a rear camera. When the number of the imaging device 10 is two, the two imaging devices 10 can be the front-facing camera and the rear camera, respectively; or both of the two imaging devices 10 are front-facing cameras; or both of the two imaging devices 10 are rear cameras. When the number of the imaging device 10 is greater than two, the imaging device 10 can be a camera deployed at any position, such as a top camera, a bottom camera, and a lateral camera except the front-facing camera and the rear camera.

In the image processing method, the image processing device 111, the control method, the control device 11, the imaging device 10, and the electronic device 100 in accordance with the fourth embodiment of the present disclosure, two images are photographed, one is the focused image, the other one is the out-of-focus image, the material portion of the out-of-focus image corresponding to the overexposed portion of the focused image is extracted and then merged into the blurred focused image to obtain a merged image having a real flare effect. The flare effect is excellent.

It can be understood that Blocks S17 and S18 are also applicable to the second embodiment of the image processing method and the second embodiment of the control method. Correspondingly, the first output module 1117 and the second output module 1118 are also applicable to the second embodiment of the image processing device, the second embodiment of the control device, the second embodiment of the image processing device, and the second embodiment of the electronic device. Blocks S17 and S18 are also applicable to the third embodiment of the image processing method and the third embodiment of the control method. Correspondingly, the first output module 1117 and the second output module 1118 are also applicable to the third embodiment of the image processing device, the third embodiment of the control device, the third embodiment of the image processing device, and the third embodiment of the electronic device.

Figure 29:
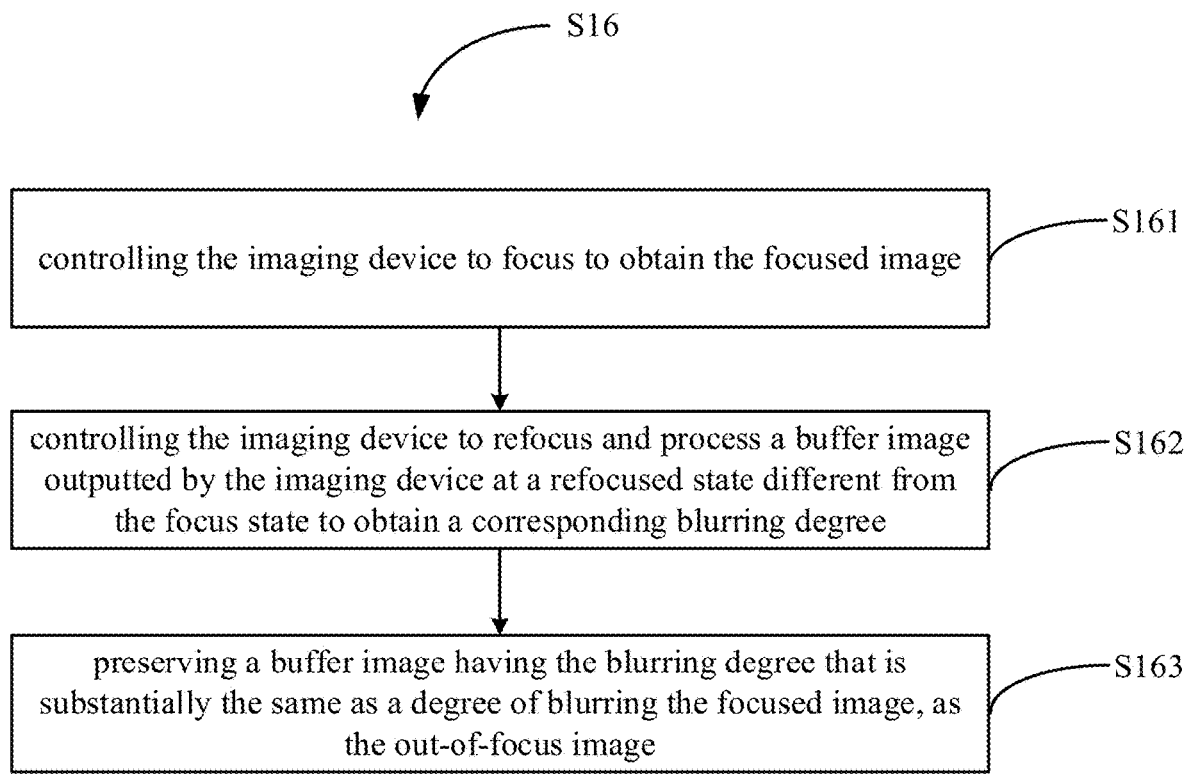
FIG. 29 is a flowchart of controlling an imaging device to output a focused image and an out-of-focus image of a same scene in accordance with some embodiments of the present disclosure.

Referring to FIG. 29, in the aforesaid control method according to the first to the fourth embodiments, controlling the imaging device 10 to output the focused image and the out-of-focus image of the same scene (Block S16) may include the following actions at blocks.

At Block S161, the imaging device is controlled to focus to obtain the focused image.

At Block S162, the imaging device is controlled to refocus and process a buffer image outputted by the imaging device at a refocused state different from the focus state to obtain a corresponding blurring degree.

At Block S163, the buffer image having the blurring degree that is substantially the same as a degree of blurring the focused image is preserved as the out-of-focus image.

Figure 30:
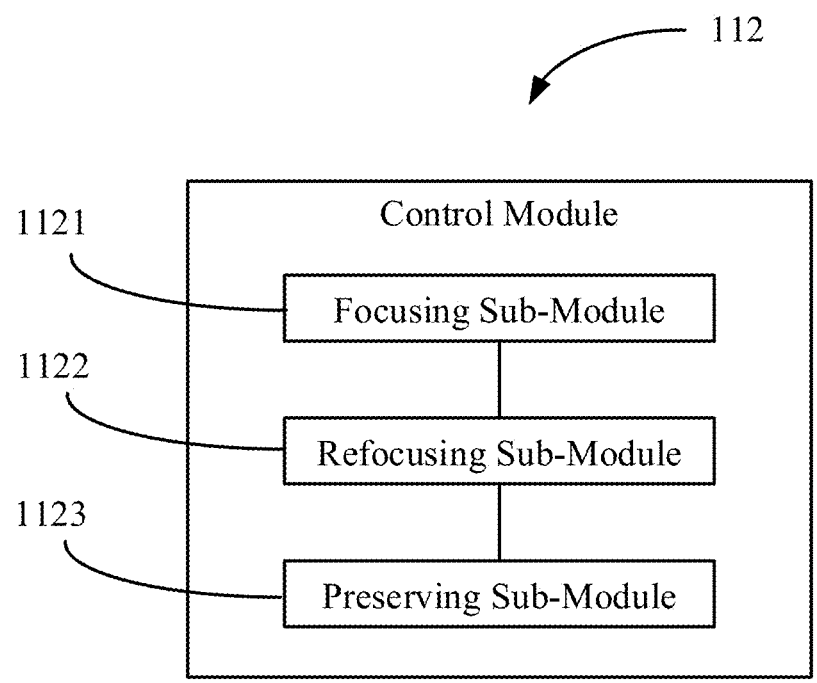
FIG. 30 is a block diagram illustrating a control module in accordance with some embodiments of the present disclosure.

Correspondingly, referring to FIG. 30, the control module 112 of the control device 11 according to the first to the fourth embodiments includes a focusing sub-module 1121, a refocusing sub-module 1122, and a preserving sub-module 1123, which are configured to execute actions at Blocks S161, S162, and S163. That is, the focusing sub-module 1121 is configured to control the imaging device to focus to obtain the focused image. The refocusing sub-module 1122 is configured to control the imaging device to refocus and process a buffer image outputted by the imaging device at a refocused state different from the focus state to obtain a corresponding blurring degree. The preserving sub-module 1123 is configured to preserve the buffer image having the blurring degree that is substantially the same as a degree of blurring the focused image, as the out-of-focus image.

Correspondingly, the control module 112 of the imaging device 10 and the electronic device 100 according to the first to the fourth embodiments may also include the focusing sub-module 1121, the refocusing sub-module 1122, and the preserving sub-module 1123, structures and functions of which are the same as above and are not detailed herein.

Figure 31:
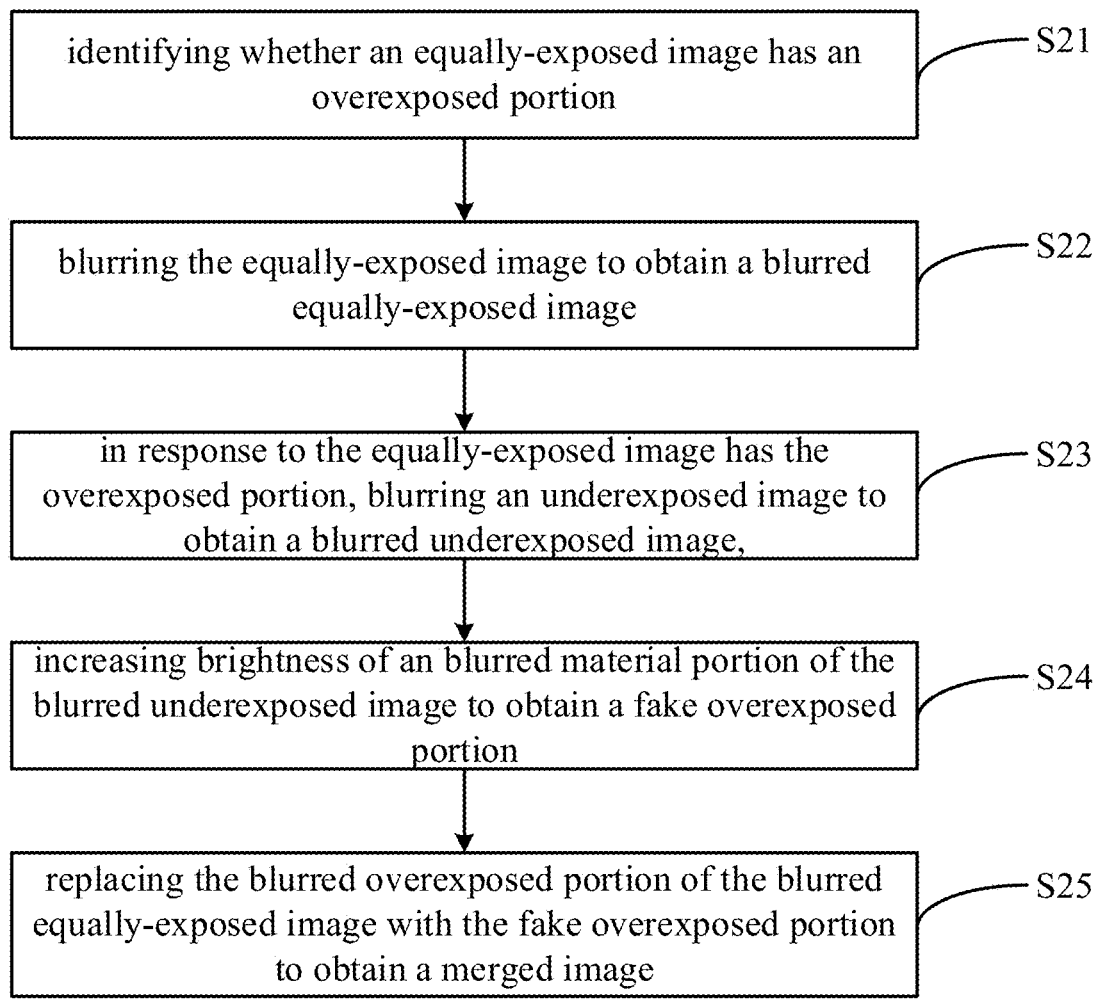
FIG. 31 is a flowchart of an image processing method of a fifth embodiment of the present disclosure.

In a situation that the first image is an equally-exposed image and the second image is an underexposed image, referring to FIG. 31, a fifth embodiment of the image processing method of the present disclosure includes the following actions at blocks.

At Block S21, an equally-exposed image is obtained by exposure using a first exposure value matching luminous environment, and whether the equally-exposed image has the overexposed portion is identified.

At Block S22, the equally-exposed image is blurred to obtain a blurred equally-exposed image. The blurred equally-exposed image includes a blurred overexposed portion corresponding to the overexposed portion.

At Block S23, in response to the equally-exposed image has the overexposed portion, an underexposed image having a same scene as the equally-exposed image is obtained by exposure using a second exposure value, and the underexposed image is blurred to obtain a blurred underexposed image, in which the underexposed image includes a material portion corresponding to the overexposed portion, the blurred underexposed image includes a blurred material portion corresponding to the overexposed portion, and the second exposure value is less than the first exposure value.

At Block S24, the brightness of the blurred material portion is increased to obtain a fake overexposed portion.

At Block S25, the blurred overexposed portion of the blurred equally-exposed image is replaced with the fake overexposed portion to obtain a merged image.

Blurring the equally-exposed image to obtain the blurred equally-exposed image can be carried out by a Gaussian blur algorithm; and/or blurring the underexposed image to obtain the blurred underexposed image can be carried out by the Gaussian blur algorithm. Increasing the brightness of the blurred material portion to obtain the fake overexposed portion may be implemented by increasing the brightness of the blurred underexposed image by N times to obtain the fake overexposed portion, where N is a ratio of the first exposure value to the second exposure value.

Figure 32:
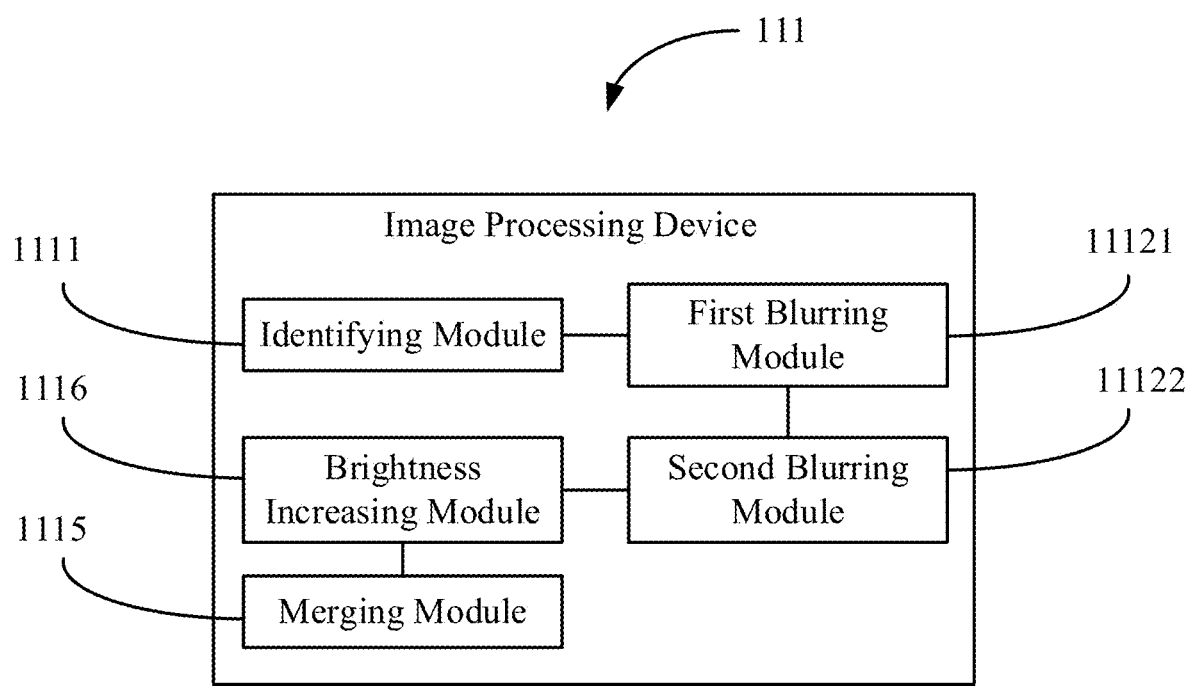
FIG. 32 is a block diagram illustrating an image processing device of a fifth embodiment of the present disclosure.
Figure 33:
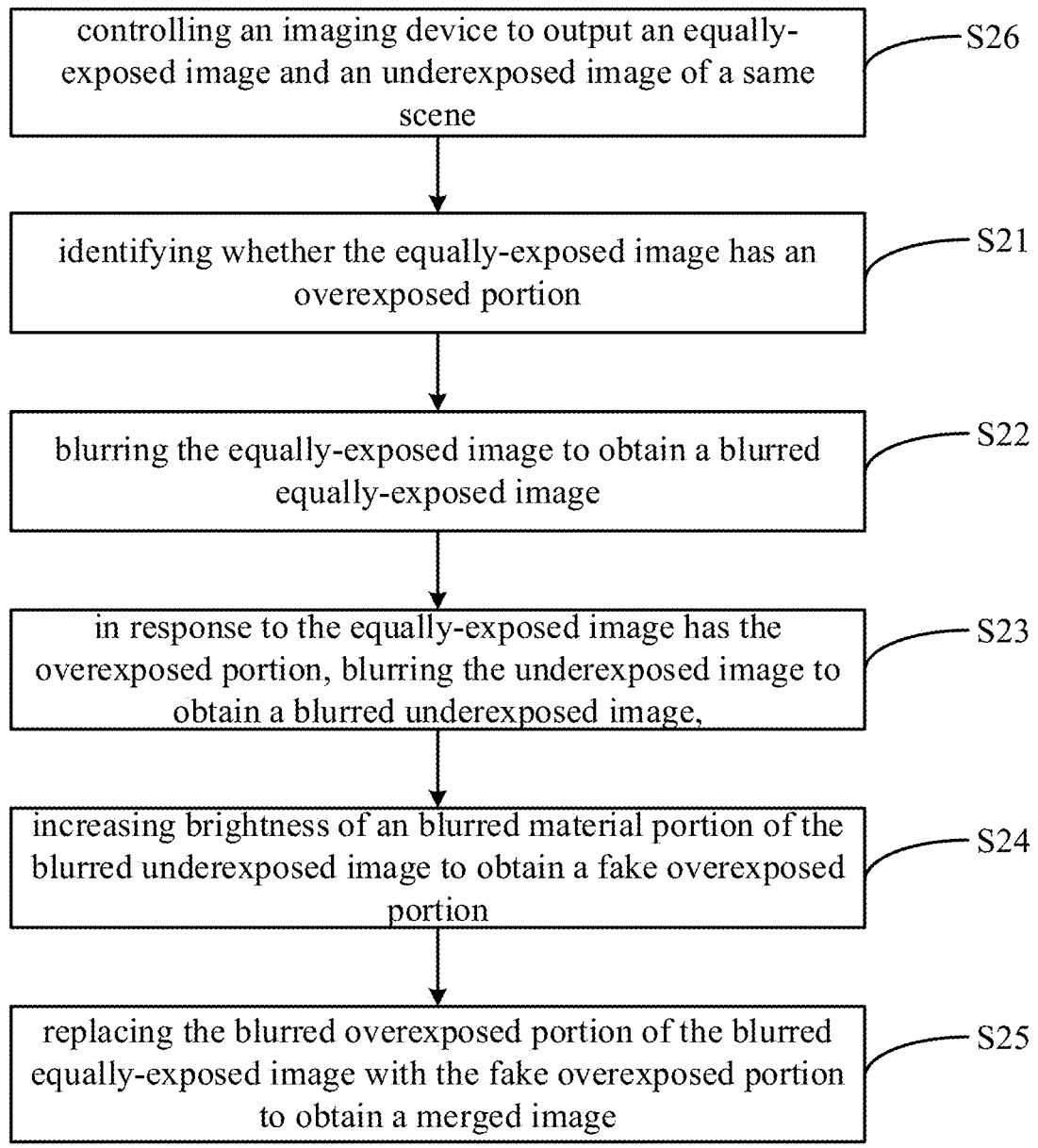
FIG. 33 is a flowchart of a control method of a fifth embodiment of the present disclosure.

Referring to FIG. 32, the fifth embodiment of the image processing method can be implemented by a fifth embodiment of an image processing device 111 of the present disclosure. The fifth embodiment of the image processing device 111 of the present disclosure includes an identifying module 1111, a first blurring module 11121, a second blurring module 11122, a brightness increasing module 1116, and a merging module 1115, configured to execute Blocks S21 to S25, respectively. That is, the identifying module 1111 is configured to obtain the equally-exposed image by exposure using a first exposure value matching luminous environment, and identify whether the equally-exposed image has the overexposed portion. The first blurring module 11121 is configured to blur the equally-exposed image to obtain a blurred equally-exposed image including a blurred overexposed portion corresponding to the overexposed portion. In response to the equally-exposed image has the overexposed portion, the second blurring module 11122 is configured to obtain the underexposed image having a same scene as the equally-exposed image by exposure using a second exposure value, and blur the underexposed image to obtain a blurred underexposed image, in which the underexposed image includes a material portion corresponding to the overexposed portion, the blurred underexposed image includes a blurred material portion corresponding to the overexposed portion, and the second exposure value is less than the first exposure value. The brightness increasing module 1116 is configured to increase the brightness of the blurred material portion to obtain a fake overexposed portion. The merging module 1115 is configured to replace the blurred overexposed portion of the blurred equally-exposed image with the fake overexposed portion to obtain a merged image.

The first blurring module 11121 adopts a Gaussian blur algorithm to blur the equally-exposed image to obtain the blurred equally-exposed image; and/or the second blurring module 11122 adopts the Gaussian blur algorithm to blur the underexposed image to obtain the blurred underexposed image. In increasing the brightness of the blurred material portion to obtain the fake overexposed portion, the brightness increasing module 1116 may increase the brightness of the blurred underexposed image by N times to obtain the fake overexposed portion, where N is a ratio of the first exposure value to the second exposure value.

Referring to FIGS. 33 and 35-37, a fifth embodiment of the control method of the present disclosure is utilized to control an imaging device 10. The control method includes the following actions at blocks.

At Block S26, the imaging device 10 is controlled to output an equally-exposed image and an underexposed image of a same scene.

At Block S21, an equally-exposed image is obtained by exposure using a first exposure value matching luminous environment, and whether the equally-exposed image has the overexposed portion is identified.

At Block S22, the equally-exposed image is blurred to obtain a blurred equally-exposed image. The blurred equally-exposed image includes a blurred overexposed portion corresponding to the overexposed portion.

At Block S23, in response to the equally-exposed image has the overexposed portion, an underexposed image having a same scene as the equally-exposed image is obtained by exposure using a second exposure value, and the underexposed image is blurred to obtain a blurred underexposed image, in which the underexposed image includes a material portion corresponding to the overexposed portion, the blurred underexposed image includes a blurred material portion corresponding to the overexposed portion, and the second exposure value is less than the first exposure value.

At Block S24, the brightness of the blurred material portion is increased to obtain a fake overexposed portion.

At Block S25, the blurred overexposed portion of the blurred equally-exposed image is replaced with the fake overexposed portion to obtain a merged image.

Blurring the equally-exposed image to obtain the blurred equally-exposed image can be carried out by a Gaussian blur algorithm; and/or blurring the underexposed image to obtain the blurred underexposed image can be carried out by the Gaussian blur algorithm. Increasing the brightness of the blurred material portion to obtain the fake overexposed portion may be implemented by increasing the brightness of the blurred underexposed image by N times to obtain the fake overexposed portion, where N is a ratio of the first exposure value to the second exposure value.

Figure 34:
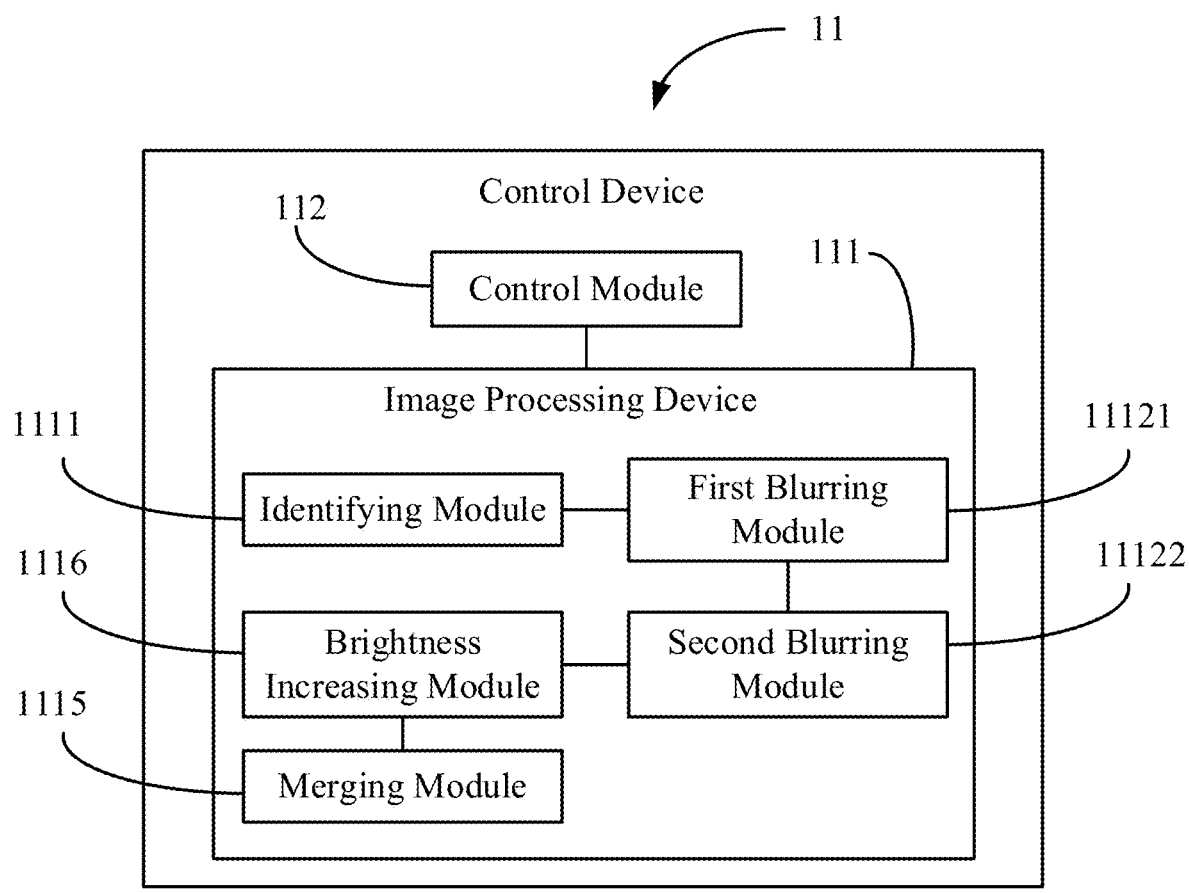
FIG. 34 is a block diagram illustrating a control device of a fifth embodiment of the present disclosure.

Referring to FIG. 34, the fifth embodiment of the control method can be implemented by a fifth embodiment of a control device 11 of the present disclosure. In the fifth embodiment of the control device 11 of the present disclosure, the control device 11 includes the image processing device 111 in accordance with the fifth embodiment of the image processing device 111; and a control module 112 electrically connecting to the image processing device 111. The image processing device 111 is configured to execute Blocks S21 to S25. The control module 112 is configured to execute Block S26. The structure of the image processing device 111 is described with the aforesaid fifth embodiment, and is not detailed herein. The control module 112 is configured to control the imaging device 10 (shown in FIGS. 35 to 37) to output an equally-exposed image and an underexposed image of a same scene.

Figure 35:
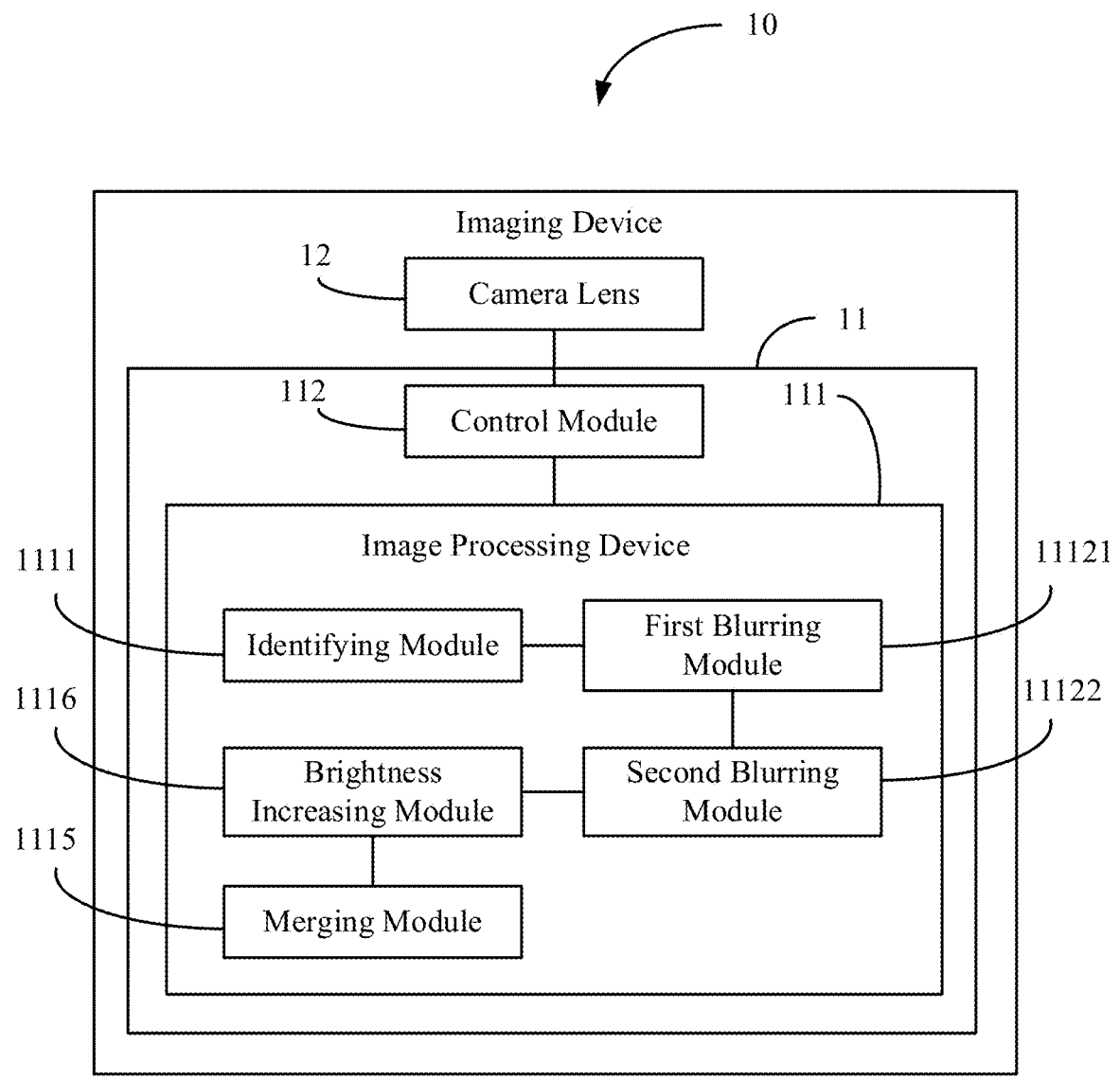
FIG. 35 is a block diagram illustrating an imaging device of a fifth embodiment of the present disclosure.

Referring to FIG. 35, the fifth embodiment of the imaging device 10 of the present disclosure includes the control device 11 in accordance with the fifth embodiment of the control device 11; and a camera lens 12 electrically connected to the control device 11. In other words, the imaging device 10 of the present embodiment includes the image processing device 111 in accordance with the fifth embodiment of the image processing device 111; the control module 112; and the camera lens 12. The control module 112, the camera lens 12, and the image processing device 111 are all electrically connected to one another.

Figure 36:
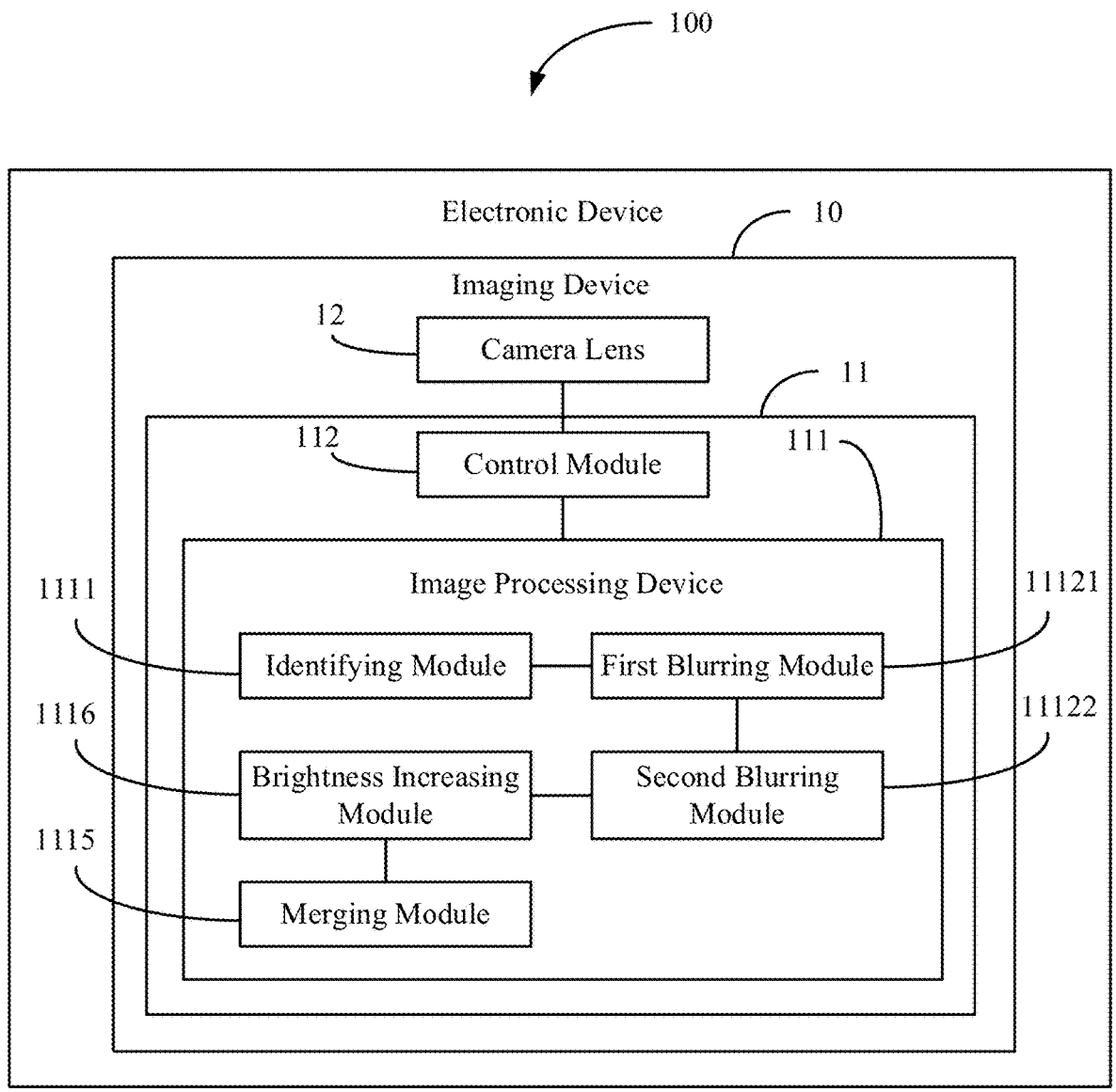
FIG. 36 is a block diagram illustrating an electronic device of a fifth embodiment of the present disclosure.

Referring to FIGS. 36 and 8, a fifth embodiment of the electronic device 100 of the present disclosure includes the imaging device 10 in accordance with the fifth embodiment of the imaging device 10. The electronic device 100 can be carried out by any type of terminals having a photographing function, such as cell phones, tablets, notebook computers, smartwatches, smart rings, smart helmets, smart glasses, other VR (virtual reality) wearable devices, other AR (augmented reality) wearable devices, and etc. When the number of the imaging device 10 is one, the imaging device 10 can be a front-facing camera or a rear camera. When the number of the imaging device 10 is two, the two imaging devices 10 can be the front-facing camera and the rear camera, respectively; or both of the two imaging devices 10 are front-facing cameras; or both of the two imaging devices 10 are rear cameras. When the number of the imaging device 10 is greater than two, the imaging device 10 can be a camera deployed at any position, such as a top camera, a bottom camera, and a lateral camera except the front-facing camera and the rear camera.

Figure 37:
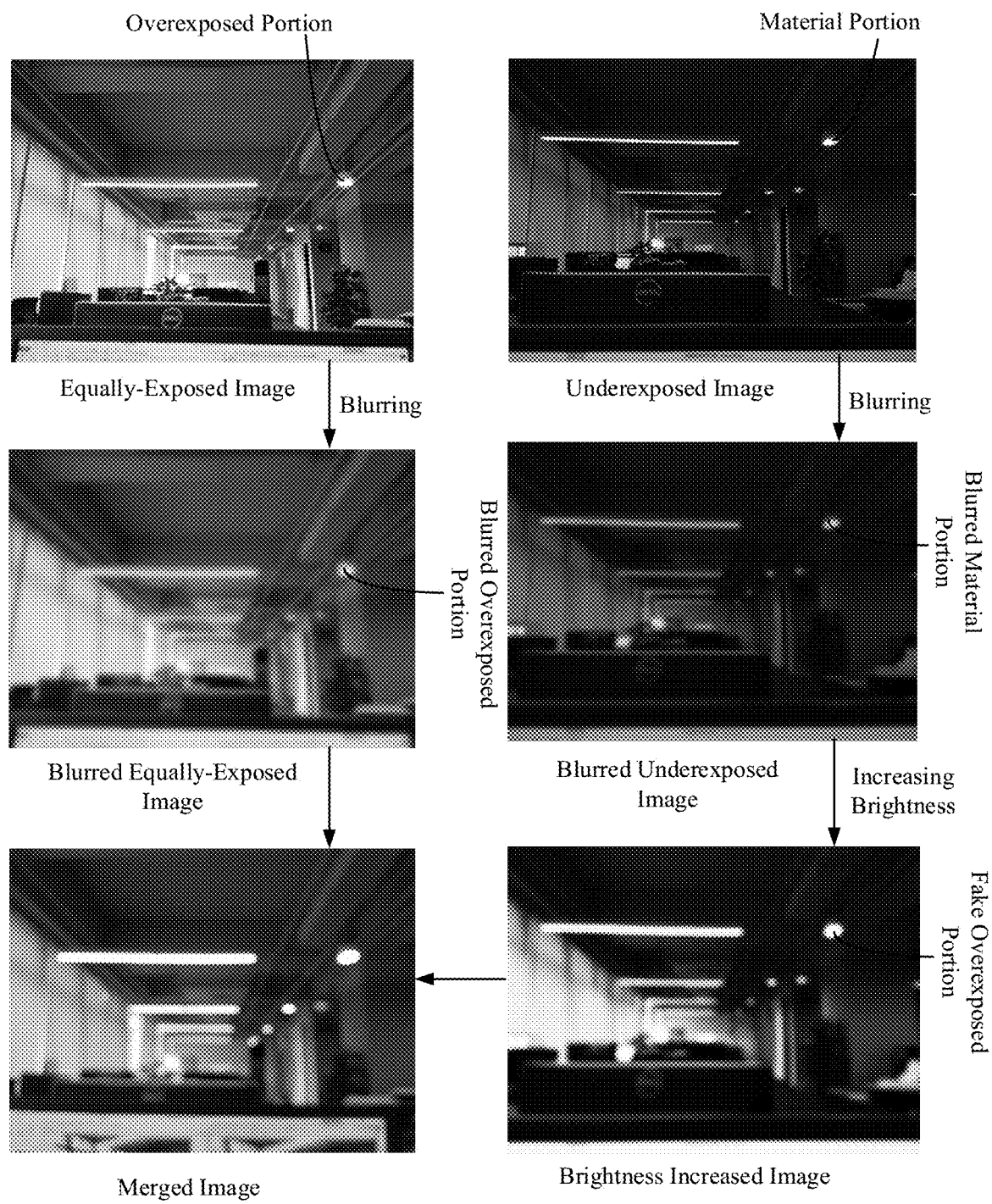
FIG. 37 is a schematic diagram illustrating a workflow of an electronic device of the present disclosure.

In accompanying with FIG. 37, for example, the camera lens 12 is used to photograph an equally-exposed image and an underexposed image in a same scene. For purpose of illustration, two actually photographed images are illustrated in FIG. 37. The scenes of the two images are not completely the same. However, in implementation of the present disclosure, the time taken in photographing the equally-exposed image and the underexposed image is very short, and a same scene can completely be carried out. The equally-exposed image is obtained by exposure using a first exposure value matching luminous environment. The underexposed image is obtained by exposure value using a second exposure value less than the first exposure value. After identification, it can be determined that the equally-exposed image has an overexposed portion, that is, a circular light source on the right. The underexposed image includes a material portion (the circular light source) corresponding to the overexposed portion (the circular light source). Next, the equally-exposed image is blurred to obtain a blurred equally-exposed image. In this example, the background of the equally-exposed image is blurred. What are shown in FIG. 37 is primarily the background portion, not an entire image. The underexposed image is blurred to obtain a blurred underexposed image. In this example, an approach adopted to blur the underexposed image may be the same as or similar to that adopted to blur the equally-exposed image. The overexposed portion (the circular light source) of the blurred equally-exposed image is blurred to obtain a blurred overexposed portion (the circular light source). The material portion (the circular light source) of the blurred underexposed image is blurred to obtain a blurred material portion (the circular light source). The brightness of the blurred material portion is increased to obtain a fake overexposed portion. In an embodiment, the brightness of the blurred underexposed image can be overall increased, and meanwhile the brightness of the blurred material portion is increased as well. Alternatively, it can be carried out by only increasing the brightness of the blurred material portion. Finally, the blurred overexposed portion of the blurred equally-exposed image is replaced with the fake overexposed portion to obtain a merged image.

In the image processing method, the image processing device 111, the control method, the control device 11, the imaging device 10, and the electronic device 100 in accordance with the present disclosure, two images are photographed, one is the equally-exposed image, the other one is the underexposed image, both of the two images are blurred, and then the brightness of the blurred overexposed portion is increased, the corresponding fake overexposed portion is extracted, and the blurred overexposed portion of the blurred equally-exposed image is replaced with the fake overexposed portion to merge into a blurred image having a real flare effect. The flare effect is excellent.

Figure 38:
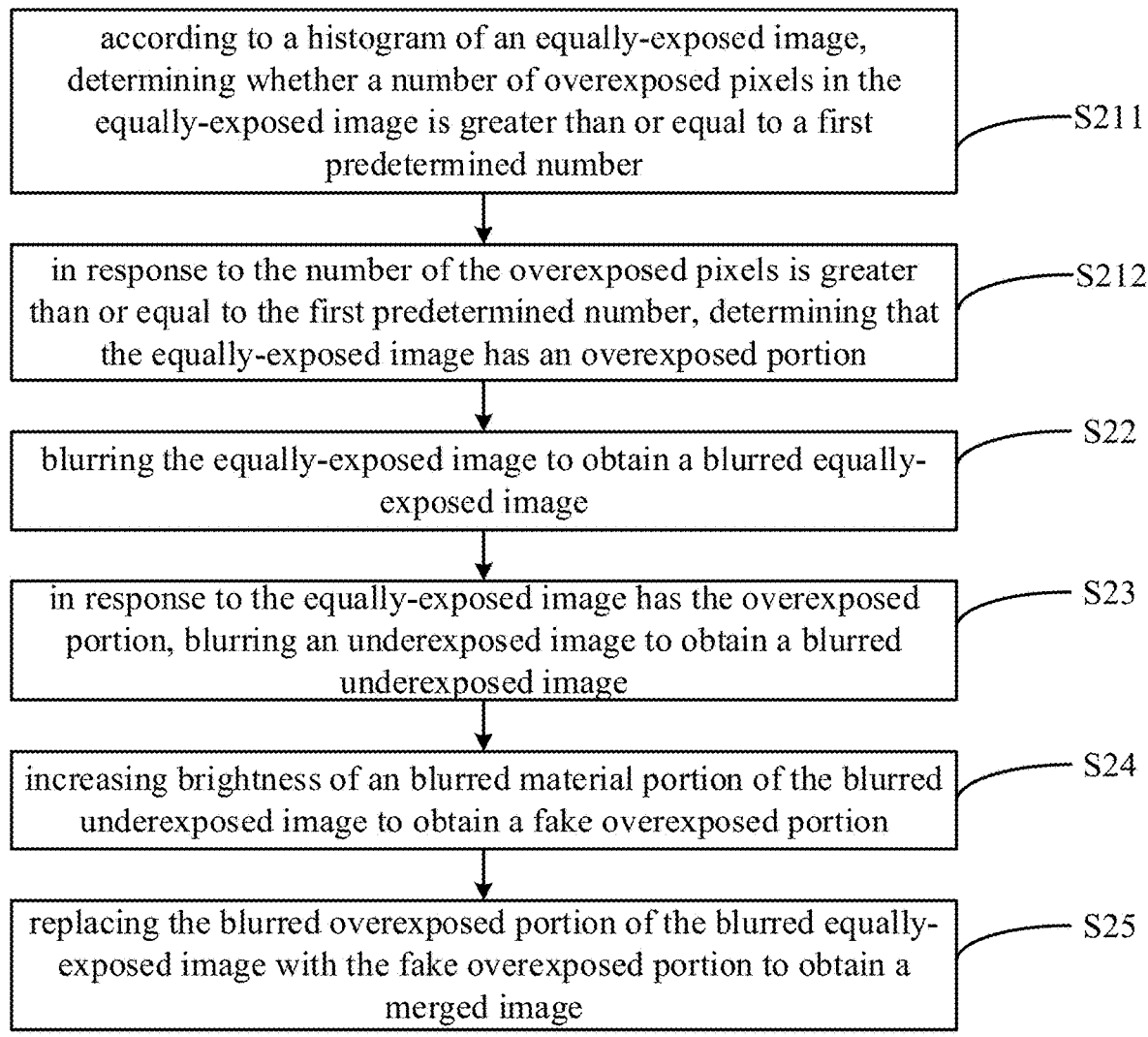
FIG. 38 is a flowchart of an image processing method of a sixth embodiment of the present disclosure.

Referring to FIG. 38, a sixth embodiment of the image processing method of the present disclosure is substantially the same as the fifth embodiment of the image processing method, but identifying whether the equally-exposed image has the overexposed portion further includes the following actions at blocks.

At Block S211, whether a number of overexposed pixels in the equally-exposed image is greater than or equal to a first predetermined number is determine according to a histogram of the equally-exposed image. The pixel values of the overexposed pixels are greater than or equal to a predetermined pixel value.

At Block S212, in response to the number of the overexposed pixels is greater than or equal to the first predetermined number, it is determined that the equally-exposed image has the overexposed portion.

Figure 39:
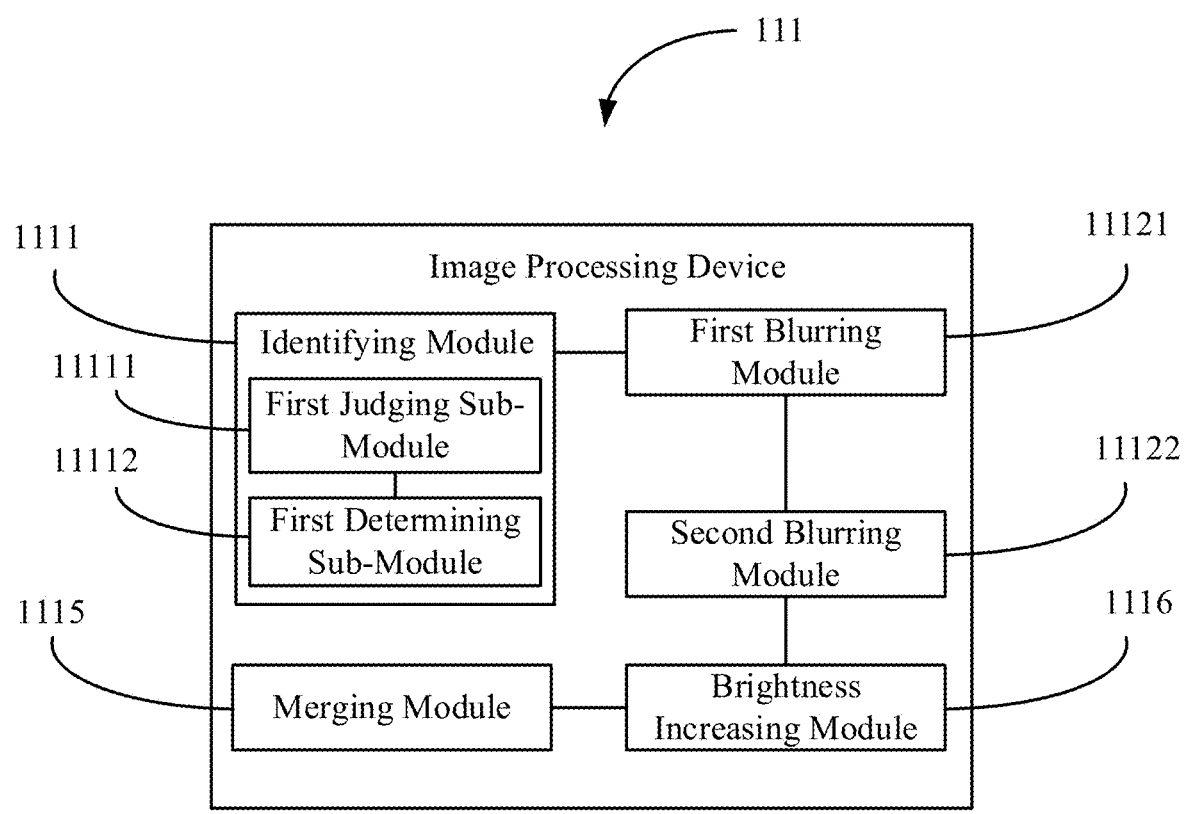
FIG. 39 is a block diagram illustrating an image processing device of a sixth embodiment of the present disclosure.

Referring to FIG. 39, the sixth embodiment of the image processing method can be implemented by a sixth embodiment of the image processing device 111 of the present disclosure. The image processing device 111 in accordance with the sixth embodiment of the image processing device 111 of the present disclosure has a structure substantially the same as the fifth embodiment of the image processing device 111, and their difference is that the identifying module 1111 of the image processing device 111 of the sixth embodiment includes a first determining sub-module 11111 and a second determining sub-module 11112, which are configured to execute Blocks S211 and S212. That is, the first determining sub-module 1111 is configured to determine whether a number of overexposed pixels in the equally-exposed image is greater than or equal to a first predetermined number, according to a histogram of the equally-exposed image. The pixel values of the overexposed pixels are greater than or equal to a predetermined pixel value. The first determining sub-module 11112 is configured to determine that the equally-exposed image has the overexposed portion in response to the number of the overexposed pixels is greater than or equal to the first predetermined number.

Referring to FIG. 12, generally speaking, a pixel value (gray value) is increased from left to right along a horizontal axis of the histogram of the equally-exposed image, and the number of pixels of a certain pixel value (gray value) is increased from bottom to top along a vertical axis of the histogram of the equally-exposed image. A range of the pixel value (gray value) is between 0 to 255, that is, from black to white. The higher a peak, the larger the number of pixels of a given pixel value (gray value).

The first predetermined number should be the number of pixels close to the right boundary of the histogram, that is, the overexposed pixels. The first predetermined number can be set as one-third of the total pixels, which are only for illustration and the present disclosure is not limited thereto.

Figure 40:
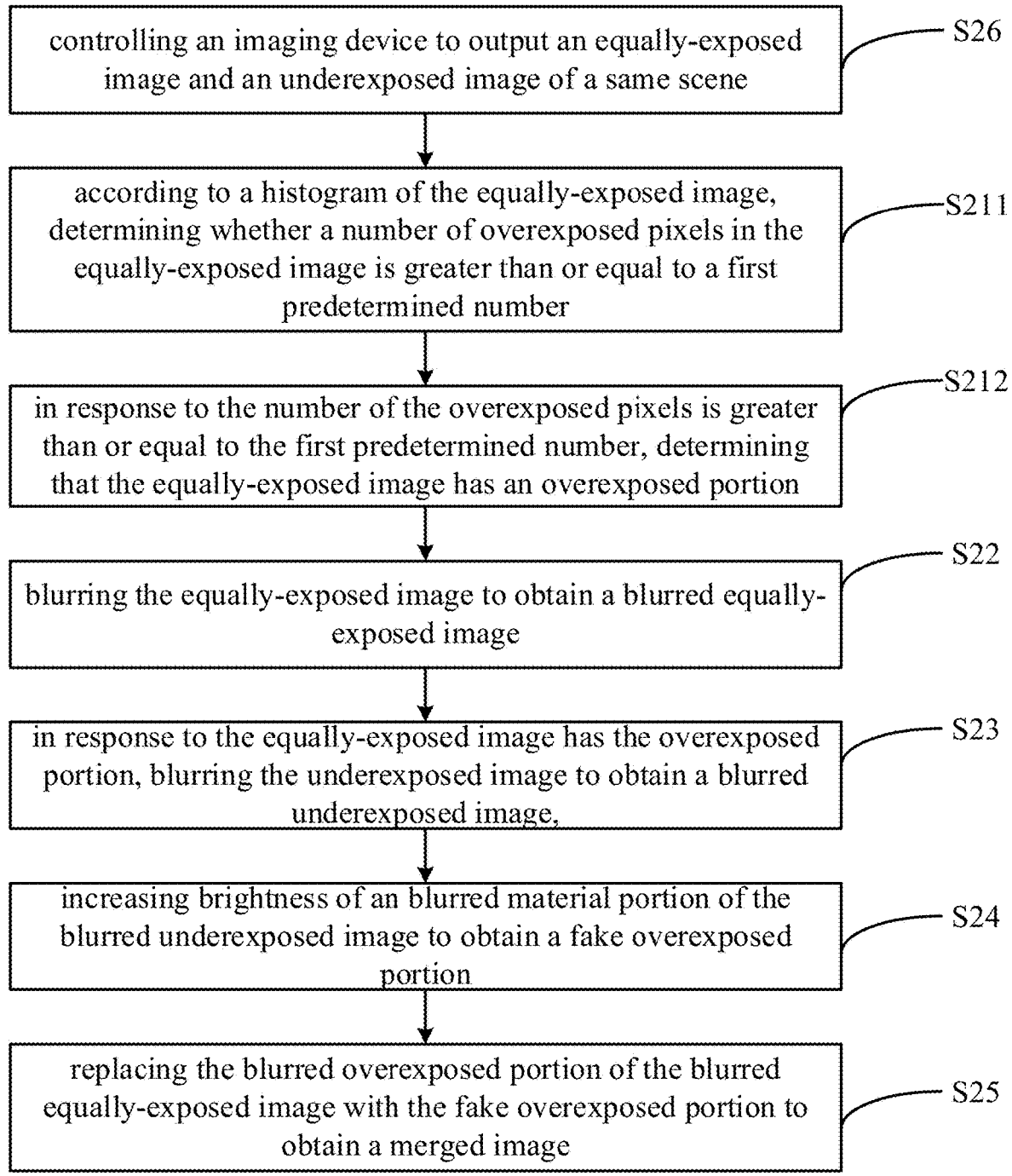
FIG. 40 is a flowchart of a control method of a sixth embodiment of the present disclosure.

Referring to FIG. 40, a sixth embodiment of the control method of the present disclosure is substantially the same as the fifth embodiment of the control method, but identifying whether the equally-exposed image has the overexposed portion further includes the following actions at blocks.

At Block S211, whether a number of overexposed pixels in the equally-exposed image is greater than or equal to a first predetermined number is determine according to a histogram of the equally-exposed image. The pixel values of the overexposed pixels are greater than or equal to a predetermined pixel value.

At Block S212, in response to the number of the overexposed pixels is greater than or equal to the first predetermined number, it is determined that the equally-exposed image has the overexposed portion.

Figure 41:
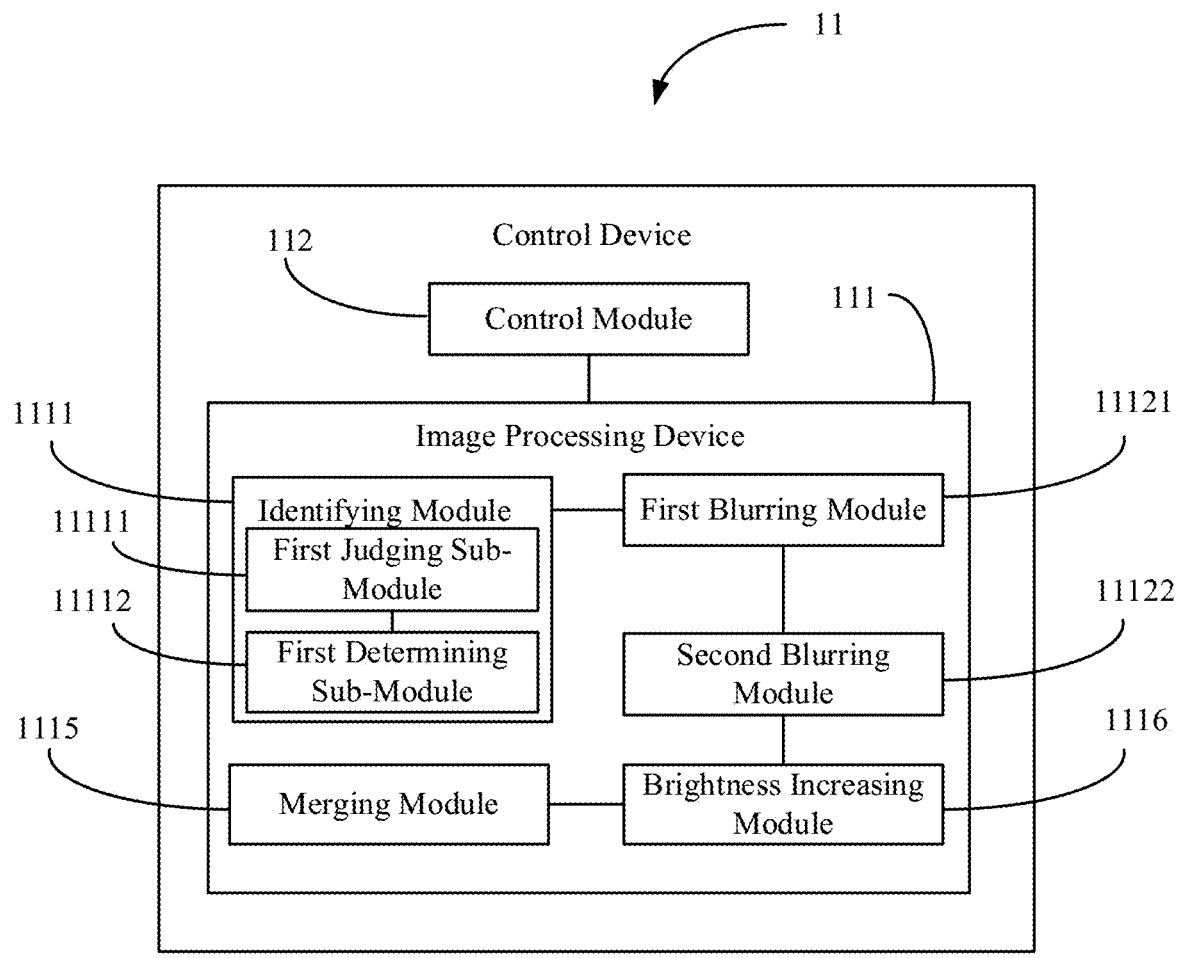
FIG. 41 is a block diagram illustrating a control device of a sixth embodiment of the present disclosure.

Referring to FIG. 41, the sixth embodiment of the control method can be implemented by a sixth embodiment of the control device 11 of the present disclosure. The control device 11 in accordance with the sixth embodiment of the control device 11 of the present disclosure has a structure substantially the same as the fifth embodiment of the control device 11, and their difference is that the identifying module 1111 of the control device 11 of the sixth embodiment includes a first determining sub-module 11111 and a second determining sub-module 11112, which are configured to execute Blocks S211 and S212. That is, the first determining sub-module 1111 is configured to determine whether a number of overexposed pixels in the equally-exposed image is greater than or equal to a first predetermined number, according to a histogram of the equally-exposed image. The pixel values of the overexposed pixels are greater than or equal to a predetermined pixel value. The first determining sub-module 11112 is configured to determine that the equally-exposed image has the overexposed portion in response to the number of the overexposed pixels is greater than or equal to the first predetermined number.

Referring to FIG. 12, generally speaking, a pixel value (gray value) is increased from left to right along a horizontal axis of the histogram of the equally-exposed image, and the number of pixels of a certain pixel value (gray value) is increased from bottom to top along a vertical axis of the histogram of the equally-exposed image. A range of the pixel value (gray value) is between 0 to 255, that is, from black to white. The higher a peak, the larger the number of pixels of a given pixel value (gray value).

The first predetermined number should be the number of pixels close to the right boundary of the histogram, that is, the overexposed pixels. The first predetermined number can be set as one-third of the total pixels, which are only for illustration and the present disclosure is not limited thereto.

Figure 42:
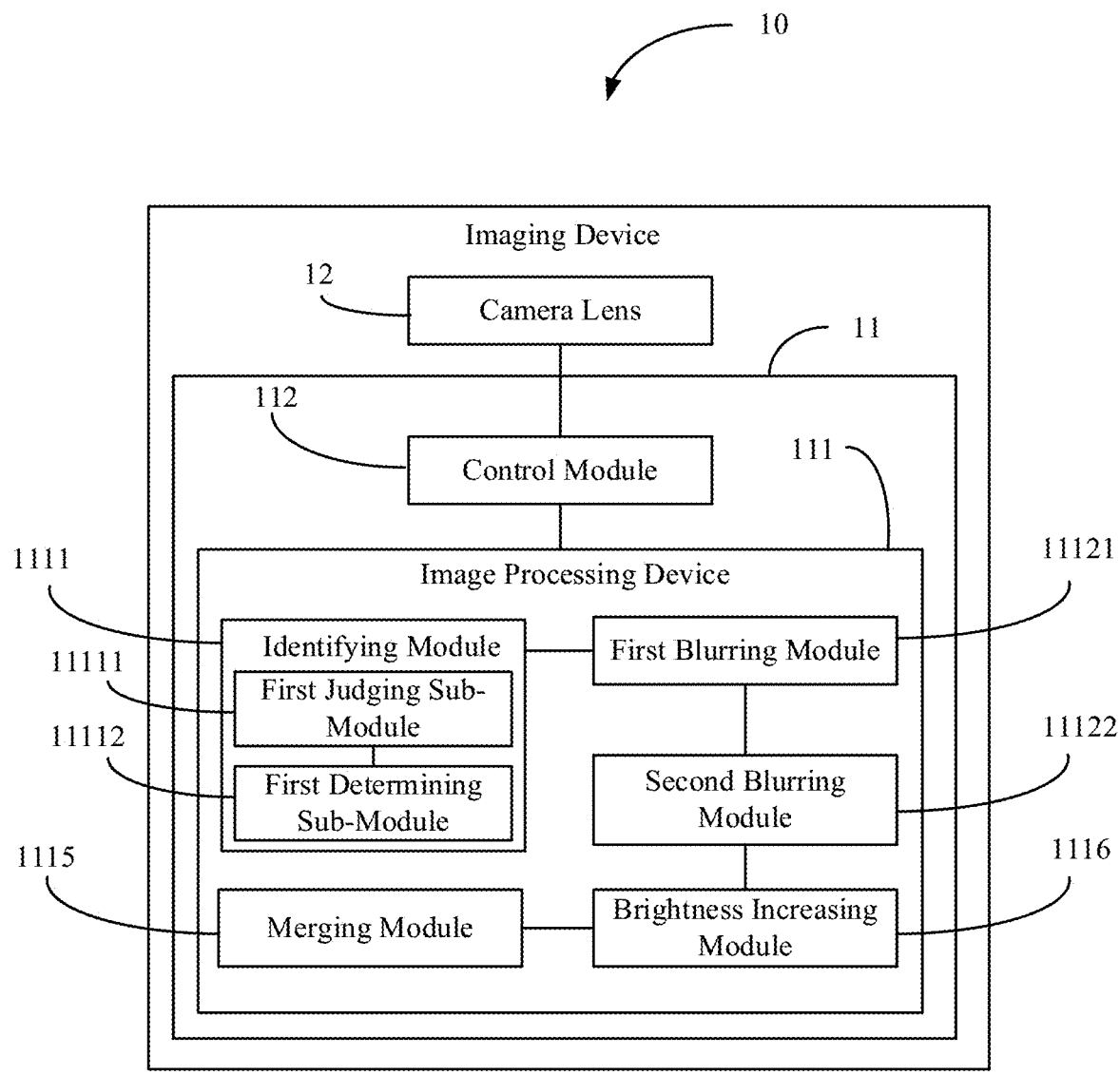
FIG. 42 is a block diagram illustrating an imaging device of a sixth embodiment of the present disclosure.

Referring to FIG. 42, a sixth embodiment of the imaging device 10 of the present disclosure includes the control device 11 in accordance with the sixth embodiment of the control device 11; and the camera lens 12 electrically connected to the control device 11. In other words, the imaging device 10 of the present embodiment includes the image processing device 111 in accordance with the fifth embodiment of the image processing device 111; the control module 112; and the camera lens 12. The control module 112, the camera lens 12, and the image processing device 111 are all electrically connected to one another.

Figure 43:
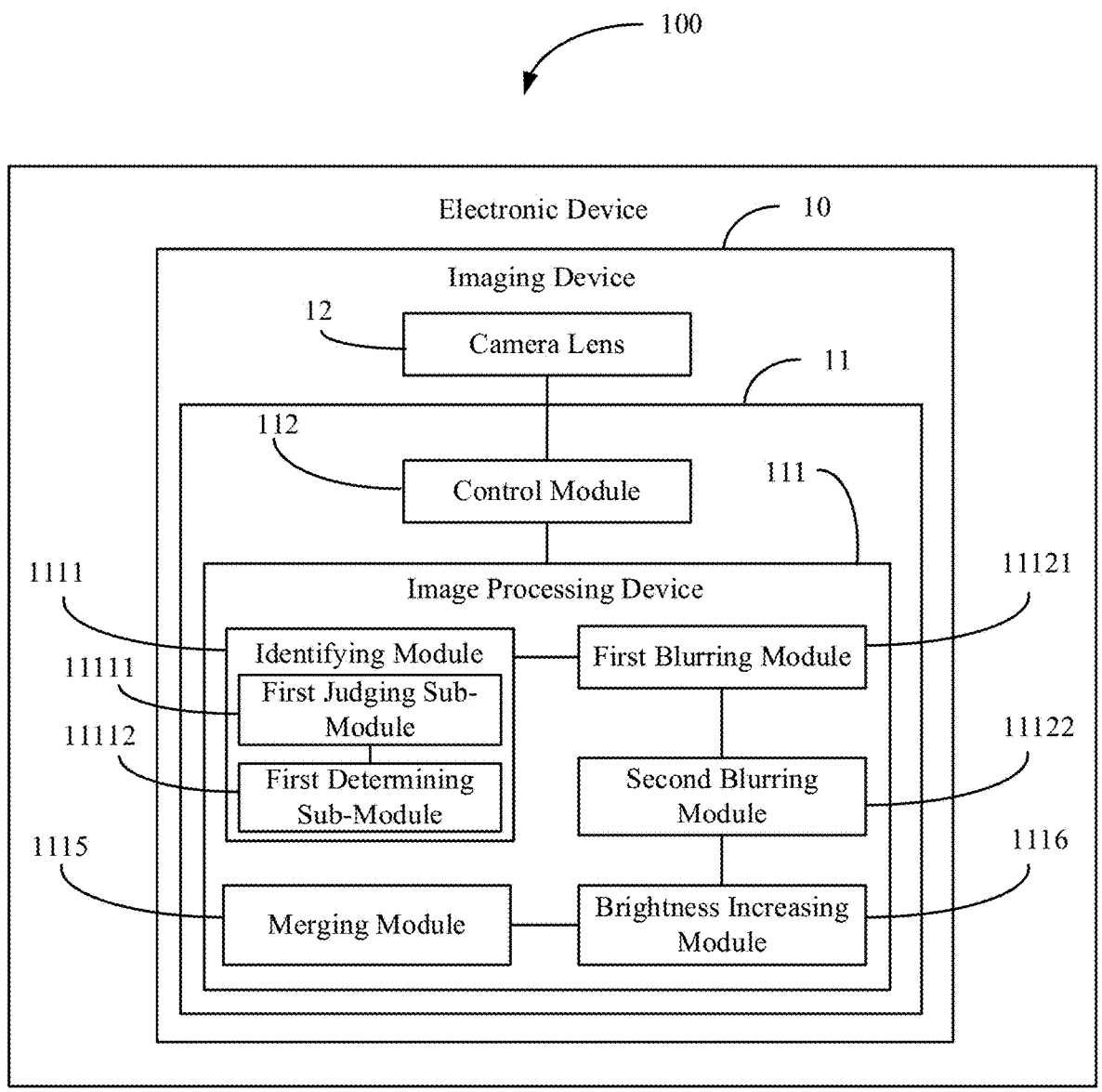
FIG. 43 is a block diagram illustrating an electronic device of a sixth embodiment of the present disclosure.

Referring to FIG. 43, a sixth embodiment of the electronic device 100 of the present disclosure includes the imaging device 10 in accordance with the sixth embodiment of the imaging device 10. The electronic device 100 can be carried out by any type of terminals having a photographing function, such as cell phones, tablets, notebook computers, smartwatches, smart rings, smart helmets, smart glasses, other VR (virtual reality) wearable devices, other AR (augmented reality) wearable devices, and etc. In the present embodiment, when the number of the imaging device 10 is one, the imaging device 10 can be a front-facing camera or a rear camera. When the number of the imaging device 10 is two, the two imaging devices 10 can be the front-facing camera and the rear camera, respectively; or both of the two imaging devices 10 are front-facing cameras; or both of the two imaging devices 10 are rear cameras. When the number of the imaging device 10 is greater than two, the imaging device 10 can be a camera deployed at any position, such as a top camera, a bottom camera, and a lateral camera except the front-facing camera and the rear camera.

In the image processing method, the image processing device 111, the control method, the control device 11, the imaging device 10, and the electronic device 100 in accordance with the sixth embodiment of the present disclosure, two images are photographed, one is the equally-exposed image, the other one is the underexposed image, both of the two images are blurred, and then the brightness of the blurred overexposed portion is increased, the corresponding fake overexposed portion is extracted, and the blurred overexposed portion of the blurred equally-exposed image is replaced with the fake overexposed portion to merge into a blurred image having a real flare effect. The flare effect is excellent.

Figure 44:
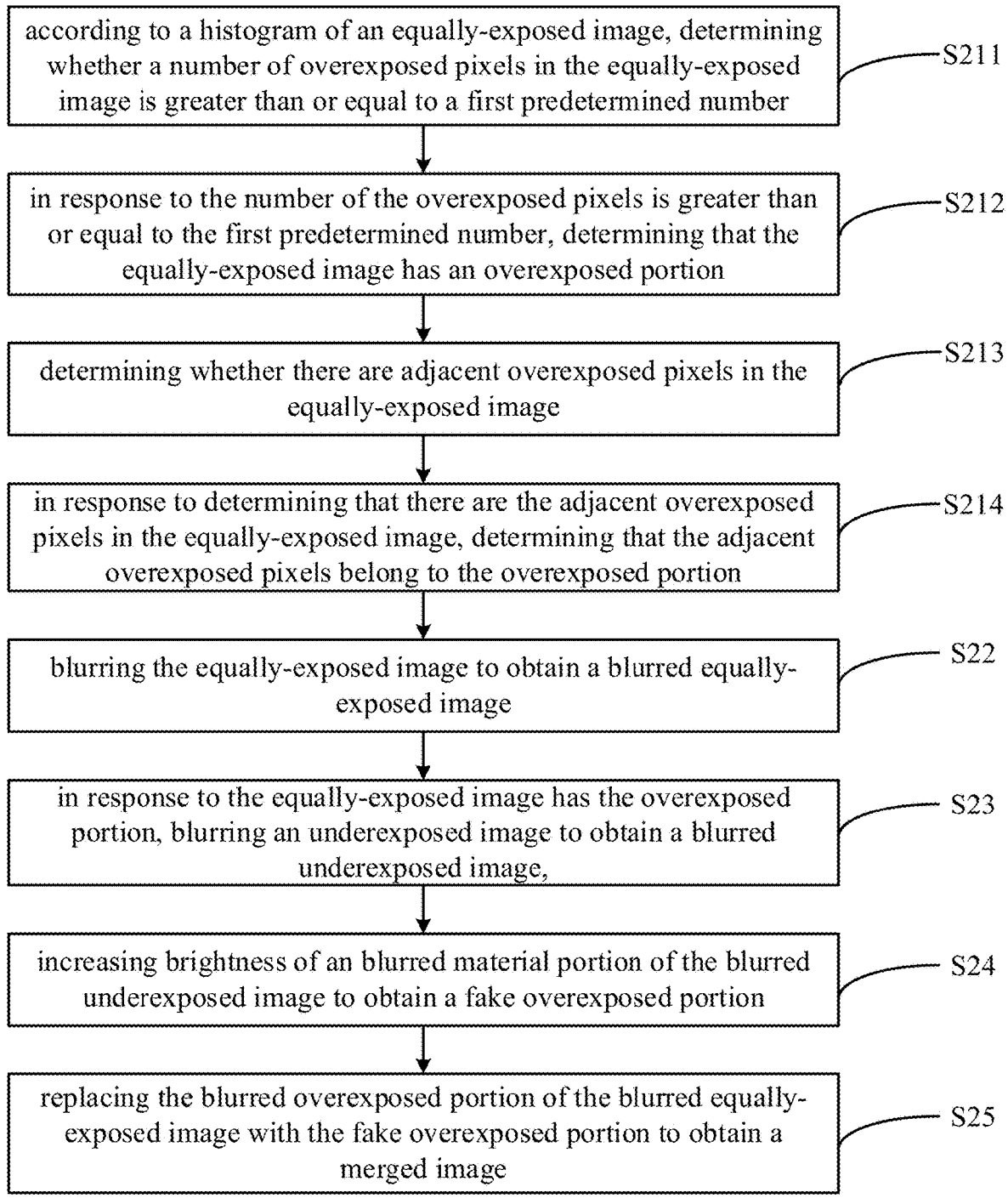
FIG. 44 is a flowchart of an image processing method of a seventh embodiment of the present disclosure.

Referring to FIG. 44, a seventh embodiment of the image processing method of the present disclosure is substantially the same as the fifth embodiment of the image processing method, but identifying whether the equally-exposed image has the overexposed portion further includes the following actions at blocks.

At Block S211, whether a number of overexposed pixels in the equally-exposed image is greater than or equal to a first predetermined number is determine according to a histogram of the equally-exposed image. The pixel values of the overexposed pixels are greater than or equal to a predetermined pixel value.

At Block S212, in response to the number of the overexposed pixels is greater than or equal to the first predetermined number, it is determined that the equally-exposed image has the overexposed portion.

At Block S213, whether there are adjacent overexposed pixels in the equally-exposed image is determined by determining whether a number of the adjacent overexposed pixels is greater than or equal to a second predetermined number.

At Block S214, in response to determining that there are the adjacent overexposed pixels in the equally-exposed image, it is determined that the adjacent overexposed pixels belong to the overexposed portion.

Figure 45:
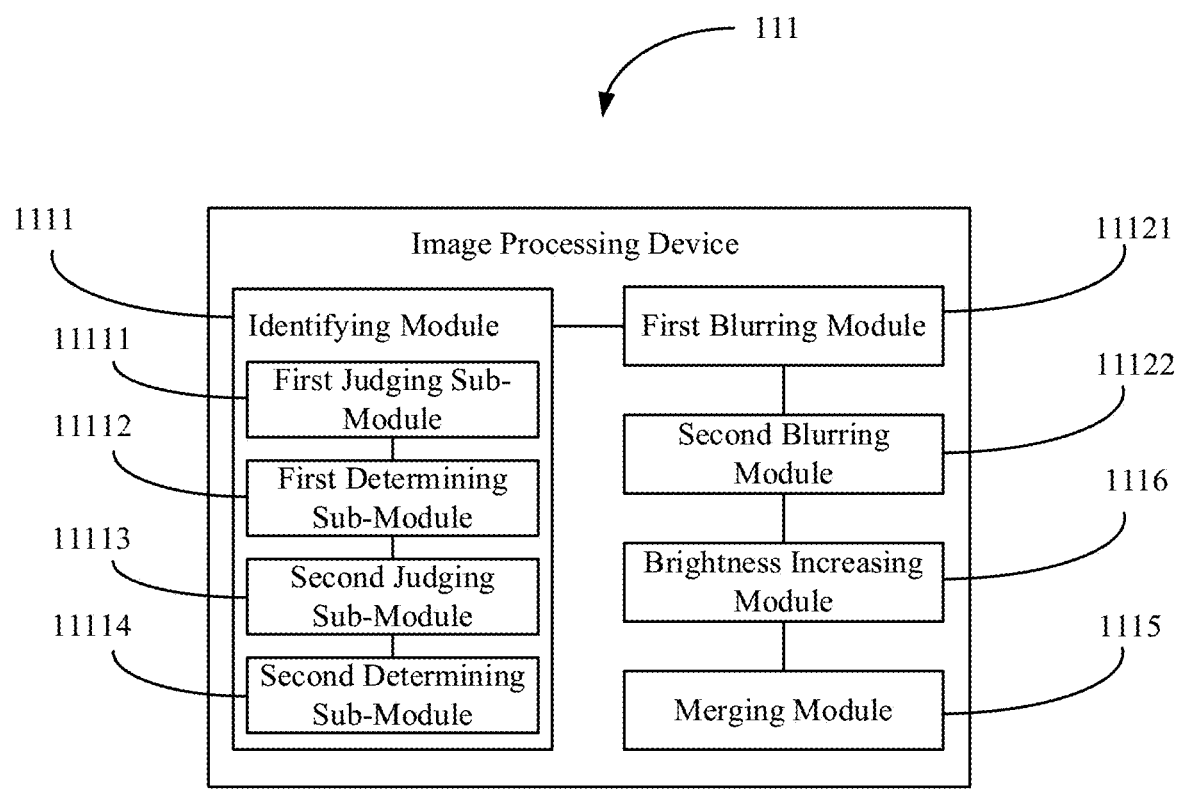
FIG. 45 is a block diagram illustrating an image processing device of a seventh embodiment of the present disclosure.

Referring to FIG. 45, the seventh embodiment of the image processing method can be implemented by a seventh embodiment of the image processing device 111 of the present disclosure. The image processing device 111 in accordance with the seventh embodiment of the image processing device 111 of the present disclosure has a structure substantially the same as the fifth embodiment of the image processing device 111, and their difference is that the identifying module 1111 of the image processing device 111 of the seventh embodiment includes a first judging sub-module 11111, a first determining sub-module 11112, a second judging sub-module 11113, and a second determining sub-module 11114, which are configured to execute Blocks S211, S212, S213, and S214. That is, the first determining sub-module 1111 is configured to determine whether a number of overexposed pixels in the equally-exposed image is greater than or equal to a first predetermined number, according to a histogram of the equally-exposed image. The pixel values of the overexposed pixels are greater than or equal to a predetermined pixel value. The first determining sub-module 11112 is configured to determine that the equally-exposed image has the overexposed portion in response to the number of the overexposed pixels is greater than or equal to the first predetermined number. The second judging sub-module 11113 is configured to determine whether there are adjacent overexposed pixels in the equally-exposed image by determining whether a number of the adjacent overexposed pixels is greater than or equal to a second predetermined number. The second determining sub-module 11114 is configured to determine that the adjacent overexposed pixels belong to the overexposed portion in response to determining that there are the adjacent overexposed pixels in the equally-exposed image.

The second predetermined number should be smaller than the first predetermined number since the first predetermined number may include noise points, or even the equally-exposed image may include a plurality of adjacent overexposed pixels, for example, there are a plurality of light sources with divergent light rays, which together contributes to the overexposed portion.

Referring to FIG. 12, generally speaking, a pixel value (gray value) is increased from left to right along a horizontal axis of the histogram of the equally-exposed image, and the number of pixels of a certain pixel value (gray value) is increased from bottom to top along a vertical axis of the histogram of the equally-exposed image. A range of the pixel value (gray value) is between 0 to 255, that is, from black to white. The higher a peak, the larger the number of pixels of a given pixel value (gray value).

The first predetermined number and the second predetermined number should be the number of pixels close to the right boundary of the histogram, that is, the overexposed pixels. The first predetermined number can be set as one-third of the total pixels and the second predetermined number can be set as one-fourth of the total pixels, which are only for illustration and the present disclosure is not limited thereto.

Figure 46:
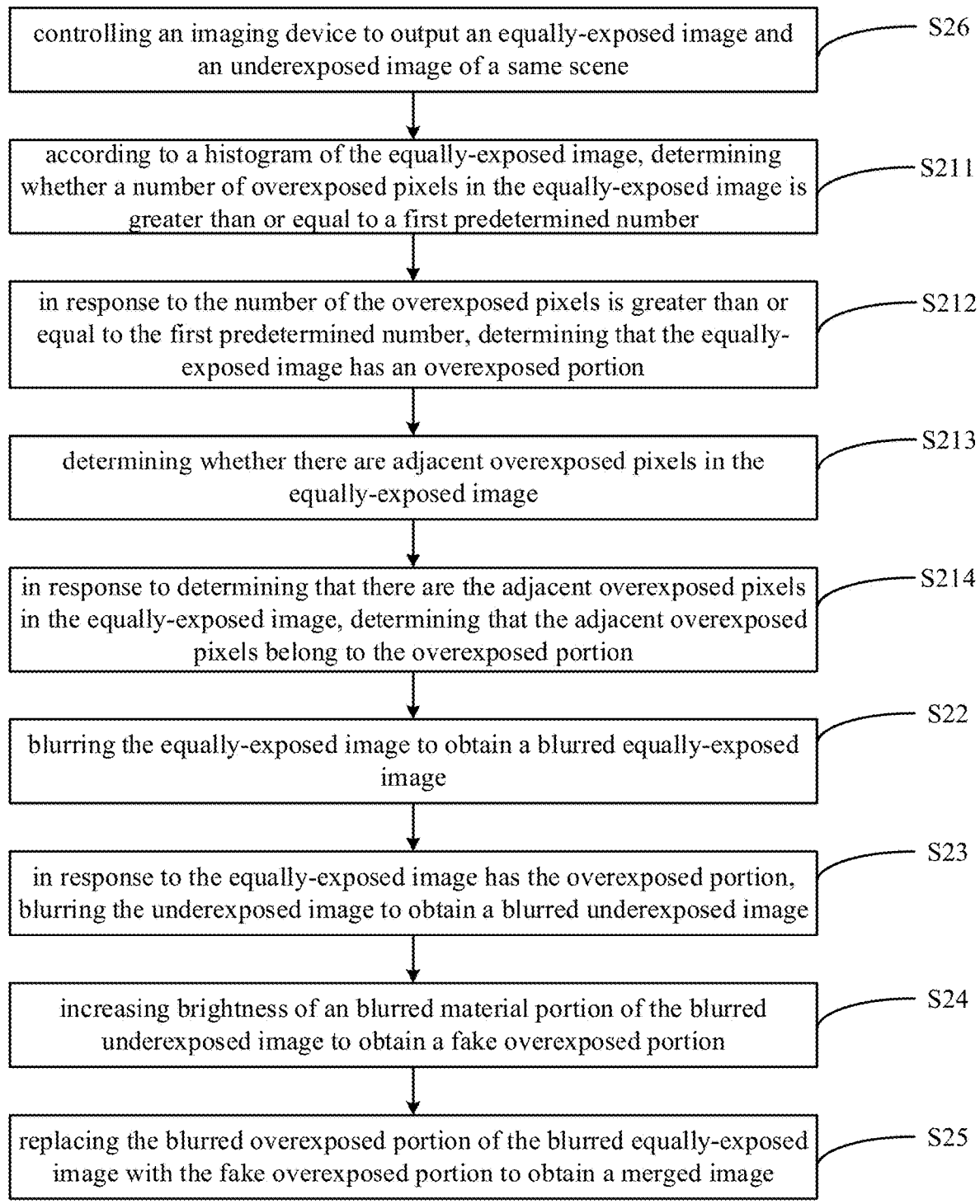
FIG. 46 is a flowchart of a control method of a seventh embodiment of the present disclosure.

Referring to FIG. 46, a seventh embodiment of the control method of the present disclosure is substantially the same as the fifth embodiment of the control method, but identifying whether the equally-exposed image has the overexposed portion further includes the following actions at blocks.

At Block S211, whether a number of overexposed pixels in the equally-exposed image is greater than or equal to a first predetermined number is determine according to a histogram of the equally-exposed image. The pixel values of the overexposed pixels are greater than or equal to a predetermined pixel value.

At Block S212, in response to the number of the overexposed pixels is greater than or equal to the first predetermined number, it is determined that the equally-exposed image has the overexposed portion.

At Block S213, whether there are adjacent overexposed pixels in the equally-exposed image is determined by determining whether a number of the adjacent overexposed pixels is greater than or equal to a second predetermined number.

At Block S214, in response to determining that there are the adjacent overexposed pixels in the equally-exposed image, it is determined that the adjacent overexposed pixels belong to the overexposed portion.

Figure 47:
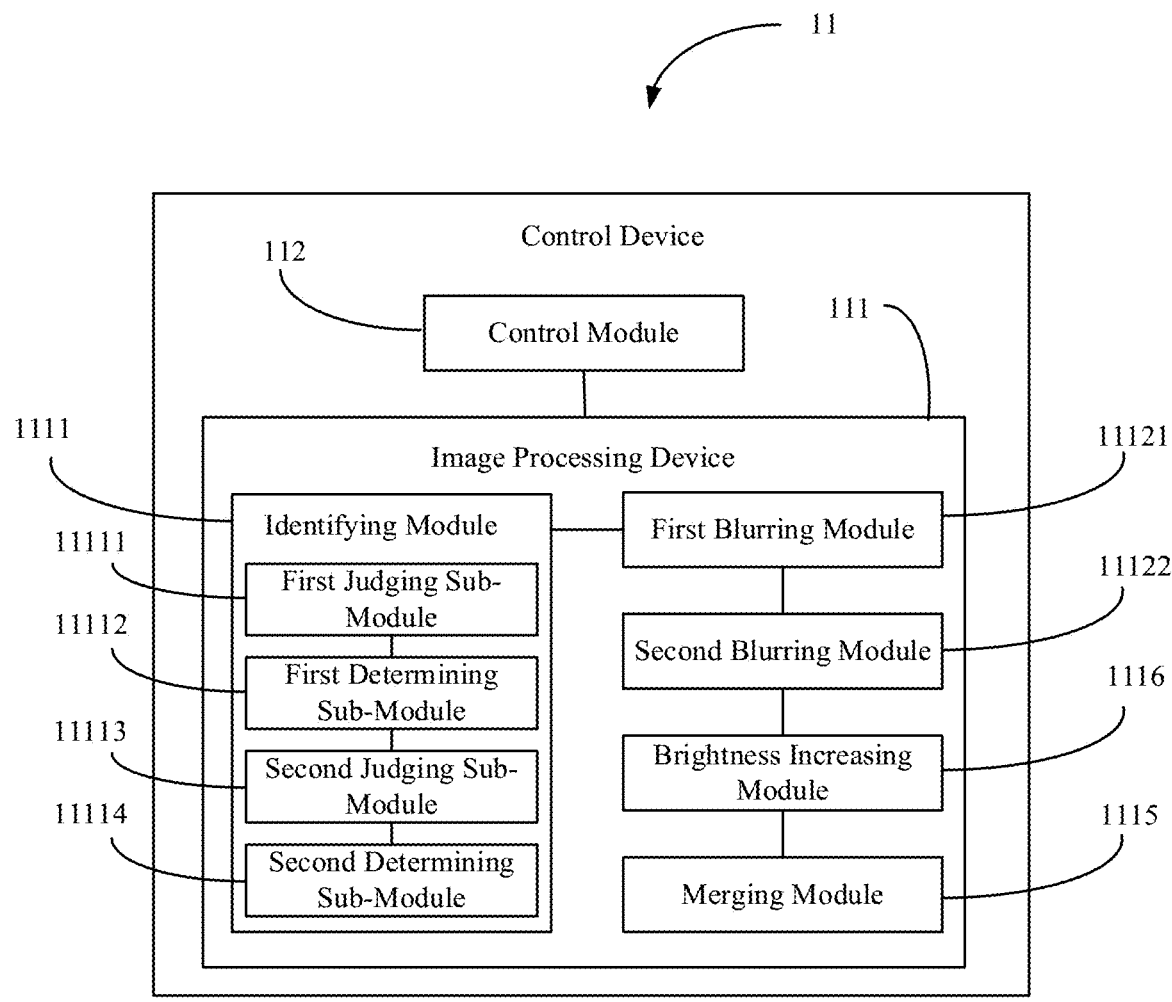
FIG. 47 is a block diagram illustrating a control device of a seventh embodiment of the present disclosure.

Referring to FIG. 47, the seventh embodiment of the control method can be implemented by a seventh embodiment of the control device 11 of the present disclosure. The control device 11 in accordance with the seventh embodiment of the control device 11 of the present disclosure has a structure substantially the same as the fifth embodiment of the control device 11, and their difference is that the identifying module 1111 of the control device 11 of the seventh embodiment includes a first judging sub-module 11111, a first determining sub-module 11112, a second judging sub-module 11113, and a second determining sub-module 11114, which are configured to execute Blocks S211, S212, S213, and S214. That is, the first determining sub-module 1111 is configured to determine whether a number of overexposed pixels in the equally-exposed image is greater than or equal to a first predetermined number, according to a histogram of the equally-exposed image. The pixel values of the overexposed pixels are greater than or equal to a predetermined pixel value. The first determining sub-module 11112 is configured to determine that the equally-exposed image has the overexposed portion in response to the number of the overexposed pixels is greater than or equal to the first predetermined number. The second judging sub-module 11113 is configured to determine whether there are adjacent overexposed pixels in the equally-exposed image by determining whether a number of the adjacent overexposed pixels is greater than or equal to a second predetermined number. The second determining sub-module 11114 is configured to determine that the adjacent overexposed pixels belong to the overexposed portion in response to determining that there are the adjacent overexposed pixels in the equally-exposed image.

The second predetermined number should be smaller than the first predetermined number since the first predetermined number may include noise points, or even the equally-exposed image may include a plurality of adjacent overexposed pixels, for example, there are a plurality of light sources with divergent light rays, which together contributes to the overexposed portion.

Referring to FIG. 12, generally speaking, a pixel value (gray value) is increased from left to right along a horizontal axis of the histogram of the equally-exposed image, and the number of pixels of a certain pixel value (gray value) is increased from bottom to top along a vertical axis of the histogram of the equally-exposed image. A range of the pixel value (gray value) is between 0 to 255, that is, from black to white. The higher a peak, the larger the number of pixels of a given pixel value (gray value).

The first predetermined number and the second predetermined number should be the number of pixels close to the right boundary of the histogram, that is, the overexposed pixels. The first predetermined number can be set as one-third of the total pixels and the second predetermined number can be set as one-fourth of the total pixels, which are only for illustration and the present disclosure is not limited thereto.

Figure 48:
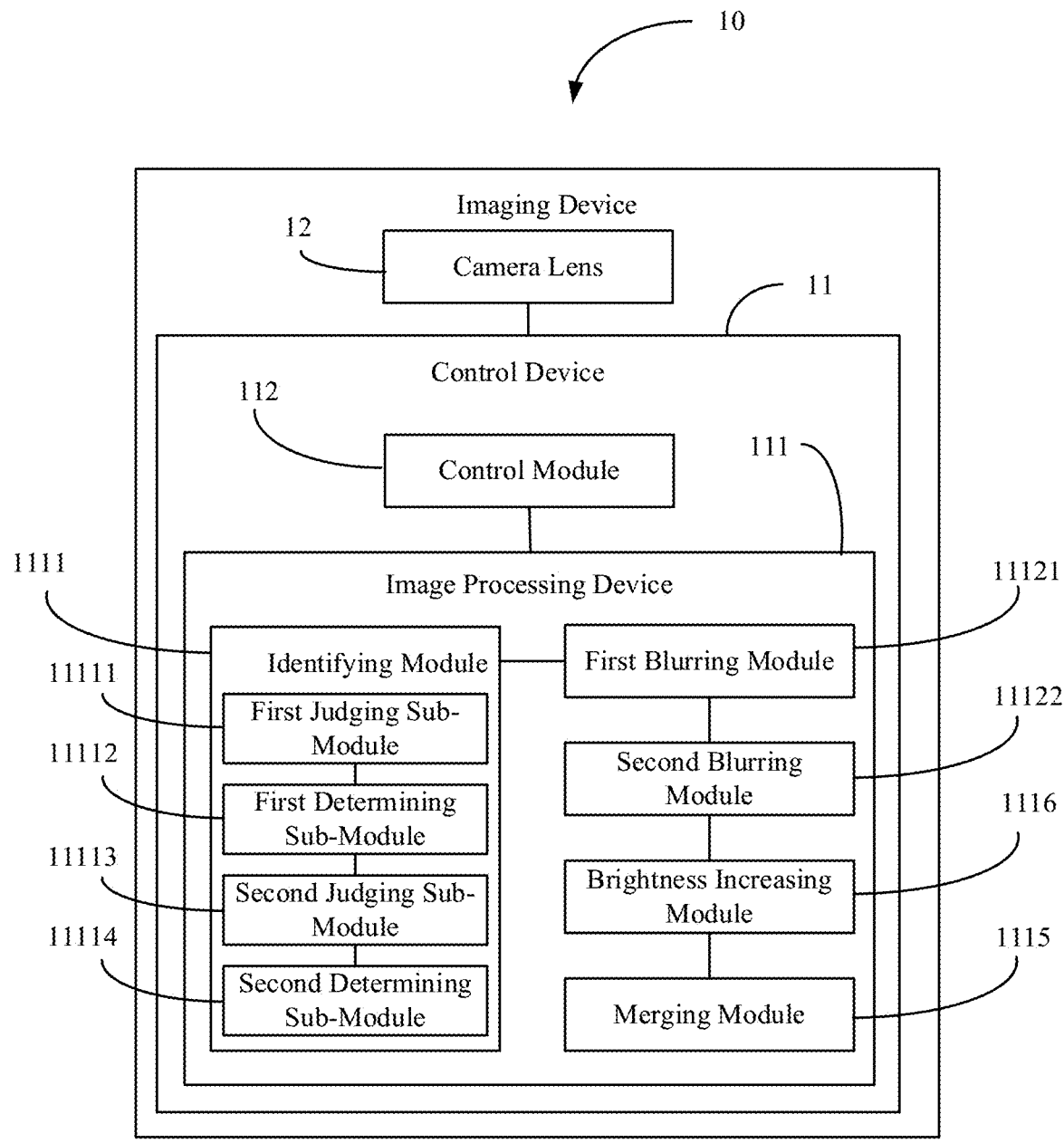
FIG. 48 is a block diagram illustrating an imaging device of a seventh embodiment of the present disclosure.

Referring to FIG. 48, a seventh embodiment of the imaging device 10 of the present disclosure includes the control device 11 in accordance with the seventh embodiment of the control device 11; and the camera lens 12 electrically connected to the control device 11. In other words, the imaging device 10 of the present embodiment includes the image processing device 111 in accordance with the seventh embodiment of the image processing device 111; the control module 112; and the camera lens 12. The control module 112, the camera lens 12, and the image processing device 111 are all electrically connected to one another.

Figure 49:
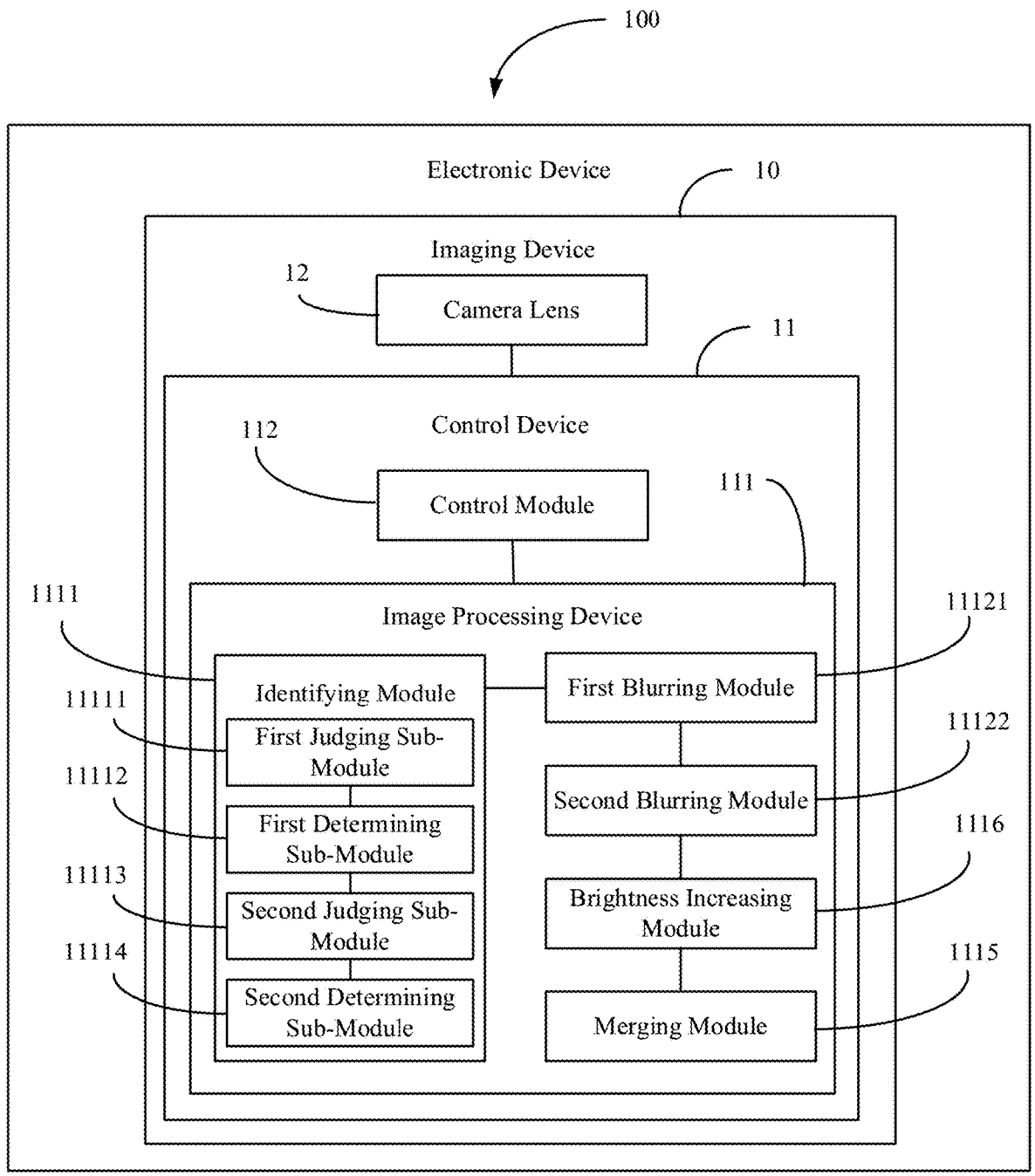
FIG. 49 is a block diagram illustrating an electronic device of a seventh embodiment of the present disclosure.

Referring to FIG. 49, a seventh embodiment of the electronic device 100 of the present disclosure includes the imaging device 10 in accordance with the seventh embodiment of the imaging device 10. The electronic device 100 can be carried out by any type of terminals having a photographing function, such as cell phones, tablets, notebook computers, smartwatches, smart rings, smart helmets, smart glasses, other VR (virtual reality) wearable devices, other AR (augmented reality) wearable devices, and etc. In the present embodiment, when the number of the imaging device 10 is one, the imaging device 10 can be a front-facing camera or a rear camera. When the number of the imaging device 10 is two, the two imaging devices 10 can be the front-facing camera and the rear camera, respectively; or both of the two imaging devices 10 are front-facing cameras; or both of the two imaging devices 10 are rear cameras. When the number of the imaging device 10 is greater than two, the imaging device 10 can be a camera deployed at any position, such as a top camera, a bottom camera, and a lateral camera except the front-facing camera and the rear camera.

In the image processing method, the image processing device 111, the control method, the control device 11, the imaging device 10, and the electronic device 100 in accordance with the seventh embodiment of the present disclosure, two images are photographed, one is the equally-exposed image, the other one is the underexposed image, both of the two images are blurred, and then the brightness of the blurred overexposed portion is increased, the corresponding fake overexposed portion is extracted, and the blurred overexposed portion of the blurred equally-exposed image is replaced with the fake overexposed portion to merge into a blurred image having a real flare effect. The flare effect is excellent.

Figure 50:
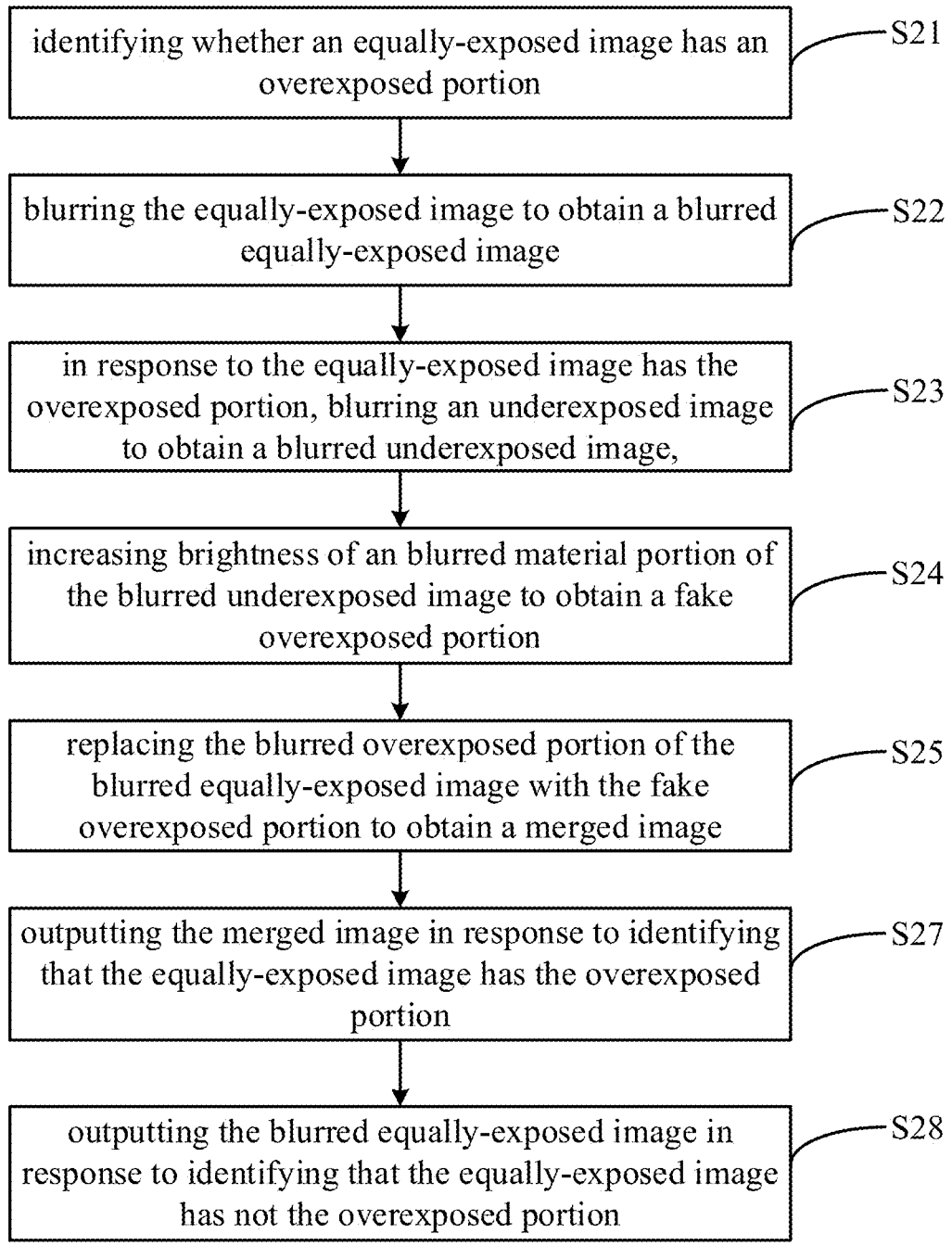
FIG. 50 is a flowchart of an image processing method of an eighth embodiment of the present disclosure.

Referring to FIG. 50, an eighth embodiment of the image processing method of the present disclosure is substantially the same as the fifth embodiment of the image processing method, but the eighth embodiment of the image processing method further includes the following actions at blocks.

At Block S27, the merged image is outputted in response to identifying that the equally-exposed image has the overexposed portion.

At Block S28, the blurred equally-exposed image is outputted in response to identifying that the equally-exposed image has not the overexposed portion.

Figure 51:
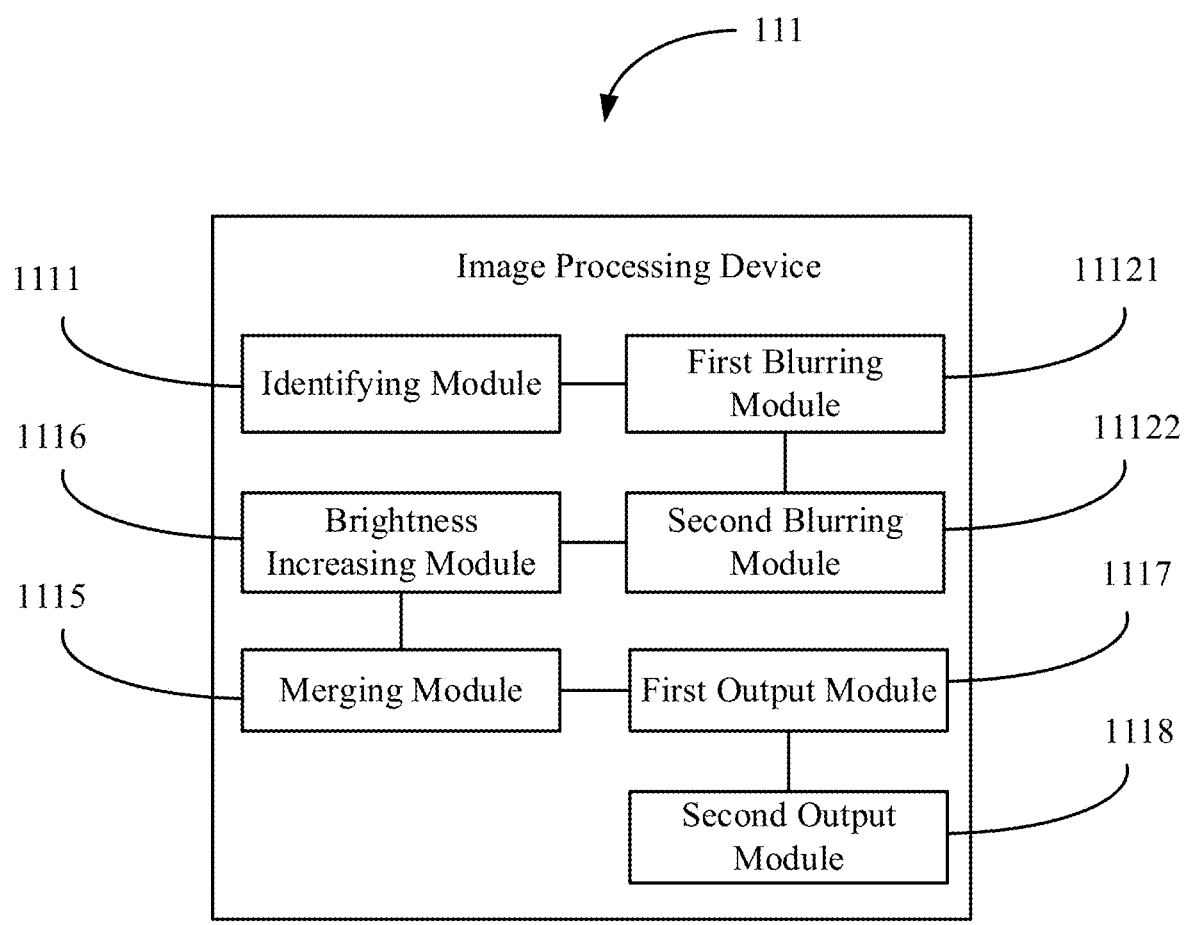
FIG. 51 is a block diagram illustrating an image processing device of an eighth embodiment of the present disclosure.

Referring to FIG. 51, the eighth embodiment of the image processing method can be implemented by an eighth embodiment of the image processing device 111 of the present disclosure. The image processing device 111 in accordance with the eighth embodiment of the image processing device 111 of the present disclosure has a structure substantially the same as the fifth embodiment of the image processing device 111, and their difference is that the image processing device 111 of the eighth embodiment further includes a first output module 1117 and a second output module 1118, which are configured to execute Blocks S27 and S28. That is, the first output module 1117 is configured to output the merged image in response to identifying that the equally-exposed image has the overexposed portion. The second output module 1118 is configured to output the blurred equally-exposed image in response to identifying that the equally-exposed image has not the overexposed portion.

Figure 52:
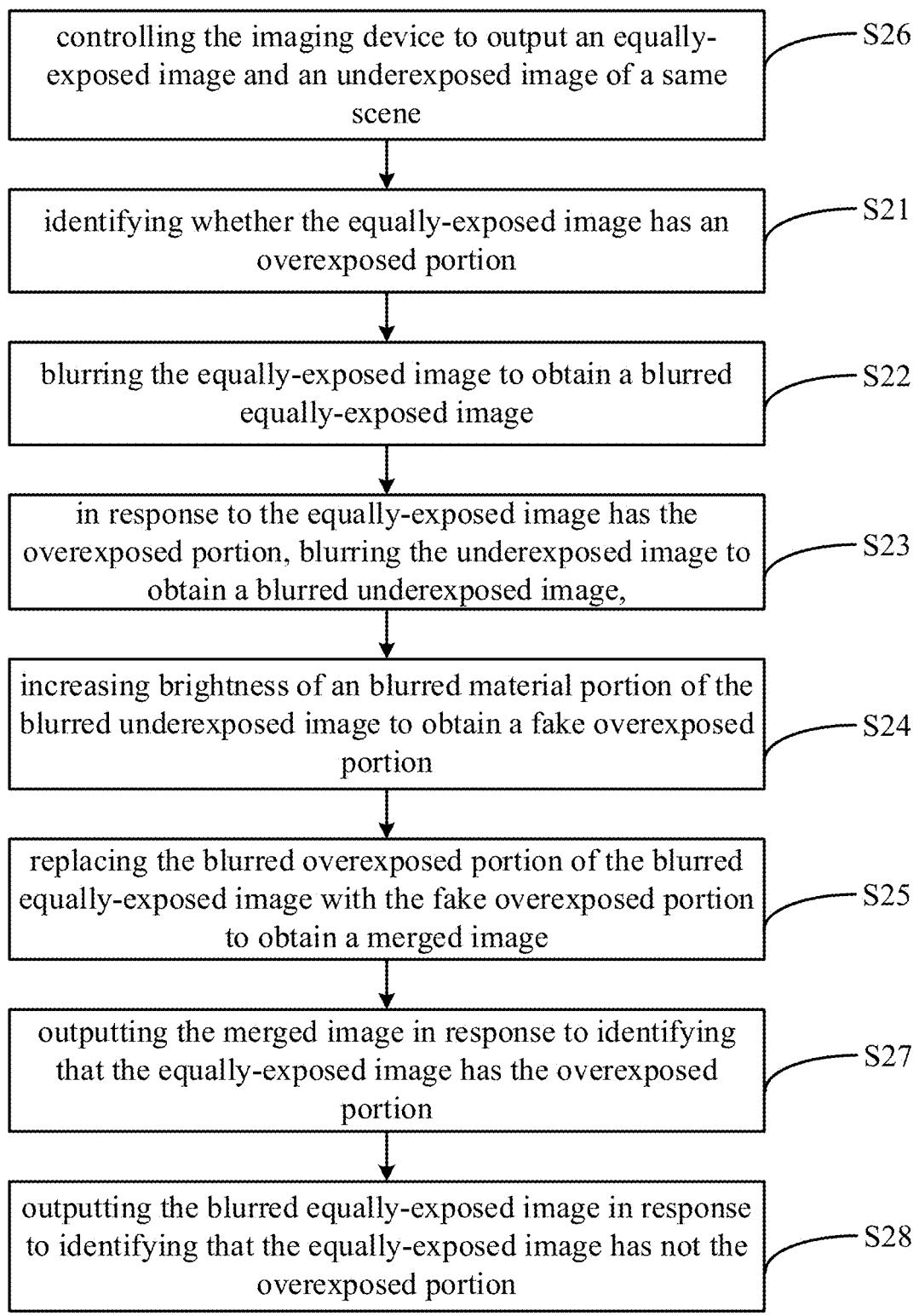
FIG. 52 is a flowchart of a control method of an eighth embodiment of the present disclosure.

Referring to FIG. 52, an eighth embodiment of the control method of the present disclosure is substantially the same as the fifth embodiment of the control method, but the eighth embodiment of the control method further includes the following actions at blocks.

At Block S27, the merged image is outputted in response to identifying that the equally-exposed image has the overexposed portion.

At Block S28, the blurred equally-exposed image is outputted in response to identifying that the equally-exposed image has not the overexposed portion.

Figure 53:
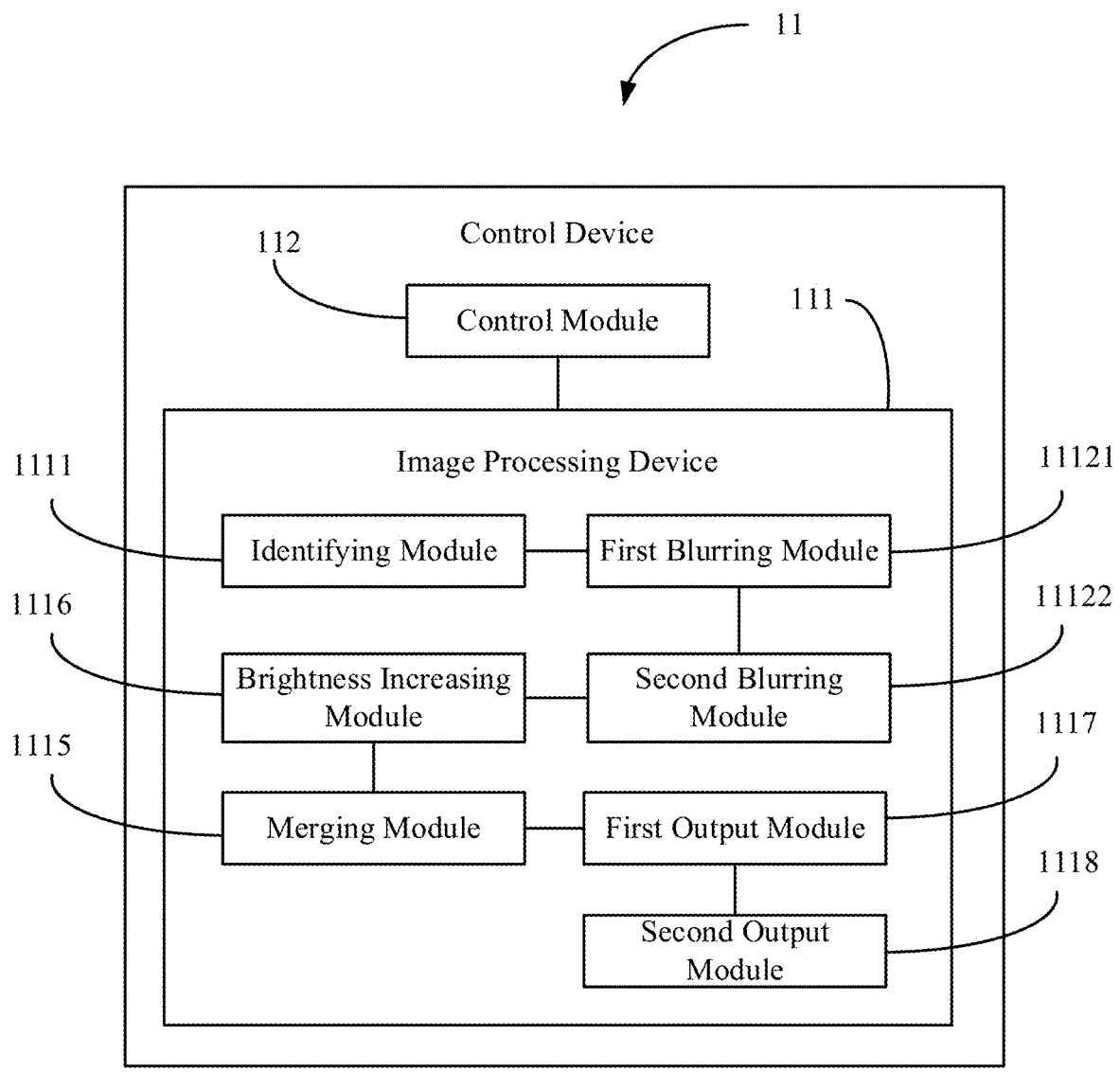
FIG. 53 is a block diagram illustrating a control device of an eighth embodiment of the present disclosure.

Referring to FIG. 53, the eighth embodiment of the control method can be implemented by an eighth embodiment of the control device 11 of the present disclosure. The control device 11 in accordance with the eighth embodiment of the control device 11 of the present disclosure has a structure substantially the same as the fifth embodiment of the control device 11, and their difference is that the control device 11 of the eighth embodiment further includes a first output module 1117 and a second output module 1118, which are configured to execute Blocks S7 and S8. That is, the first output module 1117 is configured to output the merged image in response to identifying that the equally-exposed image has the overexposed portion. The second output module 1118 is configured to output the blurred equally-exposed image in response to identifying that the equally-exposed image has not the overexposed portion.

Figure 54:
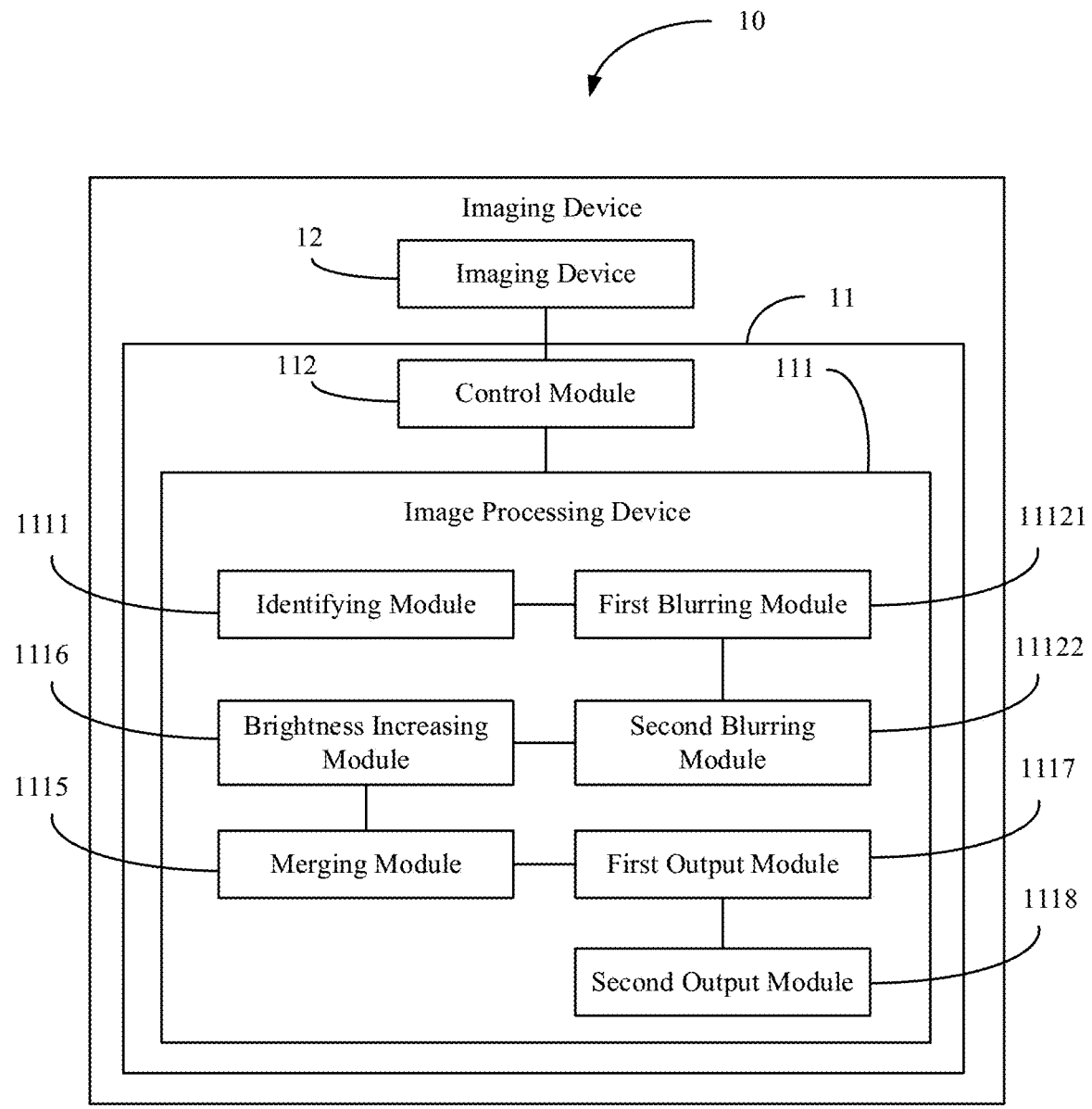
FIG. 54 is a block diagram illustrating an imaging device of an eighth embodiment of the present disclosure.

Referring to FIG. 54, an eighth embodiment of the imaging device 10 of the present disclosure includes the control device 11 in accordance with the eighth embodiment of the control device 11; and the camera lens 12 electrically connected to the control device 11. In other words, the imaging device 10 of the present embodiment includes the image processing device 111 in accordance with the eighth embodiment of the image processing device 111; the control module 112; and the camera lens 12. The control module 112, the camera lens 12, and the image processing device 111 are all electrically connected to one another.

Figure 55:
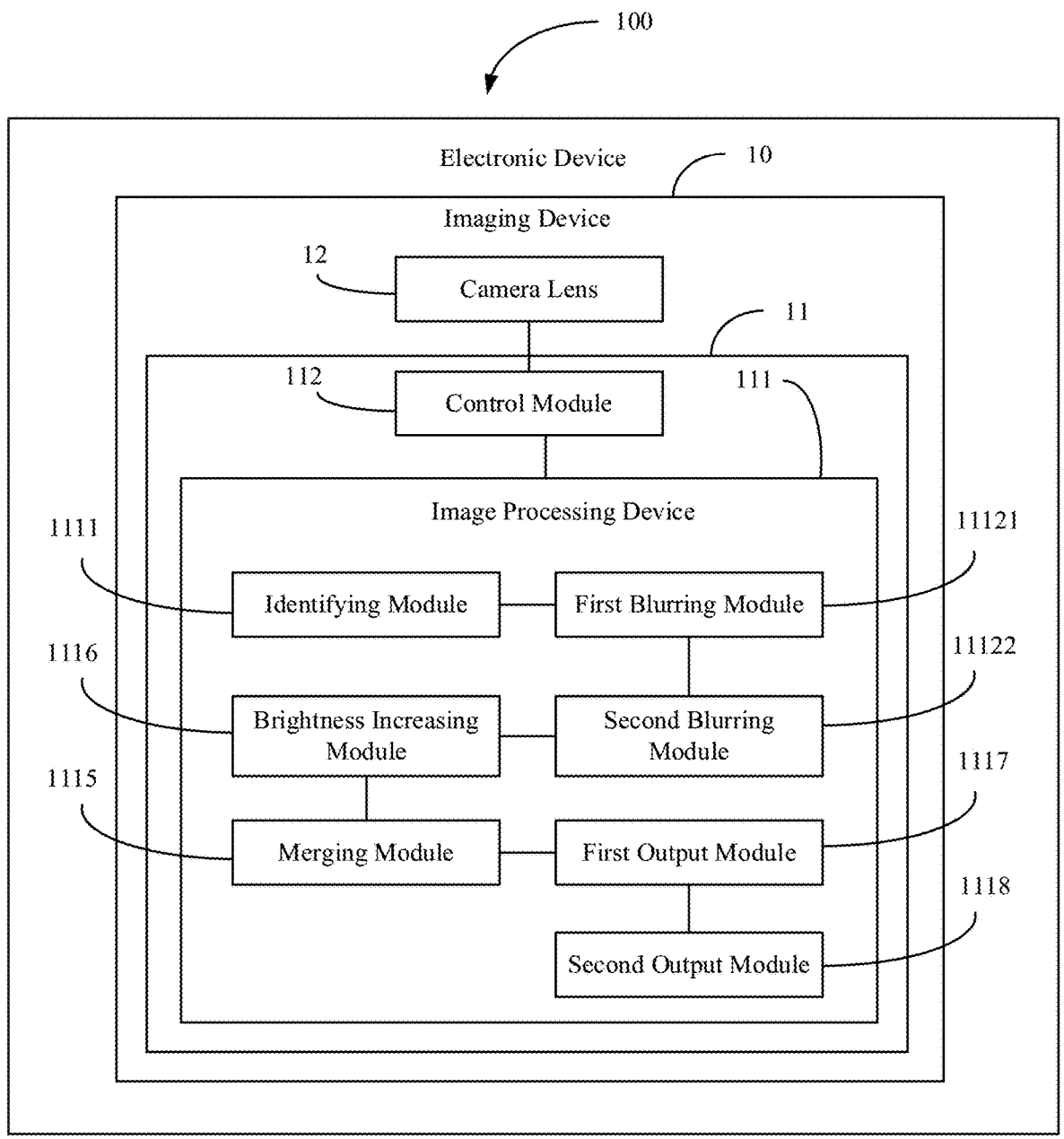
FIG. 55 is a block diagram illustrating an electronic device of an eighth embodiment of the present disclosure.

Referring to FIG. 55, an eighth embodiment of the electronic device 100 of the present disclosure includes the imaging device 10 in accordance with the eighth embodiment of the imaging device 10. The electronic device 100 can be carried out by any type of terminals having a photographing function, such as cell phones, tablets, notebook computers, smartwatches, smart rings, smart helmets, smart glasses, other VR (virtual reality) wearable devices, other AR (augmented reality) wearable devices, and etc. In the present embodiment, when the number of the imaging device 10 is one, the imaging device 10 can be a front-facing camera or a rear camera. When the number of the imaging device 10 is two, the two imaging devices 10 can be the front-facing camera and the rear camera, respectively; or both of the two imaging devices 10 are front-facing cameras; or both of the two imaging devices 10 are rear cameras. When the number of the imaging device 10 is greater than two, the imaging device 10 can be a camera deployed at any position, such as a top camera, a bottom camera, and a lateral camera except the front-facing camera and the rear camera.

In the image processing method, the image processing device 111, the control method, the control device 11, the imaging device 10, and the electronic device 100 in accordance with the eighth embodiment of the present disclosure, two images are photographed, one is the equally-exposed image, the other one is the underexposed image, both of the two images are blurred, and then the brightness of the blurred overexposed portion is increased, the corresponding fake overexposed portion is extracted, and the blurred overexposed portion of the blurred equally-exposed image is replaced with the fake overexposed portion to merge into a blurred image having a real flare effect. The flare effect is excellent.

It can be understood that Blocks S27 and S28 are also applicable to the sixth embodiment of the image processing method and the sixth embodiment of the control method. Correspondingly, the first output module 1117 and the second output module 1118 are also applicable to the sixth embodiment of the image processing device, the sixth embodiment of the control device, the sixth embodiment of the image processing device, and the sixth embodiment of the electronic device. Blocks S27 and S28 are also applicable to the seventh embodiment of the image processing method and the seventh embodiment of the control method. Correspondingly, the first output module 1117 and the second output module 1118 are also applicable to the seventh embodiment of the image processing device, the seventh embodiment of the control device, the seventh embodiment of the image processing device, and the seventh embodiment of the electronic device.

Figure 56:
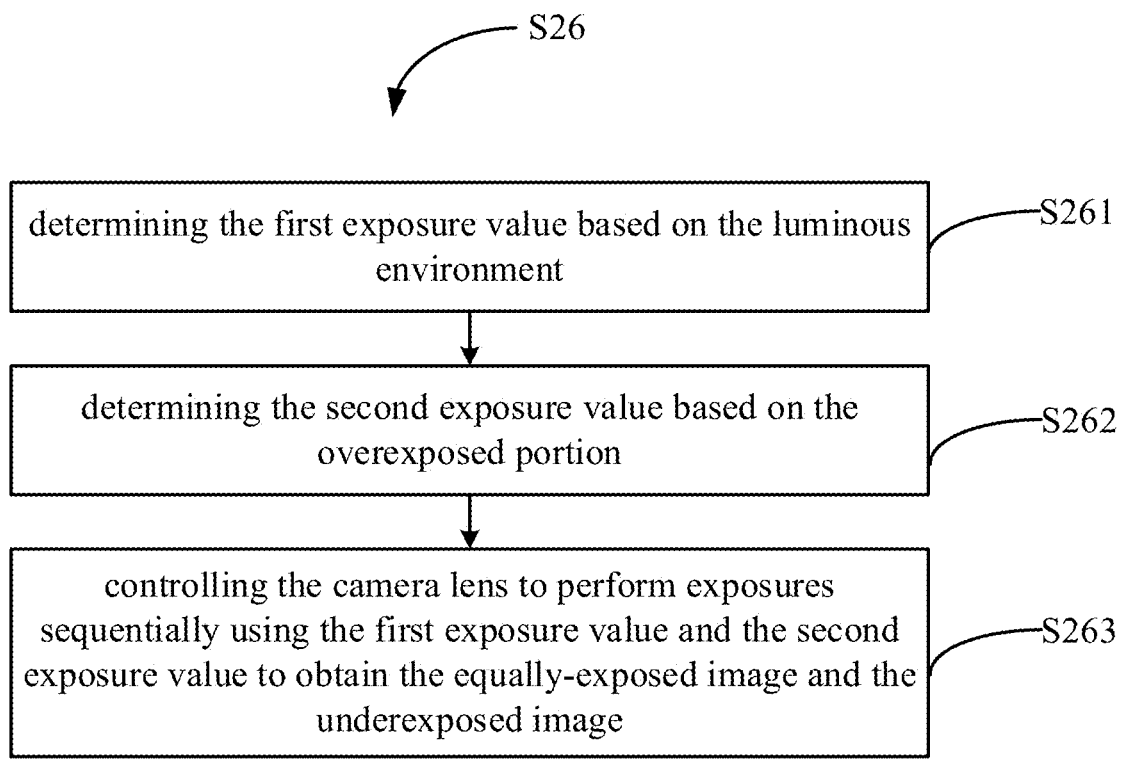
FIG. 56 is a flowchart of controlling an imaging device to output an equally-exposed image and an underexposed image of a same scene in accordance with some embodiments of the present disclosure.

Referring to FIG. 56, in the aforesaid control method according to the fifth to the eighth embodiments, if the imaging device controlled using the control method includes the camera lens, controlling the imaging device to output the equally-exposed image and the underexposed image of the same scene (Block S26) may include the following actions at blocks.

At Block S261, the first exposure value is determined based on the luminous environment.

At Block S262, the second exposure value is determined based on the overexposed portion.

At Block S263, the camera lens is controlled to perform exposures sequentially using the first exposure value and the second exposure value to obtain the equally-exposed image and the underexposed image.

Figure 57:
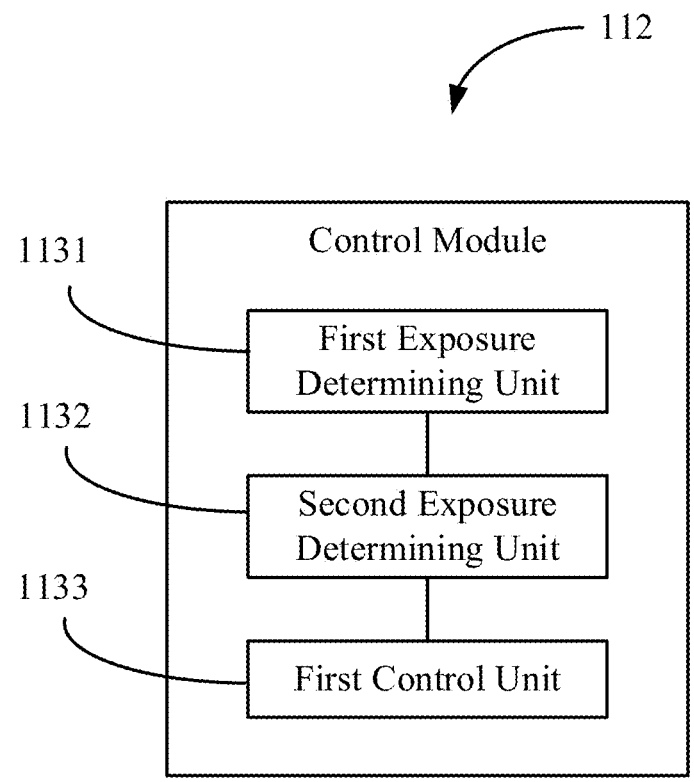
FIG. 57 is a block diagram illustrating a control module in accordance with some embodiments of the present disclosure.

Correspondingly, referring to FIG. 57, the control module 112 of the control device 11 according to the fifth to the eighth embodiments includes a first exposure determining unit 1131, a second exposure determining unit 1132, and a first control unit 1133, which are configured to execute Blocks S261, S262, and S263. That is, the first exposure determining unit 1131 is configured to determine the first exposure value based on the luminous environment. The second exposure determining unit 1132 is configured to determine the second exposure value based on the overexposed portion. The first control unit 1133 is configured to control the camera lens to perform exposures sequentially using the first exposure value and the second exposure value to obtain the equally-exposed image and the underexposed image.

Correspondingly, the control module 112 of the imaging device 10 and the electronic device 100 according to the fifth to the eighth embodiments may also include the first exposure determining unit 1131, the second exposure determining unit 1132, and the first control unit 1133, structures and functions of which are the same as above and are not detailed herein.

Figure 58:
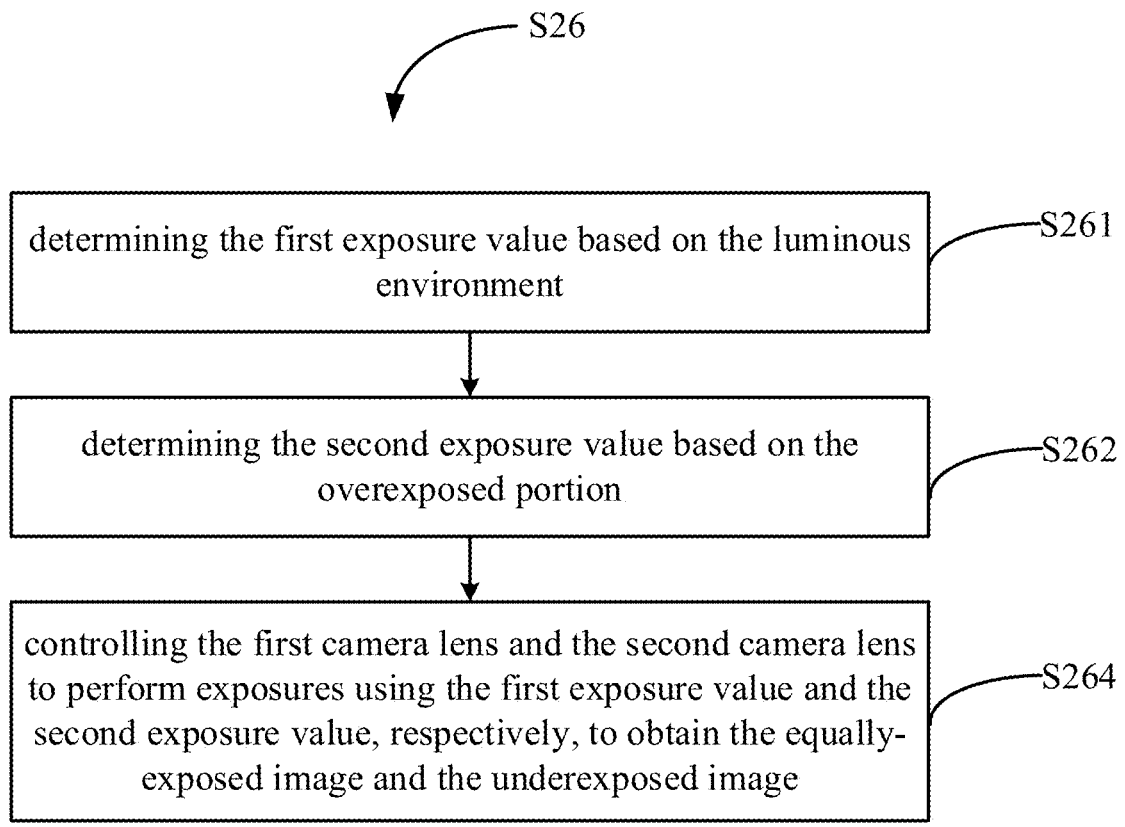
FIG. 58 is a flowchart of controlling an imaging device to output an equally-exposed image and an underexposed image of a same scene in accordance with some embodiments of the present disclosure.

Referring to FIG. 58, in the aforesaid control method according to the fifth to the eighth embodiments, if the imaging device controlled using the control method includes a first camera lens and a second camera lens, controlling the imaging device to output the equally-exposed image and the underexposed image of the same scene (Block S26) may include the following actions at blocks.

At Block S261, the first exposure value is determined based on the luminous environment.

At Block S262, the second exposure value is determined based on the overexposed portion.

At Block S264, the first camera lens and the second camera lens are controlled to perform exposures using the first exposure value and the second exposure value, respectively, to obtain the equally-exposed image and the underexposed image.

Figure 59:
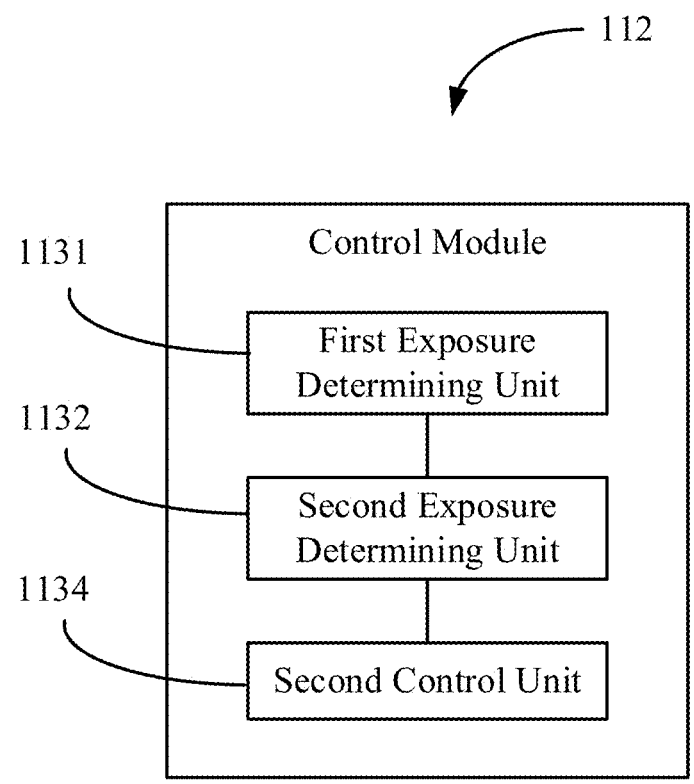
FIG. 59 is a block diagram illustrating a control module in accordance with some embodiments of the present disclosure.

Correspondingly, referring to FIG. 59, the control module 112 of the control device 11 according to the fifth to the eighth embodiments includes a first exposure determining unit 1131, a second exposure determining unit 1132, and a second control unit 1134, which are configured to execute Blocks S261, S262, and S264. That is, the first exposure determining unit 1131 is configured to determine the first exposure value based on the luminous environment. The second exposure determining unit 1132 is configured to determine the second exposure value based on the overexposed portion. The second control unit 1134 is configured to control the first camera lens and the second camera lens to perform exposures using the first exposure value and the second exposure value, respectively, to obtain the equally-exposed image and the underexposed image.

Correspondingly, the control module 112 of the imaging device 10 and the electronic device 100 according to the fifth to the eighth embodiments may also include the first exposure determining unit 1131, the second exposure determining unit 1132, and the second control unit 1134, structures and functions of which are the same as above and are not detailed herein.

Some embodiments of the present disclosure provide an electronic device. The electronic device includes a housing, a processor, a storage, a circuit board, and a power circuit.

The circuit board is disposed inside a space defined by the housing. The processor and the storage are disposed on the circuit board. The power circuit is configured to supply power to each circuit or device of the electronic device. The storage is configured to store executable program codes. By reading the executable program codes stored in the storage, the processor runs a program corresponding to the executable program codes to execute the image processing method of any one of the afore-mentioned embodiments or the control method of any one of the afore-mentioned embodiments. The electronic device can be carried out by any one of a cell phone, a tablet, a notebook computer, a smartwatch, a smart ring, a smart helmet, and a smart glass.

The embodiments of the present disclosure also provide a computer-readable storage medium having instructions stored therein. When the instructions are executed by the processor of the electronic device, the electronic device executes the image processing method of any one of the afore-mentioned embodiments or the control method of any one of the afore-mentioned embodiments.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, not necessarily in the sequence shown or discussed here, but probably including the almost same or reverse sequence of the involved functions, which should be understood by those skilled in the art.

The logic and/or steps described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An image processing method, comprising steps of:
   (a) obtaining a first image corresponding to a first photography parameter;
   (b) obtaining a second image having a same scene as the first image, the second image corresponding to a second photography parameter;
   (c) blurring the first image to obtain a blurred first image;
   (d) defining a to-be-replaced portion of the blurred first image, the to-be-replaced portion corresponding to an overexposed portion of the first image;
   (e) obtaining a replacing portion of the second image, the replacing portion corresponding to the to-be-replaced portion; and
   (f) replacing the to-be-replaced portion of the blurred first image with the replacing portion of the second image to obtain a merged image;

wherein the first image comprises a focused image, the second image comprises an out-of-focus image, and steps (a) to (f) are implemented by the following steps:

identifying whether the focused image has the overexposed portion at a focus state;

blurring the focused image to obtain a blurred focused image, the blurred focused image comprising a blurred overexposed portion corresponding to the overexposed portion;

in response to the focused image has the overexposed portion, obtaining the out-of-focus image having a same scene as the focused image, and processing the out-of-focus image to obtain a material portion corresponding to the overexposed portion of the focused image; and replacing the blurred overexposed portion corresponding to the overexposed portion in the blurred focused image with the material portion to obtain the merged image.

2. The image processing method according to claim 1, wherein the focused image is photographed at the focus state using full depth of field.

3. The image processing method according to claim 1, wherein identifying whether the focused image has the overexposed portion at the focus state comprises:

according to a histogram of the focused image, determining whether a number of overexposed pixels in the focused image is greater than or equal to a first predetermined number, in which pixel values of the overexposed pixels are greater than or equal to a predetermined pixel value; and in response to the number of the overexposed pixels is greater than or equal to the first predetermined number, determining that the focused image has the overexposed portion.

4. The image processing method according to claim 3, wherein identifying whether the focused image has the overexposed portion at the focus state further comprises:

determining whether there are adjacent overexposed pixels in the focused image by determining whether a number of the adjacent overexposed pixels is greater than or equal to a second predetermined number; and in response to determining that there are the adjacent overexposed pixels in the focused image, determining that the adjacent overexposed pixels belong to the overexposed portion.

5. The image processing method according to claim 1, wherein blurring the focused image to obtain the blurred focused image is implemented by a Gaussian blur algorithm.

6. The image processing method according to claim 1, wherein a degree of blurring the material portion is substantially the same as a degree of blurring the overexposed portion.

7. The image processing method according to claim 1, further comprising:

outputting the merged image in response to identifying that the focused image has the overexposed portion; and outputting the blurred focused image in response to identifying that the focused image has not the overexposed portion.

8. An image processing method, comprising steps of:

(a) obtaining a first image corresponding to a first photography parameter;

(b) obtaining a second image having a same scene as the first image, the second image corresponding to a second photography parameter;

(c) blurring the first image to obtain a blurred first image;

(d) defining a to-be-replaced portion of the blurred first image, the to-be-replaced portion corresponding to an overexposed portion of the first image;

(e) obtaining a replacing portion of the second image, the replacing portion corresponding to the to-be-replaced portion; and (f) replacing the to-be-replaced portion of the blurred first image with the replacing portion of the second image to obtain a merged image;

wherein the first image comprises an equally-exposed image, the second image comprises an underexposed image, and steps (a) to (f) are implemented by the following steps:

obtaining the equally-exposed image by exposure using a first exposure value matching luminous environment, and identifying whether the equally-exposed image has the overexposed portion;

blurring the equally-exposed image to obtain a blurred equally-exposed image comprising a blurred overexposed portion corresponding to the overexposed portion;

in response to the equally-exposed image has the overexposed portion, obtaining the underexposed image having a same scene as the equally-exposed image by exposure using a second exposure value, and blurring the underexposed image to obtain a blurred underexposed image, in which the underexposed image comprises a material portion corresponding to the overexposed portion, the blurred underexposed image comprises a blurred material portion corresponding to the overexposed portion, and the second exposure value is less than the first exposure value;

increasing brightness of the blurred material portion to obtain a fake overexposed portion; and replacing the blurred overexposed portion of the blurred equally-exposed image with the fake overexposed portion to obtain the merged image.

9. The image processing method according to claim 8, wherein identifying whether the equally-exposed image has the overexposed portion comprises:

according to a histogram of the equally-exposed image, determining whether a number of overexposed pixels in the equally-exposed image is greater than or equal to a first predetermined number, in which pixel values of the overexposed pixels are greater than or equal to a predetermined pixel value; and in response to the number of the overexposed pixels is greater than or equal to the first predetermined number, determining that the equally-exposed image has the overexposed portion.

10. The image processing method according to claim 9, wherein identifying whether the equally-exposed image has the overexposed portion further comprises:

determining whether there are adjacent overexposed pixels in the equally-exposed image by determining whether a number of the adjacent overexposed pixels is greater than or equal to a second predetermined number; and in response to determining that there are the adjacent overexposed pixels in the equally-exposed image, determining that the adjacent overexposed pixels belong to the overexposed portion.

11. The image processing method according to claim 8, wherein blurring the equally-exposed image to obtain the blurred equally-exposed image is implemented by a Gaussian blur algorithm; and/or blurring the underexposed image to obtain the blurred underexposed image is implemented by the Gaussian blur algorithm.

12. The image processing method according to claim 8, wherein increasing the brightness of the blurred material portion to obtain the fake overexposed portion comprises:
    increasing the brightness of the blurred underexposed image by N times to obtain the fake overexposed portion, wherein N is a ratio of the first exposure value to the second exposure value.

13. The image processing method according to claim 8, further comprising:
    outputting the merged image in response to identifying that the equally-exposed image has the overexposed portion; and
    outputting the blurred equally-exposed image in response to identifying that the equally-exposed image has not the overexposed portion.

14. An image processing device, comprising:
    a processor; and
    a memory connected with the processor, the memory comprising a plurality of program instructions executable by the processor configured to execute a method, the method comprising:
    (a) obtaining a first image corresponding to a first photography parameter;
    (b) obtaining a second image having a same scene as the first image, the second image corresponding to a second photography parameter;
    (c) blurring the first image to obtain a blurred first image;
    (d) defining a to-be-replaced portion of the blurred first image, the to-be-replaced portion corresponding to an overexposed portion of the first image;
    (e) obtaining a replacing portion of the second image, the replacing portion corresponding to the to-be-replaced portion; and
    (f) replacing the to-be-replaced portion of the blurred first image with the replacing portion of the second image to obtain a merged image;
    wherein the first image comprises a focused image, the second image comprises an out-of-focus image, and steps (a) to (e) of the method are implemented by the following steps:
    identifying whether the focused image has the overexposed portion at a focus state;
    blurring the focused image to obtain a blurred focused image, the blurred focused image comprising a blurred overexposed portion corresponding to the overexposed portion;
    in response to the focused image has the overexposed portion, obtaining the out-of-focus image having a same scene as the focused image, and processing the out-of-focus image to obtain a material portion corresponding to the overexposed portion of the focused image; and
    replacing the blurred overexposed portion corresponding to the overexposed portion in the blurred focused image with the material portion to obtain a merged image.

15. The image processing device according to claim 14, wherein identifying whether the focused image has the overexposed portion at the focus state comprises:
    according to a histogram of the focused image, determining whether a number of overexposed pixels in the focused image is greater than or equal to a first predetermined number, in which pixel values of the overexposed pixels are greater than or equal to a predetermined pixel value; and
    in response to the number of the overexposed pixels is greater than or equal to the first predetermined number, determining that the focused image has the overexposed portion.

16. The image processing device according to claim 15, wherein identifying whether the focused image has the overexposed portion at the focus state further comprises:
    determining whether there are adjacent overexposed pixels in the focused image by determining whether a number of the adjacent overexposed pixels is greater than or equal to a second predetermined number; and
    in response to determining that there are the adjacent overexposed pixels in the focused image, determining that the adjacent overexposed pixels belong to the overexposed portion.

17. The image processing device according to claim 14, further comprising:
    outputting the merged image in response to identifying that the focused image has the overexposed portion; and
    outputting the blurred focused image in response to identifying that the focused image has not the overexposed portion.

18. An image processing device, comprising:
    a processor; and
    a memory connected with the processor, the memory comprising a plurality of program instructions executable by the processor configured to execute a method, the method comprising:
    (a) obtaining a first image corresponding to a first photography parameter;
    (b) obtaining a second image having a same scene as the first image, the second image corresponding to a second photography parameter;
    (c) blurring the first image to obtain a blurred first image;
    (d) defining a to-be-replaced portion of the blurred first image, the to-be-replaced portion corresponding to an overexposed portion of the first image;
    (e) obtaining a replacing portion of the second image, the replacing portion corresponding to the to-be-replaced portion; and
    (f) replacing the to-be-replaced portion of the blurred first image with the replacing portion of the second image to obtain a merged image;
    wherein the first image comprises an equally-exposed image, the second image comprises an underexposed image, and steps (a) to (e) of the method are implemented by the following steps:
    obtaining the equally-exposed image by exposure using a first exposure value matching luminous environment, and identifying whether the equally-exposed image has the overexposed portion;
    blurring the equally-exposed image to obtain a blurred equally-exposed image comprising a blurred overexposed portion corresponding to the overexposed portion;
    in response to the equally-exposed image has the overexposed portion, obtaining the underexposed image having a same scene as the equally-exposed image by exposure using a second exposure value, and blurring the underexposed image to obtain a blurred underexposed image, in which the underexposed image comprises a material portion corresponding to the overexposed portion, the blurred underexposed image comprises a blurred material portion corresponding to the overexposed portion, and the second exposure value is less than the first exposure value;

increasing brightness of the blurred material portion to obtain a fake overexposed portion; and replacing the blurred overexposed portion of the blurred equally-exposed image with the fake overexposed portion to obtain a merged image.

19. The image processing device according to claim 18, wherein identifying whether the equally-exposed image has the overexposed portion comprises:

according to a histogram of the equally-exposed image, determining whether a number of overexposed pixels in the equally-exposed image is greater than or equal to a first predetermined number, in which pixel values of the overexposed pixels are greater than or equal to a predetermined pixel value; and in response to the number of the overexposed pixels is greater than or equal to the first predetermined number, determining that the equally-exposed image has the overexposed portion.

20. The image processing device according to claim 19, wherein identifying whether the equally-exposed image has the overexposed portion further comprises:

determining whether there are adjacent overexposed pixels in the equally-exposed image by determining whether a number of the adjacent overexposed pixels is greater than or equal to a second predetermined number; and in response to determining that there are the adjacent overexposed pixels in the equally-exposed image, determining that the adjacent overexposed pixels belong to the overexposed portion.

21. The image processing device according to claim 18, wherein increasing the brightness of the blurred material portion to obtain the fake overexposed portion comprises:

increasing the brightness of the blurred underexposed image by N times to obtain the fake overexposed portion, where N is a ratio of the first exposure value to the second exposure value.

22. The image processing device according to claim 18, further comprising:

outputting the merged image in response to identifying that the equally-exposed image has the overexposed portion; and outputting the blurred equally-exposed image in response to identifying that the equally-exposed image has not the overexposed portion in the equally-exposed image.

* * * * *